(12) United States Patent
Gerakopulos et al.

(10) Patent No.: US 11,179,870 B1
(45) Date of Patent: Nov. 23, 2021

(54) APPARATUS, METHODS, AND SYSTEMS FOR MIXING AND DISPERSING A DISPERSED PHASE IN A MEDIUM

(71) Applicants: Ryan Joaquin Gerakopulos, Kitchener (CA); Chitral Angammana, Kitchener (CA); Zengqian Shi, Kitchener (CA)

(72) Inventors: Ryan Joaquin Gerakopulos, Kitchener (CA); Chitral Angammana, Kitchener (CA); Zengqian Shi, Kitchener (CA)

(73) Assignee: Trusscore Inc., Palmerston (CA)

( * ) Notice: Subject to any disclaimer, the term of this patent is extended or adjusted under 35 U.S.C. 154(b) by 0 days.

(21) Appl. No.: 15/158,201

(22) Filed: May 18, 2016

Related U.S. Application Data

(60) Provisional application No. 62/163,322, filed on May 18, 2015.

(51) Int. Cl.
*B01F 3/00* (2006.01)
*B29C 41/10* (2006.01)
(Continued)

(52) U.S. Cl.
CPC ............ *B29C 41/10* (2013.01); *B01F 3/00* (2013.01); *B01F 3/0407* (2013.01);
(Continued)

(58) Field of Classification Search
CPC ............................. B29C 41/10; B29C 41/085
See application file for complete search history.

(56) References Cited

U.S. PATENT DOCUMENTS

| | | | | |
|---|---|---|---|---|
| 4,215,818 A | * | 8/1980 | Hopkinson | ........... B05B 5/0407 239/3 |
| 4,495,086 A | * | 1/1985 | Hiroshima | ............ B01F 3/0807 366/165.4 |

(Continued)

OTHER PUBLICATIONS

Lim, J.M., Lee, H.J., Kim, H.W., Lee, J.Y., Yoo, J., Park, K.W., Lee, C.K., Hong, Y.T. and Lee, S.Y., 2015. Dual electrospray-assisted forced blending of thermodynamically immiscible polyelectrolyte mixtures. Journal of Membrane Science, 481, pp. 28-35. (Year: 2015).*

(Continued)

*Primary Examiner* — Leith S Shafi
*Assistant Examiner* — Nicholas R Krasnow
(74) *Attorney, Agent, or Firm* — Woods Oviatt Gilman LLP; Dennis B. Danella, Esq.

(57) ABSTRACT

Apparatus and methods for mixing and dispersing a dispersed phase in a medium comprise a rotating surface for receiving the medium and an atomizing apparatus positioned at the rotating surface for depositing aerosolized constituents of the dispersed phase into the medium. The medium is made receptive and the dispersed phase is aerosolized. Constituents of the aerosolized dispersed phase are deposited into the receptive medium to form a compound or composite. The medium may be deposited onto a rotating disk, and the dispersed phase may be sprayed onto the disk. A thin film can be generated on the disk to transfer, distribute, and disperse the dispersed phase. Liquid ligaments formed at the edge of the rotating disk further transfer, distribute, and disperse the dispersed phase into the medium. Ligaments may be broken into aerosols or deformed by attenuation/drawing to further promote transfer, distribution, and dispersion. A bulk composite/compound may be collected.

18 Claims, 41 Drawing Sheets

(51) Int. Cl.
| | |
|---|---|
| *B29C 41/36* | (2006.01) |
| *B29C 41/08* | (2006.01) |
| *B01F 3/04* | (2006.01) |
| *B01F 13/00* | (2006.01) |
| *B01F 13/10* | (2006.01) |
| *B29K 63/00* | (2006.01) |
| *B29K 105/16* | (2006.01) |
| *B29K 507/04* | (2006.01) |
| *B29K 105/00* | (2006.01) |
| *B29K 509/08* | (2006.01) |
| *B29K 83/00* | (2006.01) |
| *B29K 33/04* | (2006.01) |

(52) U.S. Cl.
CPC ...... *B01F 3/04021* (2013.01); *B01F 3/04028* (2013.01); *B01F 13/00* (2013.01); *B01F 13/0001* (2013.01); *B01F 13/0003* (2013.01); *B01F 13/0005* (2013.01); *B01F 13/0076* (2013.01); *B01F 13/0077* (2013.01); *B01F 13/105* (2013.01); *B29C 41/085* (2013.01); *B29C 41/365* (2013.01); *B01F 2003/005* (2013.01); *B01F 2003/0042* (2013.01); *B29K 2033/04* (2013.01); *B29K 2039/06* (2013.01); *B29K 2063/00* (2013.01); *B29K 2083/00* (2013.01); *B29K 2105/0061* (2013.01); *B29K 2105/162* (2013.01); *B29K 2507/04* (2013.01); *B29K 2509/08* (2013.01)

(56) References Cited

U.S. PATENT DOCUMENTS

| | | | | |
|---|---|---|---|---|
| 4,551,355 A * | 11/1985 | Ericson | ............... | G11B 5/842 427/128 |
| 5,779,946 A * | 7/1998 | Bogue | ............... | A23G 3/10 264/40.6 |
| 6,517,612 B1 * | 2/2003 | Crouch | ............... | B01D 33/067 95/277 |
| 8,227,750 B1 * | 7/2012 | Zhu | ............... | H01J 49/045 250/281 |
| 2004/0016877 A1 * | 1/2004 | Bateman | ............... | H01J 49/26 250/281 |
| 2007/0151663 A1 * | 7/2007 | Steinmann | ............... | B05B 7/1404 156/297 |
| 2007/0196401 A1 * | 8/2007 | Naruse | ............... | A61K 8/027 424/401 |
| 2011/0028834 A1 * | 2/2011 | Zussman | ............... | B82Y 30/00 600/431 |
| 2014/0094551 A1 * | 4/2014 | Koslow | ............... | C03B 37/005 524/377 |
| 2014/0305173 A1 * | 10/2014 | Berndsen | ............... | D06F 37/40 68/133 |
| 2015/0211149 A1 * | 7/2015 | Lamanac | ............... | D01D 5/18 264/8 |
| 2015/0265746 A1 * | 9/2015 | Martin | ............... | A61L 15/44 424/1.65 |
| 2016/0047061 A1 * | 2/2016 | Huang | ............... | D04H 1/732 264/468 |
| 2016/0047062 A1 * | 2/2016 | Greenawalt | ............... | D01D 5/0069 264/465 |
| 2017/0209918 A1 * | 7/2017 | Spatz | ............... | B22D 11/0651 |
| 2019/0083994 A1 * | 3/2019 | Tani | ............... | B05B 5/053 |
| 2019/0388915 A1 * | 12/2019 | Tani | ............... | B05B 3/1021 |

OTHER PUBLICATIONS

Bian, S., 2013. A Study of the Material Properties of Silicone Nanocomposites Developed by Electrospinning. (Year: 2013).*

"Jaworek"—Czech, T., Ramakrishna, S. and Sundarrajan, S., 2009. Electrospinning and electrospraying techniques for nanocomposite non-woven fabric production. Fibres Text. East. Eur, 17, pp. 77-81. (Year: 2009).*

"Tronstad"—<https://zach-tronstad-srp.weebly.com/blog/electrospinning-an-overview> (Year: 2015).*

Bian, S., Angammana, C.J. and Jayaram, S.H., 2010. Use of electrospinning to improve the dispersion of inorganic nanofillers in silicone rubber. In Proc. ESA Annual Meeting on Electrostatics (vol. 3, pp. 1-6). (Year: 2010).*

Eslamian, M., Rak, J. and Ashgriz, N., 2008*. Preparation of aluminum/silicon carbide metal matrix composites using centrifugal atomizat *NOTE: Printed in 2008 but available online in 2007 (Year: 2007).*

* cited by examiner

200

214 Prepare dispersed phase
210 Prepare medium

216 Atomize dispersed phase to produce aerosols
212 Make medium receptive

218 Deposit aerosols in receptive medium for dispersion in composite/compound

220 Form film of composite/compound; disperse in film

224 Recirculate

222 Disperse in composite/compound projectiles

226 Collect composite/compound

- 1210: Apply medium to rotating surface
- 1212: Form thin film from medium
- 1214: Form projectiles from medium
- 1216: Feed dispersed phase through atomization apparatus
- 1218: Combine dispersed phase from atomization apparatus with medium on rotating surface
- 1220: Form film of composite/compound
- 1222: Form compound/composite projectiles (e.g. ligaments, compound-film projectiles, aerosols, droplet particles)
- 1224: Apply electric and/or magnetic field
- 1226: Apply electric and/or magnetic field
- 1228: Collect film of composite/compound
- 1230: Collect projectiles
- 1232: Recirculate
- 1234: Recirculate

1310 → Make medium receptive (e.g. from film and/or projectiles)

1312 → Aerosolize dispersed phase

1314 → Deposit aerosolized constituents of dispersed phase into receptive medium to form a composite/compound 1316 → Form film of composite/compound 1318 → Form compound/composite projectiles 1328 Recirculate 1330 Recirculate 1320 Apply electric and/or magnetic field 1322 Apply electric and/or magnetic field 1324 Collect film of composite/compound 1326 Collect projectiles

FIG. 13

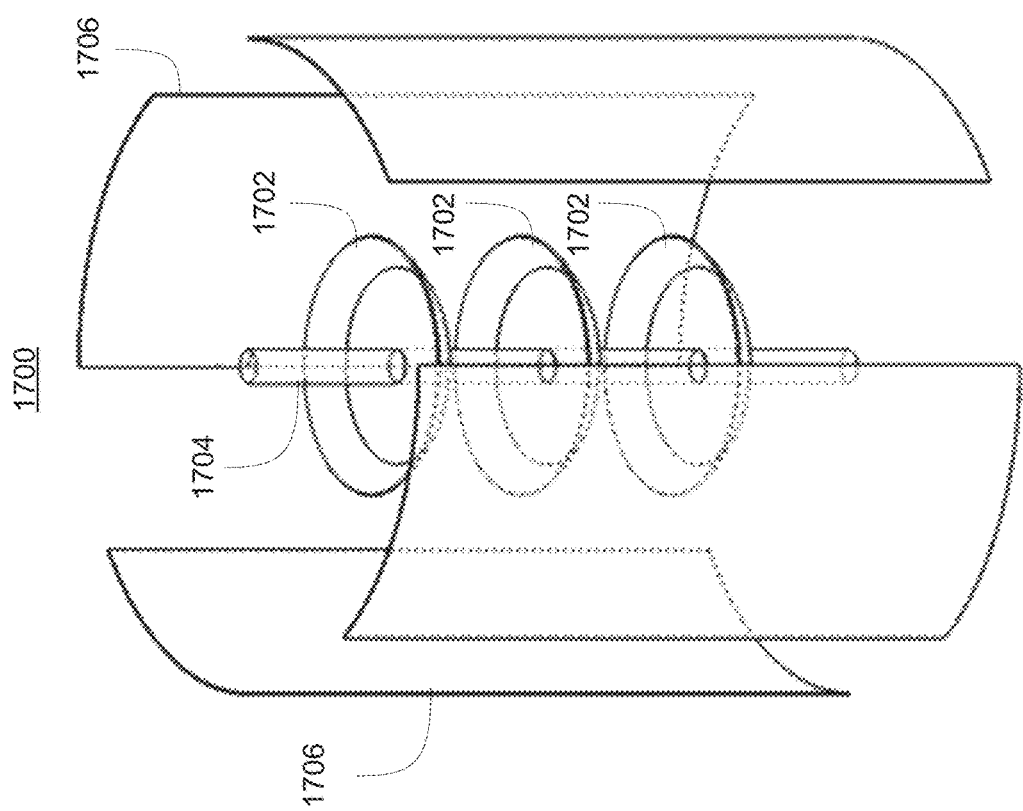

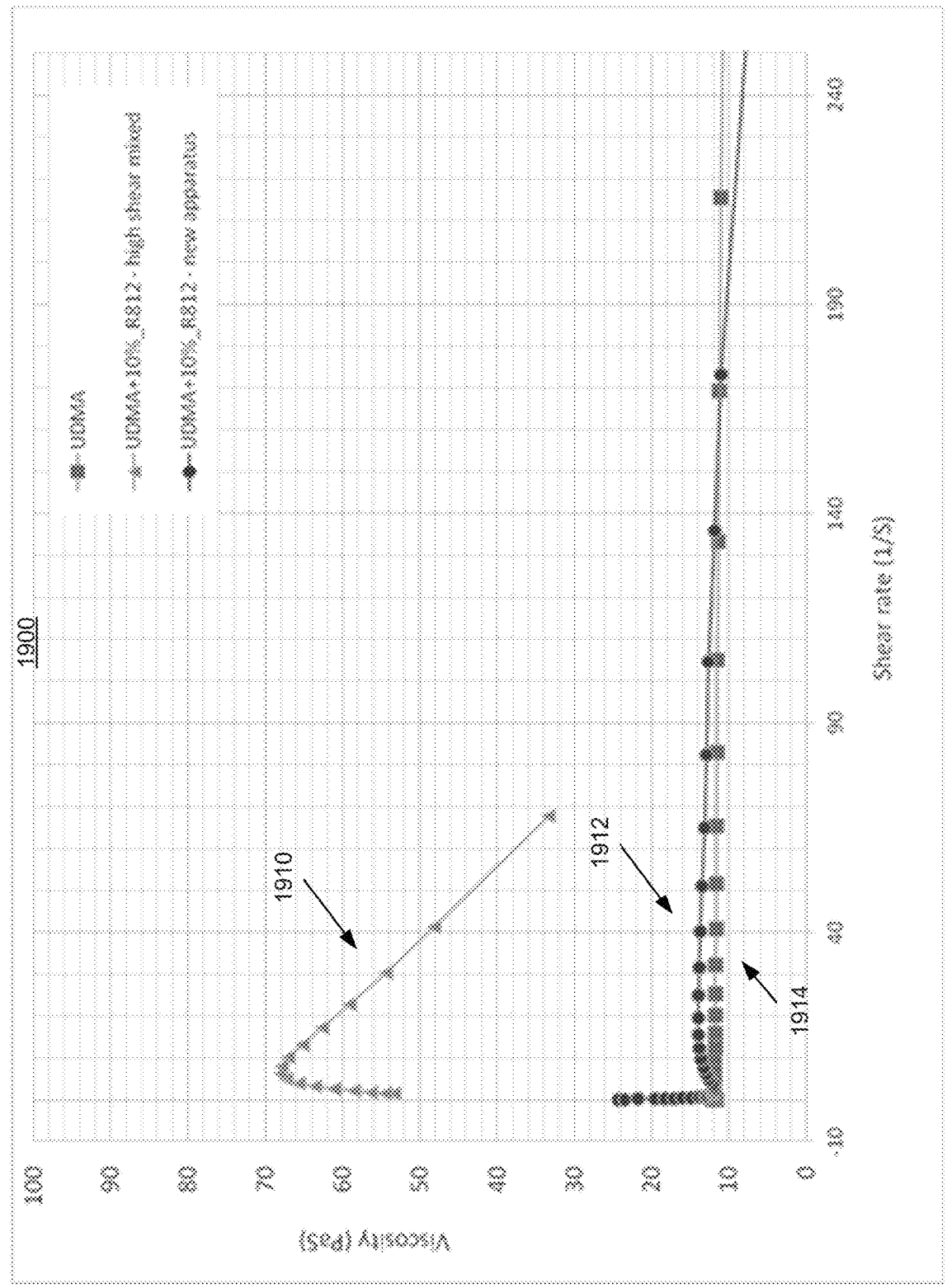

ант parts of a composite or compound according to some
APPARATUS, METHODS, AND SYSTEMS FOR MIXING AND DISPERSING A DISPERSED PHASE IN A MEDIUM

CROSS-REFERENCE TO RELATED APPLICATIONS

This application claims the benefit of U.S. Provisional Patent Application No. 62/163,322, filed May 18, 2015, the entire contents of which are hereby incorporated by reference herein for all purposes.

TECHNICAL FIELD

The embodiments disclosed herein relate to composite dispersions, and, in particular to apparatus, methods, and systems for mixing and dispersing a dispersed phase in a medium.

BRIEF DESCRIPTION OF THE DRAWINGS

The drawings included herewith are for illustrating various examples of articles, methods, and apparatuses of the present specification. In the drawings:

FIG. 2 is a method for mixing and dispersing a dispersed phase in a medium to produce the composite or compound of FIG. 1, according to some embodiments;

FIG. 12. is a flow diagram depicting a method for mixing and dispersing a dispersed phase in a medium, according to some embodiments;

FIG. 13 is a flow diagram depicting a method for mixing and dispersing a dispersed phase in a medium, according to some embodiments;

FIG. 17 is a profile view of a system for producing a compound with a plurality of interfacial dispersion devices according to some embodiments;

FIG. 19 is a graph showing viscosity profiles for two different samples of urethane dimethacrylate compounds in respect of shear rate;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed below that is not claimed in this document may be the subject matter of another protective instrument, for example, a continuing patent application, and the applicants, inventors or owners do not intend to abandon, disclaim or dedicate to the public any such invention by its disclosure in this document.

As used herein, the term "UDMA" refers to urethane dimethacrylate, and the term "NMP" refers to N-Methyl-2-pyrrolidone.

Figure 1:
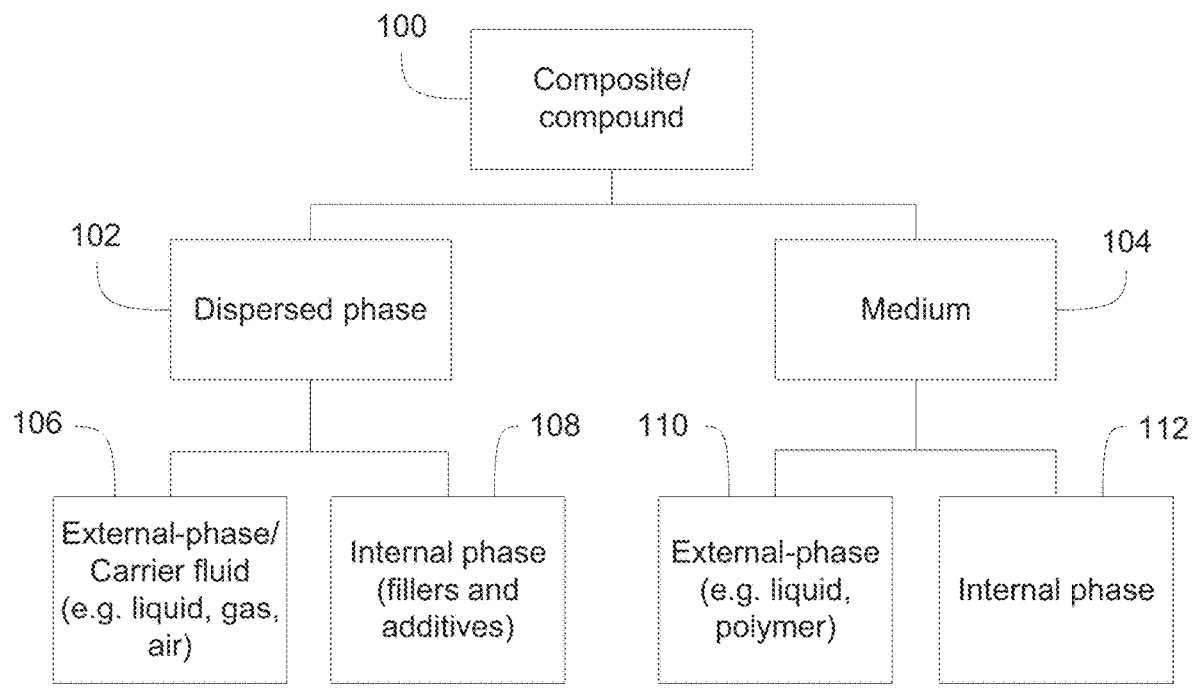
FIG. 1 is an organizational diagram showing the constituent parts of a composite or compound according to some embodiments.

Referring to FIG. 1, there is a composite 100 (or compound) formed from a dispersed phase 102 and a medium 104. The composite 100 is formed by the dispersion of the dispersed phase 102 into the medium 104 as will be further described below.

The dispersed phase 102 can be prepared from an external phase 106 (e.g a carrier fluid) and, in some cases, an internal phase 108 (e.g. fillers and/or additives).

A carrier fluid 106 is a fluid that is miscible or immiscible with the medium (e.g. liquid, colloid, polymer solution, liquid polymer, polymer melt). For instance, gas, air, and solvents (which can include liquids that are in a supercritical state, e.g. supercritical $CO_2$) may be used as the carrier fluid 106.

Fillers 108 may include both micro and nano objects that exist or are induced (e.g. during mixing or during atomization) in defined singular form that have at least one dimension in nano or micro scale. For example: particles have three dimensions in the nano/micro scale; fibers and tubes have two dimensions in the nano/micro scale; and plates and flakes have one dimension that is in the nano/micro scale. Thus, for example, a nano flake can be measured on the nanoscale in only one dimension, and a micro particle can be measured on the micro scale in all three spatial dimensions. Fillers may include any of particles, rods, tubes, wires, fibers, flakes, sheets, and platelets in respect of microstructures and/or nanostructures as determined in one, two, or three dimensions. Furthermore, fillers may take the form of a liquid, gas, or solid.

In some cases, induced fillers can be formed during dispersion. Induced fillers may include any of particles, rods, tubes, wires, fibers, flakes, sheets, and platelets in respect of microstructures and/or nanostructures as determined in one, two, or three dimensions. Furthermore, induced fillers may take the form of a liquid, gas, or solid. For example, an induced filler may be a nanocrystalline cellulose nanofiber.

It should be noted that mixtures can contain any combination of nano and micro objects: only nano objects; only micro objects; or both nano and micro objects.

Other additives 108, such as processing fluids and/or dispersion aids may be incorporated into the dispersed phase 102. These processing fluids may be miscible or immiscible in the carrier fluid 106. Other additives, such as surfactants and coupling agents may also be used.

Fillers and additives are generally referred to here as "objects", though the physical state of the objects may be solid, liquid, or gaseous. Generally speaking, these objects may be dispersed in relatively low viscosity carrier fluids using methods such as ultrasound sonication and high-shear mixing.

The medium 104 may comprise an external phase 110 that is a polymer or a liquid, and may also contain an internal phase 112 of fillers and/or additives similar to the dispersed phase 102 described above. The external phase 110 of the medium 104 may be a liquid (e.g. a solvent), a polymer solution, a liquid polymer, or a polymer melt.

Both the dispersed phase 102 and the medium 104 may be prepared (e.g. mixed) at room temperature, or at an elevated temperature (which may be above or below the melting temperature of the external phase of the medium), or any other temperature (e.g. below room temperature).

Referring to FIG. 2, there is a method 200 that provides an example of how the composite or compound 100 may be formed.

At step 210, the medium is prepared. The preparation of the medium 104 can include selecting an appropriate external phase 110 depending on the application and particular composite or compound 100 that is to be produced. In some cases, an appropriate internal phase 112 will be selected for the medium 104, while in other cases, the inclusion of an internal phase 112 in the medium 104 is not required.

At step 212, the medium 104 is made receptive so that the dispersed phase 102 can eventually be deposited into the medium 104 (or "receptive medium"). The medium can be made receptive, for example, by depositing the medium onto a rotating disk, and/or by forming a thin film or projectiles from the medium. According to some embodiments and/or compositions of the medium, the medium may be a liquid, a polymer solution, and polymer melt, etc.

In addition to preparing the medium 104, in some cases, it may be necessary to prepare the dispersed phase 102. This is done at step 214, which may be performed in prior to, in parallel to, or after the medium 104 is prepared at step 210. The preparation of the dispersed phase 102 can include selecting an appropriate external phase 106 depending on the application and particular composite or compound 100 that is to be produced. Similarly, an appropriate internal phase 108 is selected for the dispersed phase 102.

After the dispersed phase 102 has been prepared, the dispersed phase 102 is atomized at step 216 in order to produce aerosols of the dispersed phase. According to some embodiments and dispersed phase composition, the carrier fluid (e.g. solvent) may be evaporated at step 216.

As used herein, "atomizing" refers to the reduction of a substance to very fine particles, fragments, etc., which can include aerosol (which is a colloid suspension of fine solid particles or liquid droplets in a gaseous environment such as air, gas, smoke, fog, or other gaseous environments). Atomizing can include making fine particles in various environments, which can include liquids, water, molten polymers, etc.

Once the medium 104 has been made receptive, and the dispersed phase 102 has been formed into aerosols, the aerosols are deposited into the receptive medium at step 218. The deposition of the aerosolized dispersed phase 102 into the receptive medium forms the composite or compound 100; or, in some cases, forms a preliminary form of the composite or compound 100. For example, this may include spraying the dispersant on to a rotating disk.

According to some embodiments, at step 220, dispersion can be obtained by forming a film (e.g. a thin film) of the composite or compound so that dispersion can occur within the film. At step 220, carrier fluid (e.g. solvent) evaporation can occur, depending on the particular configuration and/or composition of the medium or dispersed phase.

For example, a thin film can be generated on a rotating disk, and then the dispersant can be effectively transferred into the medium such that it is efficiently distributed and dispersed within the medium.

According to some embodiments, dispersion can be obtained by forming projectiles from the composite or compound at step 222. The creation of composite/compound projectiles can be used to enhance the dispersion. According to some embodiments, this can include generating liquid ligaments at the edge of a rotating disk, and then further transferring, distributing, and/or dispersing the dispersant into the medium.

According to some embodiments, the liquid ligaments can be broken into aerosols, and/or liquid ligaments can be deformed by attenuation/drawing. This can further promote the efficient transformation, distribution, and/or dispersion of the dispersant into the medium.

According to some embodiments, at step 224, dispersion can be further enhanced by recirculating the preliminary form of the composite or compound. For example, the preliminary form of the composite or compound (from step 222) can be re-introduced with the medium at step 218, or introduced in place of the medium, so that additional deposits of the aerosolized dispersed phase can be made. Furthermore, it is possible to re-introduce the preliminary form of the composite or compound in place of the medium at step 220 in order to further enhance dispersion in the thin film and/or projectiles at step 222.

At step 226, the composite or compound 100 is collected. For example, this collection might include collecting projectiles of the composite or compound on a collection surface and/or collecting a film of the composite or compound.

According to some embodiments, applied forces (e.g. centrifugal, pressure, electric, magnetic, etc.) can subject both the dispersed phase and the receptive medium to shear and extensional flow deformation. This can result in micro and nano objects (e.g. aerosols, thin films, ligaments, etc.) that have a high surface area, which can promote effective mass transfer between the phases.

Figure 3:
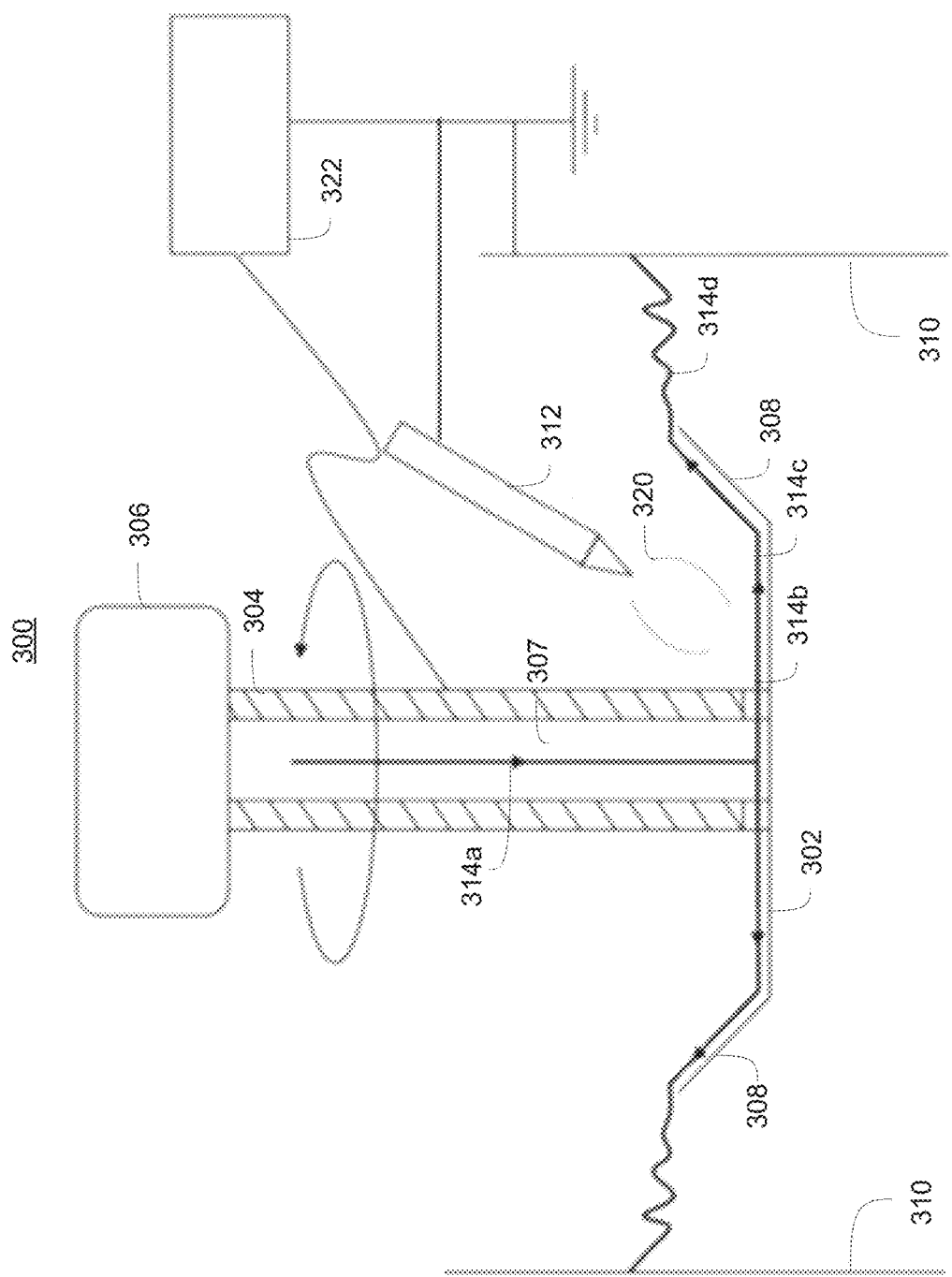
FIG. 3 is an elevation view of an apparatus for mixing and dispersing a dispersed phase in a medium, according to some embodiments.

Referring to FIG. 3, there is shown an apparatus 300 for mixing and dispersing a dispersed phase in a medium, and, in particular, an interfacial dispersion device according to some embodiments.

The apparatus comprises a rotating surface 302 that is rotated on a shaft 304 by a motor 306. The shaft includes a medium feed conduit 307 through which the medium can be applied to the rotating surface 302. The medium feed conduit 307 is shown at the center of (i.e. proximal to the center) of the rotating surface 302.

The rotating surface 302 may be of various shapes. For example, the rotating surface 302 may be flat (as shown) such as a disc. Alternatively, the rotating surface 302 may be curved, such as in the shape of a parabola, circle, ellipse, or hyperbola, in either a convex of concave manner (not shown).

The rotating surface 302 includes a transverse distal surface 308. Here, "distal" means away from the center of the rotating surface 302, and towards the edge of the rotating surface 302. The transverse distal surface 308 may extend upward and distal (away) from the rotating surface 302, as shown. In other embodiments, other orientations and shapes may be used for the transverse distal surface 308.

Distal to the transverse distal surface 308 are collecting surfaces 310. Collecting surfaces 310 may be more than one surface, or may be a single, continuous column surface surrounding the rotating surface 302.

An atomizing apparatus 312 is positioned above the rotating surface 302.

Flow paths are indicated by arrows in FIG. 3. A flow path begins when the prepared medium 314a is fed onto the rotating surface 302 via the medium feed conduit 307. The rotating surface 302 is rotated on the shaft 304 via the motor 306 while the medium 314a is fed onto the rotating surface 302.

As the rotating surface 302 rotates, a film 314b of the medium 314a is formed, which flows outwards (distal) from the center of the rotating surface 302 due to applied forces (e.g. centrifugal force). Aerosolized constituents 320 of the dispersed phase are deposited into the film 314b on the rotating surface 302 from the atomizing apparatus 312. This forms a composite or compound 314c, which continues to flow outwards towards the transverse distal surface 308.

The aerosolized constituents 320 are produced by atomizing the dispersed-phase mixture contained in the atomization apparatus 312 using techniques such as spray atomization, rotary atomization, ultrasonic spray systems, powder spray systems, chemical vapor deposition methods, electro-spraying, electro-hydrodynamic spray, or other methods.

The atomization apparatus 312 may be pressurized with hydrostatic pressure or a non-zero gauge pressure to aerosolize the dispersed-phase mixture. The dispersed-phase mixture in the atomization apparatus 312 may be at room temperature or at an elevated temperature, or any other temperature. The dispersed phase can be aerosolized into ambient air, a gaseous environment, or a chemical-vapor environment that helps to functionalize the nano or micro objects before depositing them into the receptive medium 314b. An external air/gas velocity jet at room, or any other temperature, electric field, and magnetic field may be used to enhance the atomization of the dispersed phase, to guide the trajectory of aerosolized constituents, and/or to promote the removal or evaporation of the aerosolized constituents.

The compound film flow 314c is generated on the rotating surface 302, which facilitates dispersion of the compound constituents. Centrifugal force acting on the compound 314c causes the film to thin by application of shear and extensional flow deformation. As will be further described, according to some embodiments, the apparatus 300 may include multiple rotating surfaces 302. The rotating surface 302 can be operated at room temperature, an elevated temperature, or any other temperature.

As the flow path continues, and the compound 314c contacts the distal edge of the transverse distal surface 308, and projectiles 314d are formed. These projectiles are then collected on the collecting surface 310. The projectiles 314d are shown as ligaments for illustrative purposes.

The compound film 314c flows over the edge of the rotating surface 302 (or the edge of the transverse distal surface 308, as depicted) and gets ejected as projectiles 314d. An ejection location is defined as the region where the projectiles are formed at the edge of the rotating surface 302 (or transverse distal surface 308, as depicted). Once the projectiles 314d are ejected from the edge of the rotating surface, further object dispersion via strong extensional and shear flow deformation by several force mechanisms occurs.

An electric field may be generated between the rotating surface 302 and the collection surface 310, with the application of a high voltage 322 (e.g. a positive or negative voltage). Additionally, a magnetic field can be applied between the rotating surface 302 and the collection surface 310 to further enhance the dispersion using a permanent magnet or an electromagnet. The rotating surface 302 can also be subjected to ultrasonic vibration for better dispersion of the dispersed phase in the medium during film flow 314c and/or projectile formation 314d.

According to some embodiments, the deposition of aerosols into the receptive medium can promote the dispersion and distribution of the dispersed phase within the medium, thereby promoting effective mass transfer between the phases. For example, applied forces can result in shear and extensional flow deformation, thereby increasing the surface area between an aerosolized disperse phase and the receptive medium, such as a thin film flow 314c formed on the rotating surface 302, and/or projectile formation 314d. In such a case, projectiles (e.g. ligaments) are generated, and, additionally, projectile deformation (e.g. attenuation of ligaments, droplet breakdown, etc.) allows for further dispersion. The high surface area between the phases in projectiles promotes this dispersion.

For further clarity and understanding, the apparatus 300 is distinct from electrospraying apparatus as well as electrospinning apparatus. Electrospraying is a method that uses electrical forces to produce liquid aerosols using atomization apparatus. In electrospraying, surface tension holds the fluid droplet at an electrospraying nozzle, which then acquires an electrostatic charge due to the application of a voltage. This results in the formation of a Taylor cone. The jet flow away from the Taylor cone flows in a nearly straight line, and the travelling liquid is subjected to Rayleigh instability, which produces fine liquid aerosols.

Electrospraying can also include an electrical force used in combination with other forces such as centrifugal force and pressure. If the liquid atomization of electrospraying is done using a rotating disk, the result is rotary atomization. In some cases, it is also possible to use rotary atomization in conjunction with electrospraying. In such a case, the apparatus is configured such that an electric field is applied between the rotating element and a grounded collector plate in order to increase the efficiency or reduce the size of generated aerosols.

The use of an electrospraying apparatus also differs from the use of the apparatus 300 in that the major steps of rotary electrospraying are limited to depositing liquid on to a rotating disk, generating a thin film on the disk, generating liquid ligaments at the edge of the disk, and breaking the liquid ligaments into fine aerosols.

Furthermore, the apparatus 300 is distinct from electrospinning apparatus. Electrospinning is a process for producing continuous nanofibers (e.g. in the range of sub-micron diameter to nanometer diameter scale). Electrospinning pertains to an electrically-charged jet of polymer solution or polymer melt consists of sufficiently-long chain polymer molecules that do not break up due to Rayleigh instability. Surface tension holds a fluid droplet at the spinneret, and the fluid droplet acquires an electrostatic charge due to the application of a voltage. This results in the formation of a Taylor cone. When the Taylor cone is subjected to an electric field, the result is instability in the droplet, and the formation of a single fluid jet drawn from the head of the Taylor cone. As the jet flows away from the Taylor cone in a nearly straight line, the travelling liquid jet is subject to a variety of forces such as Coulomb force, the electric force caused by an external electric field, viscoelastic force, surface tension force, gravitational force, and air drag force, which create bending instability that draws the liquid jets into nanofibers.

The use of an electrospinning apparatus also differs from the use of the apparatus 300 in that the major steps of rotary electrospinning are limited to depositing a liquid/polymer (solution/polymer) melt onto a rotating disk, generating a thin film on the disk, generating liquid ligaments at the edge of the disk, and drawing liquid ligaments into thin nanofibers.

Figure 4:
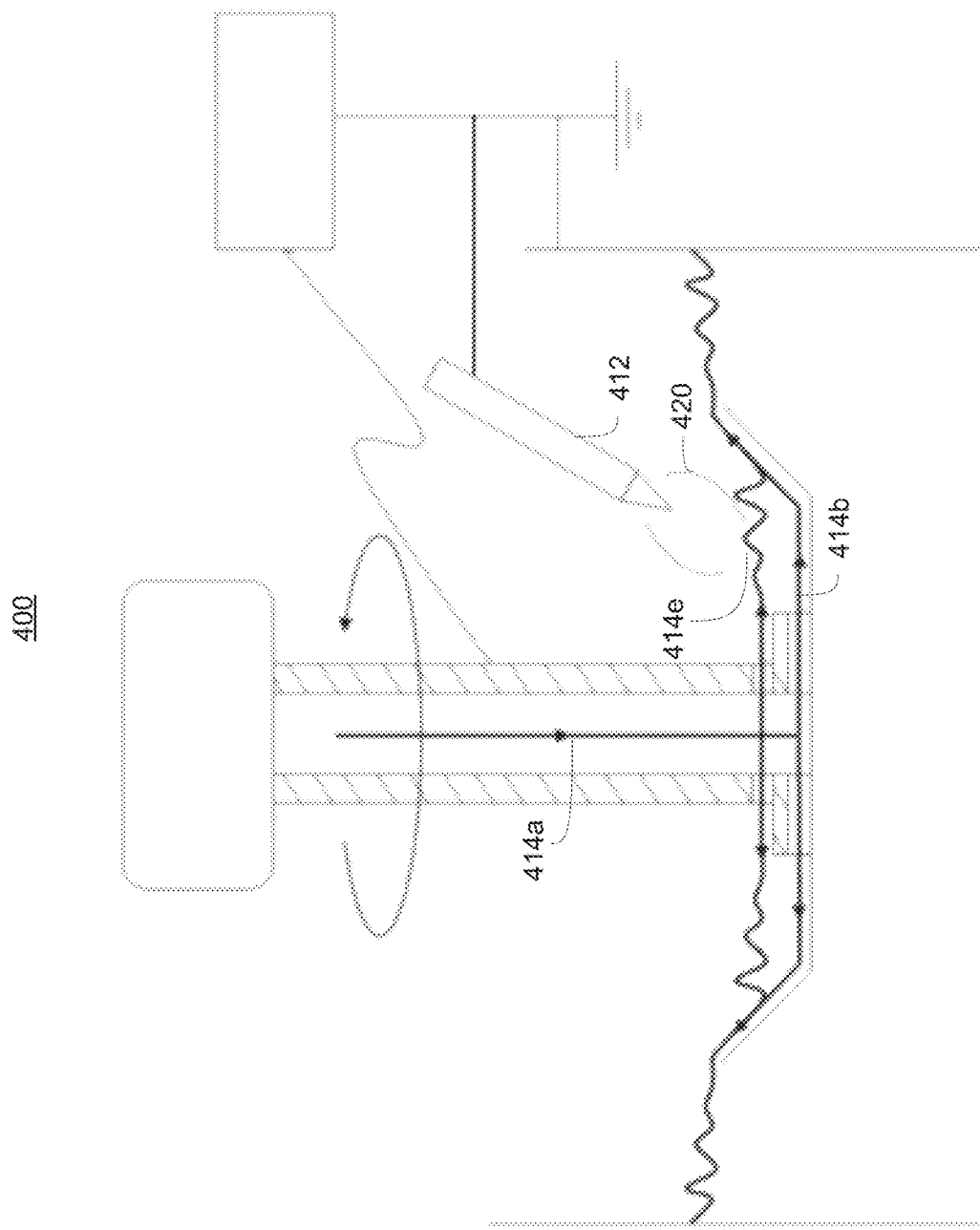
FIG. 4 is an elevation view of an apparatus for mixing and dispersing a dispersed phase in a medium, and showing a thin film and projectile path, according to some embodiments.

Referring to FIG. 4, there is shown an apparatus 400 for mixing and dispersing a dispersed phase in a medium. FIG. 4 depicts an alternate technique for using an interfacial dispersion device to make the medium receptive, according to some embodiments.

A receptive medium may be generated from a thin film 414b similarly to the then film 314b in FIG. 3. Additionally, a receptive medium may be generated from projectiles 414e formed from the medium 414a.

The aerosolized constituents 420 may be deposited from the atomizing apparatus 412 into the film 414b and/or the projectiles 414e. In this case, the film 414b and/or the projectiles 414e may both constitute the receptive medium.

Figure 5:
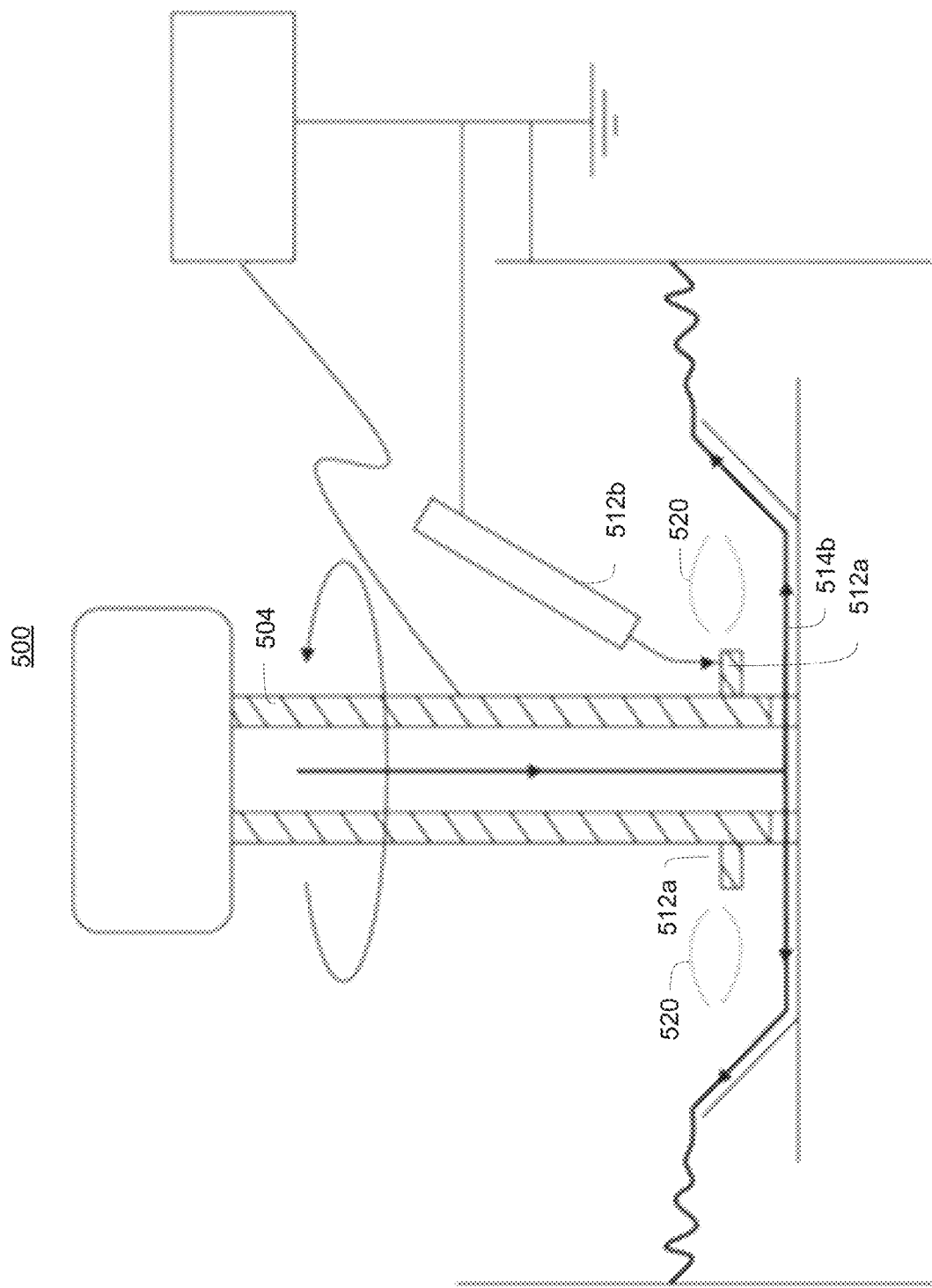
FIG. 5 is an elevation view of an apparatus for mixing and dispersing a dispersed phase in a medium, having a rotating atomizing surface, according to some embodiments.

Referring to FIG. 5, there is shown an apparatus 500 for mixing and dispersing a dispersed phase in a medium, using a rotating surface as an atomizing apparatus, according to some embodiments. FIG. 5 depicts an alternate technique for using an interfacial dispersion device to generate aerosolized constituents from the dispersed phase, according to some embodiments.

In order to produce aerosolized constituents from the dispersed phase, the dispersed-phase mixture may be deposited as a colloid/suspension onto a rotating surface 512a coupled to the drive shaft 504. The dispersed-phase mixture may be deposited from an ejector 512b, which may or may not include atomization itself.

The rotating surface 512a aerosolizes the dispersed-phase mixture and can be used to generate aerosolized constituents that are then deposited into the receptive medium 514b.

Figure 6:
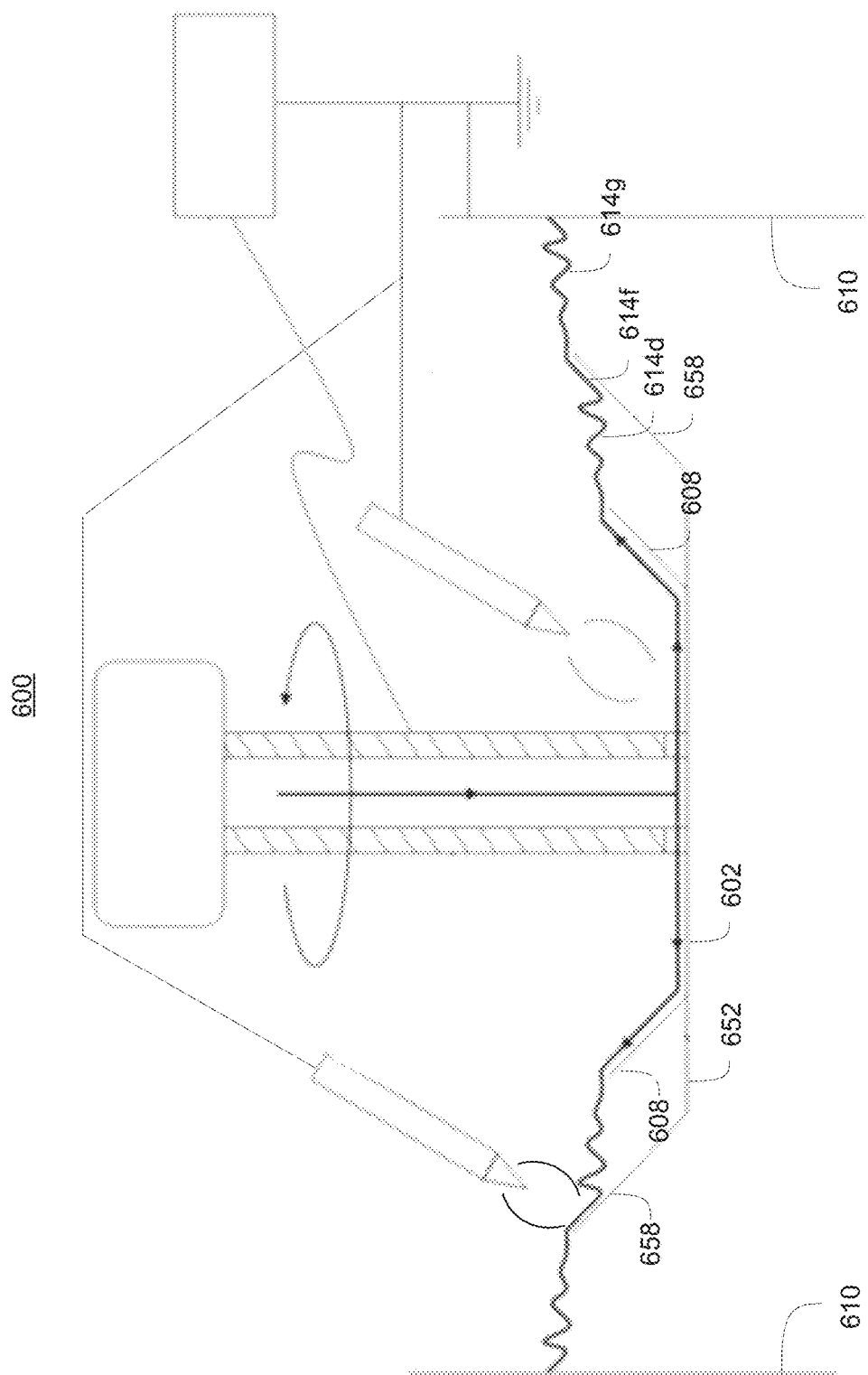
FIG. 6 is an elevation view of an apparatus for mixing and dispersing a dispersed phase in a medium, having two co-planar and co-axial rotating surfaces and two transverse distal surfaces.

Referring to FIG. 6, there is shown an apparatus 600 for mixing and dispersing a dispersed phase in a medium, and, in particular, an interfacial dispersion device using two co-planar and co-axial rotating surfaces and two transverse distal surfaces.

The apparatus 600 comprises a first rotating surface 602 having a transverse distal surface 608, and a second rotating surface 652 having a transverse distal surface 658.

A projectile-receiving location can be defined as a region where projectiles are captured such that they reform a film flow, and/or coalesce onto a collection surface. As shown in FIG. 6, projectiles 614d are formed on the edge of the transverse distal surface 608 of the rotating surface 602. Objects undergo intensive dispersion in projectiles during the flight path, and then the projectiles are captured and reform a film flow on the more distal transverse distal surface 658.

Objects undergo further intensive dispersion in the transverse distal surface 658 film flow 614f. The film flow 614f is subsequently ejected from the edge of the transverse distal surface 658 as projectiles 614g, subjecting the objects to further intensive dispersion.

The projectiles are captured and coalesce as a bulk heterogeneous compound on a collection surface 610.

Figure 7:
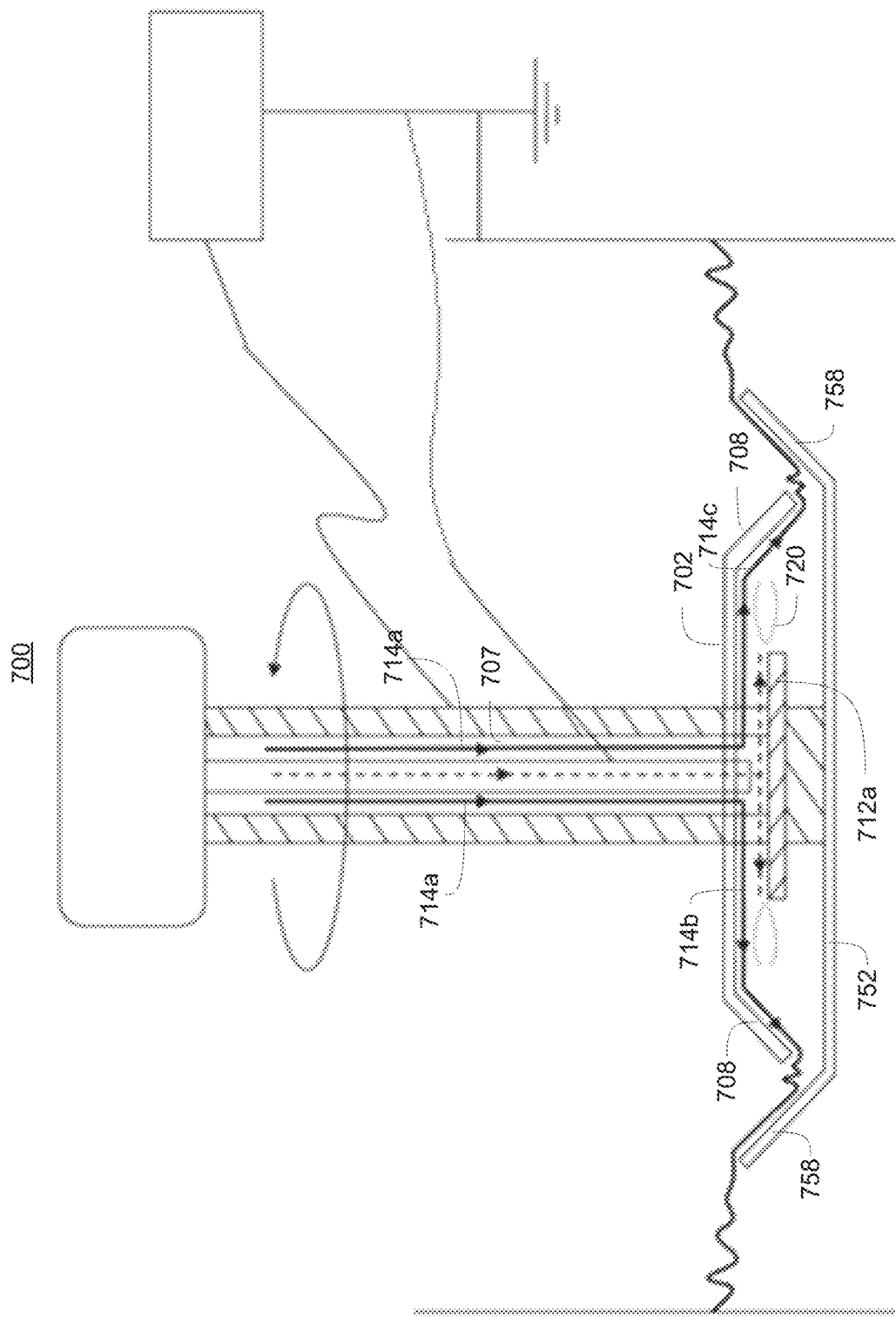
FIG. 7 is an elevation view of an apparatus for mixing and dispersing a dispersed phase in a medium, having two rotating surfaces, where the first rotating surface is inverted over the second rotating surface, according to some embodiments.

Referring to FIG. 7, there is shown an apparatus 700 for mixing and dispersing a dispersed phase in a medium. In particular, FIG. 7 shows an interfacial dispersion device that uses a first rotating surface that is inverted over a second rotating surface.

FIG. 7 shows a configuration for a closed-flow path. A first rotating surface 702 is inverted over a second rotating surface 752. The first rotating surface 702 has a transverse distal surface 708 that extends down from the rotating surface 702; and the second rotating surface 752 has a transverse distal surface 758 that extends up from the rotating surface 752.

As indicated by the arrows, the medium 714a flows from the medium feed conduit 707 and forms a film 714b on the bottom face of the rotating surface 702.

The apparatus 700 also includes a rotating atomizing surface 712a, located between the rotating surface 702 and the rotating surface 752.

Aerosolized constituents 720 of the dispersed phase are formed from the rotating atomizing surface 712a, and are deposited on the bottom face of the rotating surface 702 to form the compound 714c.

Figure 8:
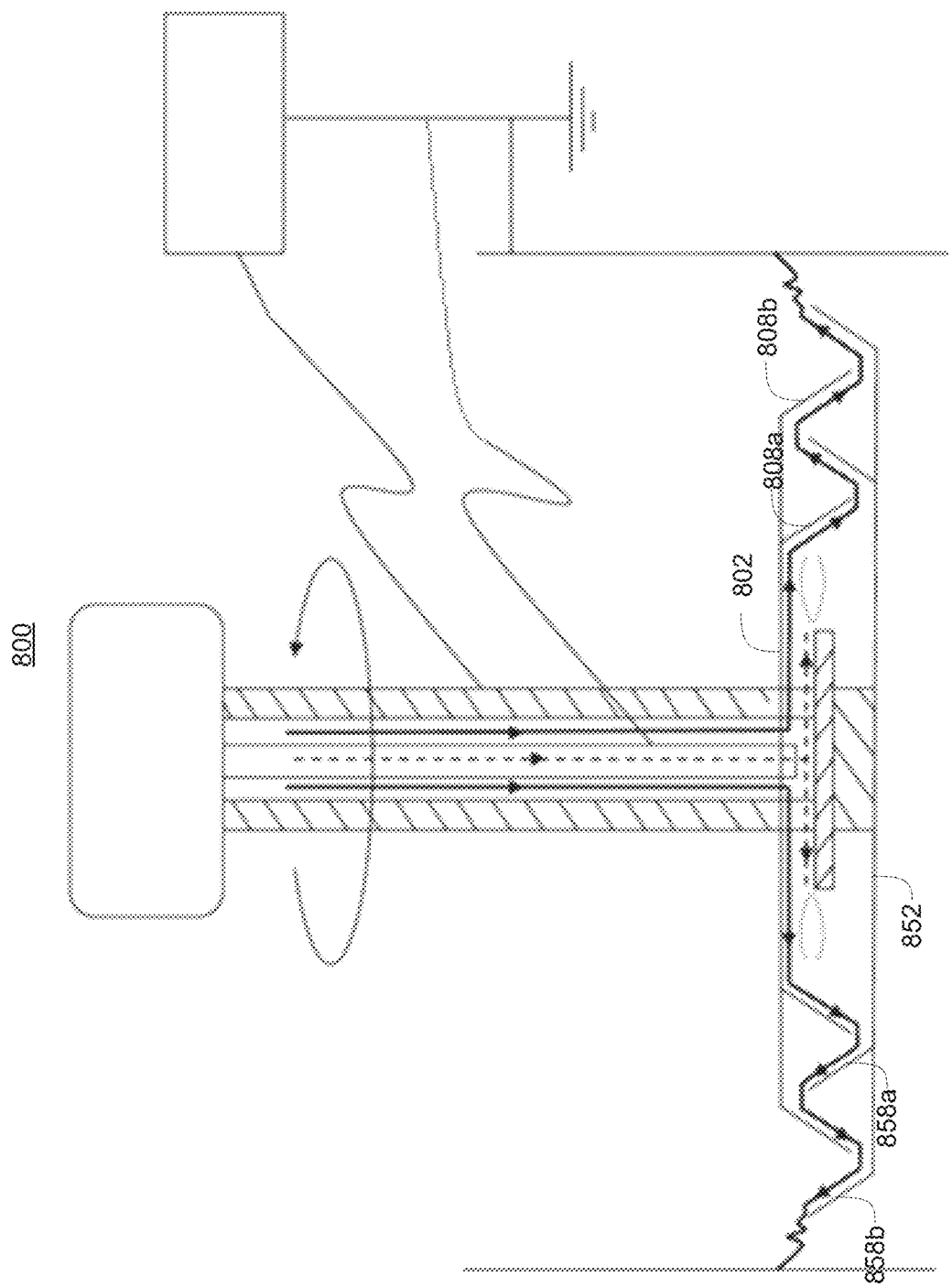
FIG. 8 is an elevation view of an apparatus for mixing and dispersing a dispersed phase in a medium, having two rotating surfaces, where each rotating surface has two transverse distal surfaces, and the first rotating surface is inverted over the second rotating surface, according to some embodiments.

Referring to FIG. 8, there is an apparatus 800 for mixing and dispersing a dispersed phase in a medium. In particular, FIG. 8 shows an interfacial dispersion device that uses a first rotating surface with two transverse distal surfaces inverted over a second rotating surface having two transverse distal surfaces, according to some embodiments.

It should be noted here that, in comparison with the apparatus shown in FIG. 6, two co-planar and co-axial rotating surfaces each having a transverse distal surface (as in FIG. 6) are the same as one rotating surface having two transverse distal surfaces.

FIG. 8 shows a configuration for a closed-flow path with multiple surfaces. A first rotating surface 802 is inverted over a second rotating surface 852. The first rotating surface 802 has two transverse distal surfaces 808a and 808b. The second rotating surface 852 has two transverse distal surfaces 858a and 858b.

As shown by the arrows, the flow path in FIG. 8 is from a medium, to a medium film on the bottom face of the rotating surface 802 (where deposition of the aerosolized dispersed phase occurs), to the first transverse distal surface 808a of the rotating surface 802, to the first transverse distal surface 858a of the rotating surface 852, then back to the rotating surface 802, and then from the transverse distal surface 808b of the rotating surface 802 to the transverse distal surface 858b of the rotating surface 852.

Figure 9:
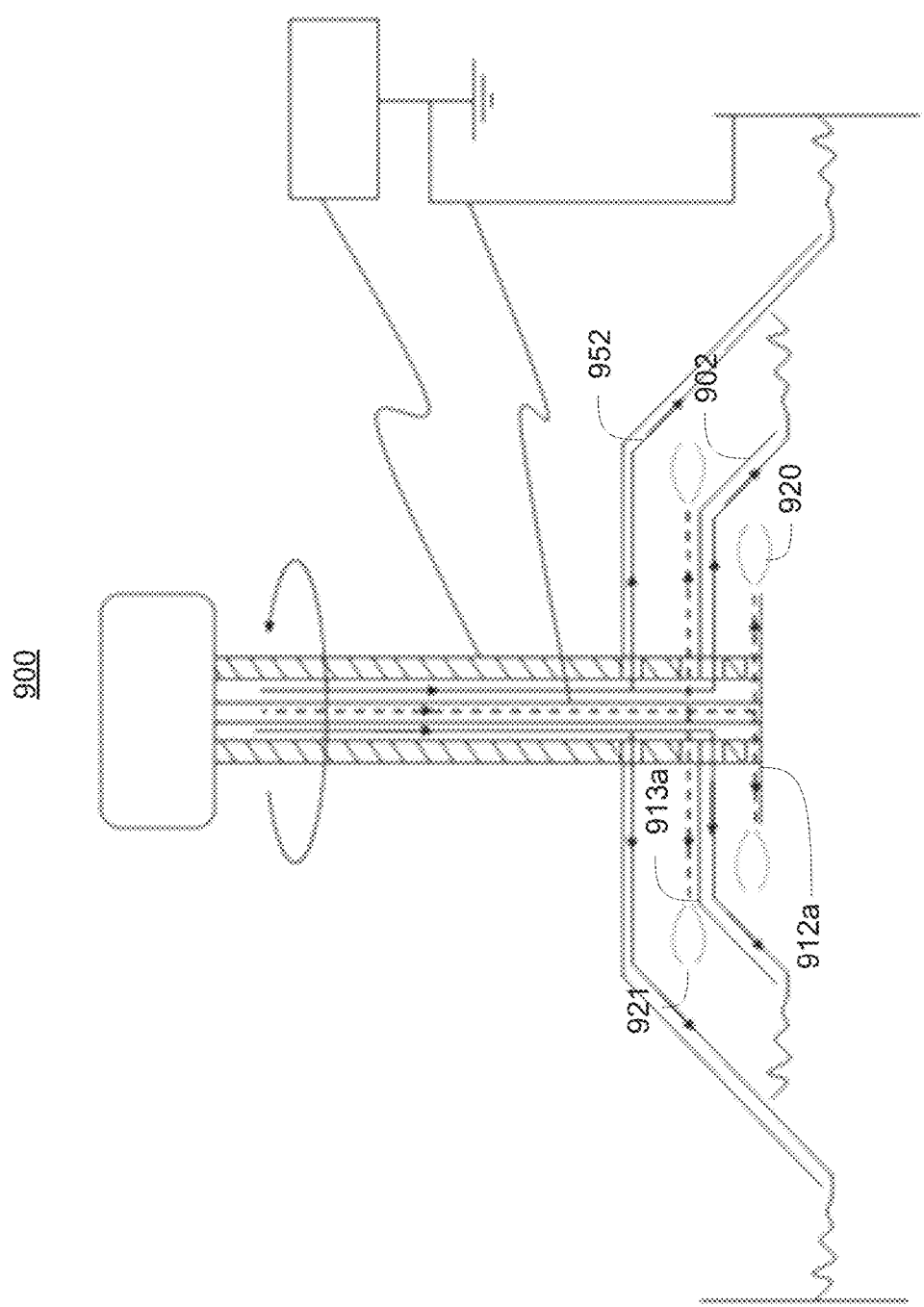
FIG. 9 is an elevation view of an apparatus for mixing and dispersing a dispersed phase in a medium, having two inverted rotating surfaces, according to some embodiments.

Referring to FIG. 9, there is an apparatus 900 for mixing and dispersing a dispersed phase in a medium. In particular, FIG. 9 shows an interfacial dispersion device that uses two inverted rotating surfaces. FIG. 9 shows a configuration for an open-flow path with multiple surfaces.

A first rotating surface 902 is inverted underneath a second inverted rotating surface 952. A rotating atomizing surface 912a is located under the rotating surface 902 for producing aerosolized constituents 920.

In order to produce aerosolized constituents 921 for deposition into the film flow on the bottom face of the rotating surface 952, the top face of the rotating surface 902 is used as a rotating atomizing surface 913a.

As indicated by the arrows in FIG. 9, the medium is applied to the bottom face of each of the rotating surfaces 902 and 952. Aerosolized constituents 920 are deposited into the medium film on the bottom face of the rotating surface 902, and aerosolized constituents 921 are deposited into the medium film on the bottom face of the rotating surface 952. Projectiles from the transverse distal surface of the rotating surface 902 are collected by the rotating surface 952 for further dispersion.

Figure 10:
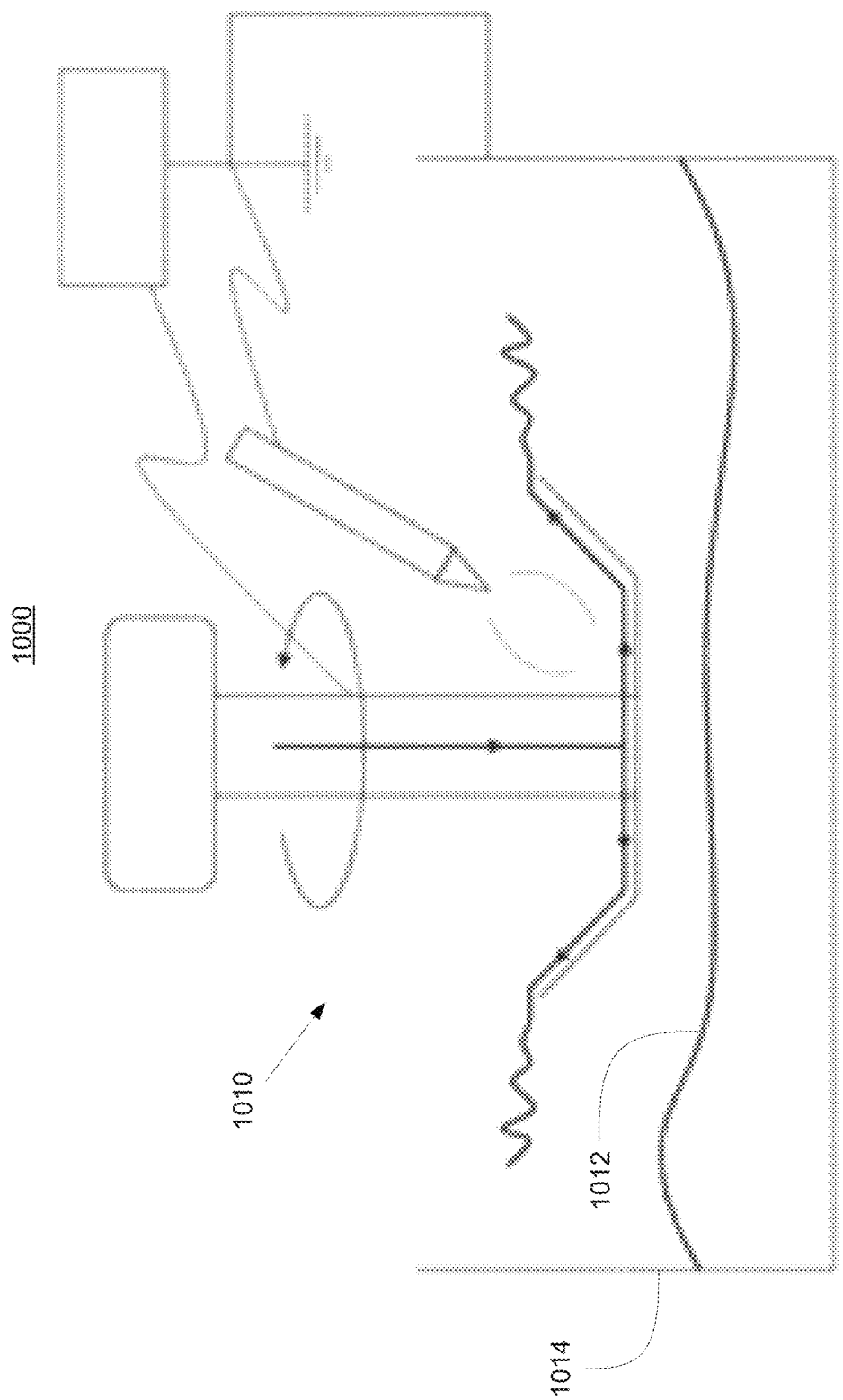
FIG. 10 is an elevation view of an apparatus for mixing and dispersing a dispersed phase in a medium, having a collection reservoir, according to some embodiments.

Referring to FIG. 10, there is an apparatus 1000 for mixing and dispersing a dispersed phase in a medium.

A single interfacial dispersion device 1010 can be used to produce compounds by accumulating the compound material 1012 in a reservoir 1014 in a batch, semi-continuous, or continuous production/collection manner. The embodiment shown in FIG. 10 is indicative of embodiments that pertain to compounds that generate ligament/film and/or droplet/solid aerosol projectiles.

Figure 11:
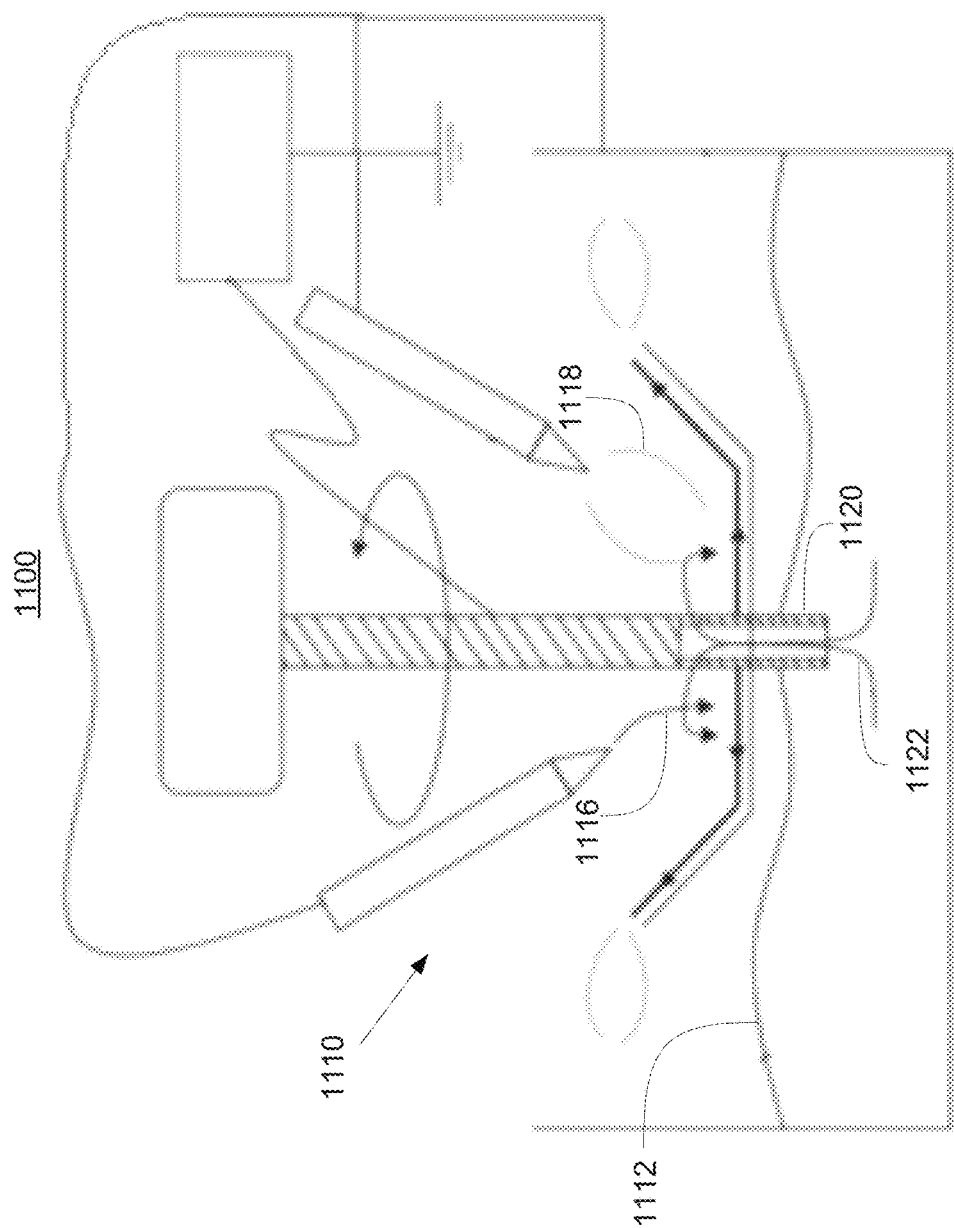
FIG. 11 is an elevation view of an apparatus for mixing and dispersing a dispersed phase in a medium, having a recirculating loop, according to some embodiments.

Referring to FIG. 11, there is an apparatus 1100 for mixing and dispersing a dispersed phase in a medium. The embodiment shown in FIG. 11 is indicative of embodiments that pertain to the generation of droplet projectiles.

The medium 1116 and dispersed-phase aerosolized constituents 1118 are deposited onto the rotating surface of the interfacial dispersion device 1110. A hub 1120 protrudes into the collected material 1112. A low-pressure region is generated near the base of the hub 1120, for instance, by a rotating vane blade, thereby sucking the accumulation material up the hollow portion of the drive shaft.

A recirculating loop 1122 is created, whereby the accumulated material is sucked up and re-deposited on the rotating surface for further dispersion by increasing the dispersion residence time.

The embodiments depicted in FIG. 3 through to FIG. 11 include one or two rotating surfaces in various configurations. These embodiments provide examples of these various configurations. It should be appreciated that other embodiments can be configured to include more than two rotating surfaces in various configurations. There is no particular limit to the number of rotating surfaces that can be used.

Referring to FIG. 12, there is shown a method 1200 for mixing and dispersing a dispersed phase in a medium, according to some embodiments.

According to some embodiments, the method 1200 may be performed using the interfacial dispersion technology, apparatus, and systems previously described. According to other embodiments, the method 1200 may be performed by other technology, apparatus, and systems, such as those having a rotating surface for spinning (mixing).

The method 1200, as shown, assumes that the dispersed phase and the medium have already been prepared. The dispersed phase may comprise an external-phase carrier fluid (e.g. liquid, gas, or air), and an internal phase of fillers and/or additives.

At step 1210, the medium is applied to the rotating surface (for example, the rotating surface of an interfacial dispersion apparatus). The rotating surface may be used to make the medium receptive (i.e. generate a "receptive medium") for combining with the dispersed phase. A receptive medium may be generated by forming a thin film of the medium, and/or forming projectiles from the medium or medium thin film.

Whether or not a thin film (alone) is formed from the medium, or a thin film and projectiles are formed, or projectiles are formed from a thin film, may be determined by the composition and type of the medium, the composite/compound to be produced, etc.

According to some embodiments, the steps of forming a thin film and/or forming projectiles may not be necessary. At step 1212, the medium is spun on the rotating surface in order to form a thin film of the medium. At step 1214, projectiles are formed from the medium. The projectiles may be formed at step 1214 either from the thin film formed at step 1212, or directly from the medium from step 1210, or both.

Projectiles are described here as including: ligaments; films; droplet; and solid aerosols. Ligaments and films are generated when the external phase of the medium is a viscoelastic material, such as a polymer. Ligaments are continuous, amorphous filament-shaped structures. When the flow rate (e.g. of the medium) exceeds conditions necessary for ligament formation, two-dimensional sheet-like films are generated. Droplets are spheroid-shaped or spherical-shaped aerosolized objects that are generated when the external phase of the medium exhibits Newtonian-like behavior (e.g. in the case of water or a solvent). Solid aerosols are a colloid of fine solid particles in air or another gas that are generated when the medium includes solid objects and the external phases are either a gas, air, or a liquid that are removed (e.g. evaporated) prior to the instance when the projectiles are formed.

At step 1216, the prepared dispersed phase is fed to an atomizing apparatus. The dispersed phase is aerosolized and, at step 1218, the constituents ("aerosolized constituents") are deposited into the receptive medium. The dispersed phase is aerosolized to cause distribution and dispersion of the objects upon combining with the receptive medium.

According to some embodiments, in addition to, or instead of depositing aerosols into the receptive medium, continuous fibers (e.g. produced via electrospinning) can be deposited into the receptive medium.

The aerosolized constituents consist of a plurality of micro and/or nano objects (e.g. additives and/or fillers) in solid, liquid, and/or gas physical states. Liquid-phase aerosolized constituents (e.g. carrier fluid and/or additives) may be removed (e.g. evaporated) in their entirety, or partially, or they may be deposited into the receptive medium.

The combination of aerosolized constituents deposited into the receptive medium (collectively, the "composite" or the "compound") results in a compound with an external phase that was the external phase of the medium, while the internal phase of the compound (the "compound constituents") comprise a consolidation of the internal phases of the dispersed phase and the internal phases of the medium.

According to some embodiment, and/or the particular composition of the dispersed phase, the external phase of the dispersed phase may partially or entirely evaporate. Evaporation may also occur during the thin-film stage.

At 1220, a film is formed from the compound (or composite). The film of the compound is formed by way of shear and extensional flow deformation induced by forces (e.g. centrifugal force) and physical properties of the compound (e.g. surface tension, viscosity). Formation of the thin film and dispersion of the compound constituents therein may be performed at room temperature, an elevated temperature, or any other temperature.

According to some embodiments, projectiles may also be formed from the compound (or composite) at step 1222. The formation of projectiles from the compound is generally similar to the formation of projectiles previously described for the projectiles formed from the medium.

Projectiles are generated by ejecting the compound from the region where the film flow develops, which is deemed an "ejection location". The projectiles subsequently traverse a region (the "flight path" or "projectile path") from the ejection location to a receiving location. The receiving location can be defined as a region where projectiles are either deposited and reform a film flow region similar to the ejection location, or are captured by a collection surface to form a bulk, dispersed heterogeneous compound.

At step 1224 (in the case when projectiles are not formed from the composite/compound), or at step 1226 (in the case when projectiles are formed from the composite/compound), an electric field and/or magnetic field may be generated across the projectile path ("flight path"), for example, from the ejection location to the receiving location. The projectiles and surrounding region in which the projectiles travel can be at room or elevated temperature, or any other temperature. An elevated temperature can be supplied by quiescent or convective sources, by inductive heating methods, or any other heating methods.

The region surrounding the projectiles during their flight path can be air or any other gas (e.g. Nitrogen, Argon, $CO_2$), vapor of any other substance (e.g. steam, solvent vapor, chemical vapor), and/or aerosolized environment.

Liquid-phase constituents (e.g. liquid carrier fluids, solvents, and processing aids) that still remain at the instance of projectile formation may or may not be removed (e.g. evaporated) partially or in their entirety during the projectile flight path.

At steps 1228 and 1230, the film and/or projectiles of the compound are collected, for example, on a collection surface, to form a bulk, dispersed heterogeneous compound.

According to some embodiments, steps 1232 and 1234 may be employed in order to recirculate the collected projectiles and film back into the dispersion process. For example, according to some embodiments, the collected projectiles and/or film may be introduced or substituted in place of the medium, which could take place: a) on the rotating surface (e.g. step 1210); b) within the medium thin film (e.g. step 1212); c) within the medium projectiles (e.g. step 1214); or d) within the compound film (e.g. step 2020) in order to provide for additional distribution and dispersion, as well as external-phase evaporation.

Referring to FIG. 13, there is shown a method 1300 for mixing and dispersing a dispersed phase in a medium, according to some embodiments. The method 1300, as shown, assumes that the dispersed phase and the medium have already been prepared.

At step 1310, the medium is made receptive, such as by forming a thin film and/or projectiles.

At step 1312, the dispersed phase is aerosolized or atomized in order to promote object dispersion and distribution upon combination with the receptive medium. For example, aerosolization or atomization may be accomplished with an aerosol or atomizing apparatus such as a spray jet (e.g. nozzle), or a rotating surface. According to some embodiments, the step of aerosolizing the dispersed phase may comprise applying aerosolized dispersed phase from a spray jet onto a rotating atomizing surface.

At step 1314, the aerosolized constituents of the dispersed phase are deposited into the receptive medium in order to form a composite or compound.

At step 1316, a film (e.g. thin film) of the compound is generated. For example, this may be accomplished by applying the compound to a rotating surface, or otherwise inducing shear and/or extensional flow deformation.

At step 1318, projectiles may be formed from the compound, such as has been generally described above.

According to some embodiments, an electric field, magnetic field, and/or an electromagnetic field may be applied across the compound. For example, at step 1320, a field may be applied across a film of the compound, and at step 1322, a field may be applied across the projectile path of the compound projectiles. For example, any combination of positive and negative voltages can be applied across the rotating surfaces and the atomizing devices, such as to control the trajectories of the projectiles as well as the dispersion and distribution of the aerosolized constituents.

At steps 1324 and 1326, the compound film and/or projectiles are collected, and a bulk, dispersed heterogeneous compound may be obtained.

According to some embodiments, steps 1328 and 1330 may be employed in order to recirculate the collected projectiles and film back into the dispersion process, such as by introduction to the medium or receptive medium at step 1310 or the film of the composite or compound at step 1316.

The apparatus and methods described above can be used for the dispersion of compound constituents in various types of projectiles. A few cases are provided here, by way of example.

In the case of the dispersion of compound constituents in liquid ligament or film projectiles, the compound constituents are strongly dispersed while undergoing shear and extensional flow deformation during the flight path by subjecting the ligaments or films to all or a subset of the following forces and mechanisms.

Shear and extensional flow deformation occurs during the attenuation of ligaments by centrifugal force, pressure, and/or aerodynamic forces. The electric field and/or the magnetic field may be used to induce further extensional and shear flow deformation during ligament attenuation and film thinning via electro-hydrodynamic forces (e.g. electrostatic, electrophoretic, and/or dielectrophoretic) and/or magnetohydrodynamic forces.

The ligaments or films are then subjected to further deformation via a bending instability that is mainly caused by Coulomb forces with charging of the ligament or film, and/or mechanical forces arising from aerodynamic instability of the ligament and film. This can result in very thin ligaments or films having sub-micron dimensions.

During the flight path, the dispersion can be very significant due to strong extensional and shear flow deformation acting on ligaments or films as they whip, since the velocity can be several times the speed of sound.

Additionally, since the ligament diameter or film thickness is in the nanoscale, charging of objects (e.g. fillers and/or additives) with the same polarity within the ligament or film can result in strong repulsion of the charged objects, which further enhances dispersion.

In the case of the dispersion of compound constituents in aerosol or droplet projectiles (where the compound material is inductive of forming droplets or aerosols), as the compound film approaches the ejection location, the film jets out due to centrifugal force.

Instabilities cause the jets to break down into droplets and/or aerosols. Electro-hydrodynamic, magneto-hydrodynamic, and mechanical forces (e.g. centrifugal or aerodynamic), and physical properties (e.g. surface tension) may cause varicose instability (direct droplet/aerosol emission from the jet), and/or kink-type instability (which is large droplet emissions that subsequently emit jets that resolve into finer droplets). For droplet emissions by varicose and kink-type instabilities, electro-hydrodynamic forces may cause successive sub-jet and satellite droplet emissions.

In the case of the dispersion of compound constituents in solid aerosol projectiles, as the compound mixture approaches the ejection location, the solid aerosols eject from the rotating surface due to the centrifugal force. Electro-hydrodynamic, magneto-hydrodynamic, and mechanical forces subsequently govern the projectile path (aerosol flight path), which are eventually collected on a collection surface. In this case, solid aerosols from different materials are subjected to distributive mixing rather than dispersive mixing.

The apparatus and methods described above can be used for the dispersion of various prepared dispersed phases within various prepared media in order to produce various final compounds or composites. This is illustrated by way of some examples.

For example, a dispersed phase can be prepared by using a solvent (external phase) and fillers (internal phase). A medium can be prepared using a liquid polymer (external phase) and no internal phase. These preparations can result in a polymer-filled composite, such as a silicone composite.

For example, a dispersed phase can be prepared by using air (external phase) and fillers (internal phase). A medium can be prepared using a solvent (external phase) with no internal phase. These preparations can result in a solvent colloid, such as a graphene-water colloid.

For example, a dispersed phase can be prepared by using air (external phase) and fillers (internal phase). A medium can be prepared using a solvent (external phase) and fillers (internal phase). These preparations can result in a filler-filler composite, such as a post-process ceramic composite or an alloy.

For example, a dispersed phase can be prepared by using a solvent (external phase) and a polymer (internal phase). A medium can be prepared using a polymer (external phase) and no internal phase. These preparations can result in a polymer-polymer composite.

As described with reference to FIG. 10, it is possible to couple interfacial dispersion devices with a single collection reservoir. However, in some cases this approach might not be scalable so as to meet mass-production needs.

Instead of coupling an individual collection reservoir with each interfacial dispersion device, it is possible to arrange clusters or arrays of interfacial dispersion devices that share a single consolidated material accumulation and collection. Some examples and embodiments are provided in FIGS. 14-17. The physical state of the compounds in these figures and embodiments are shown for illustrative purposes, but are otherwise interchangeable.

Figure 14:
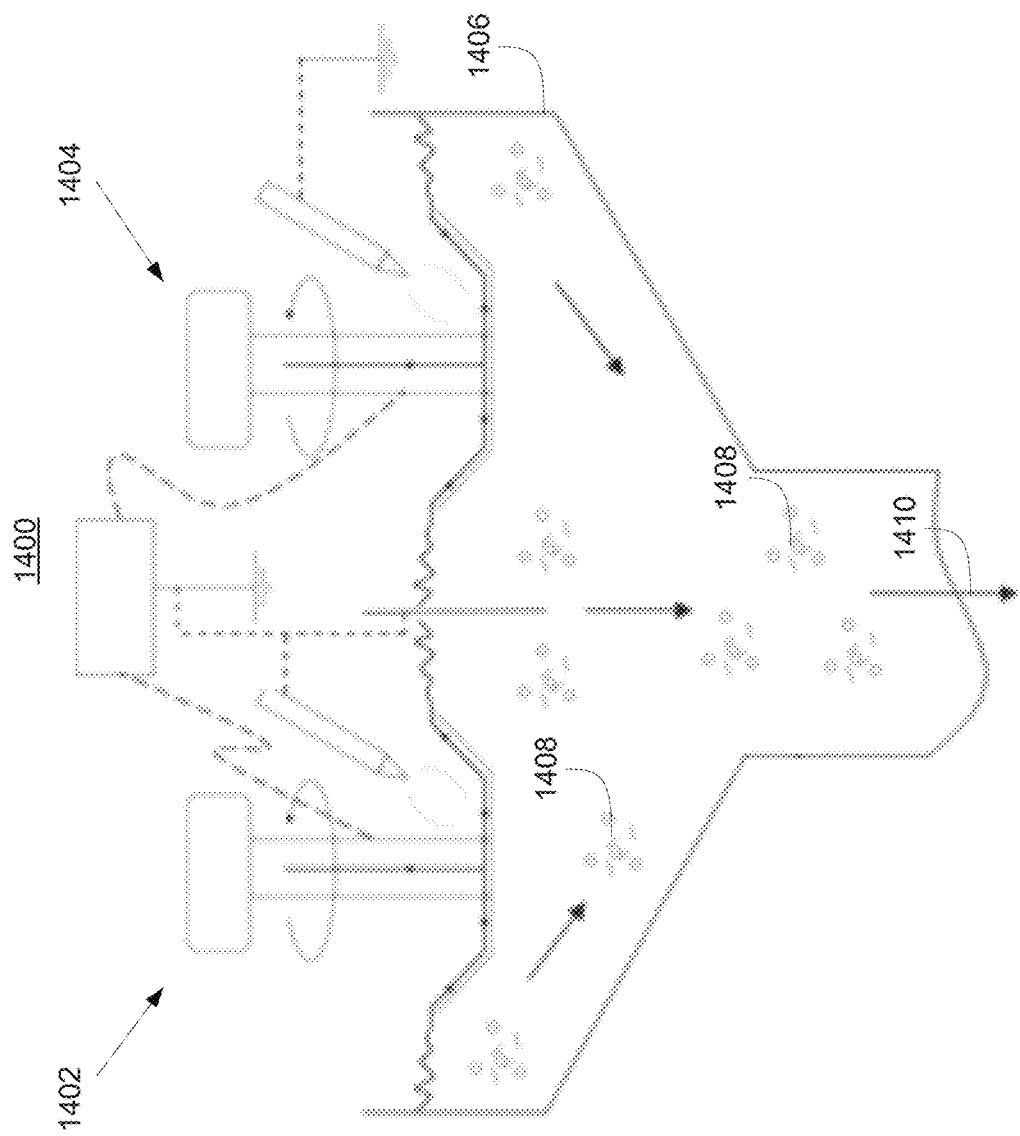
FIG. 14 is an elevation view of a system for producing a compound with a plurality of interfacial dispersion devices, according to some embodiments.

Referring to FIG. 14, there is a system for 1400 producing a compound with a plurality of interfacial dispersion devices. The embodiment shown in FIG. 14 is indicative of embodiments that pertain to compounds that generate projectiles (ligaments/films and/or droplets/solid aerosols) with a solid physical state.

Interfacial dispersion devices 1402 and 1404 are clustered in a duct shroud 1406. The flow path from multiple duct shrouds 1406 may be linked into a duct network.

The interfacial dispersion devices 1402 and 1404 generate solid-state projectiles 1408 that are fluidized by airflow 1410 through the duct, or by way of gravity.

Figure 15:
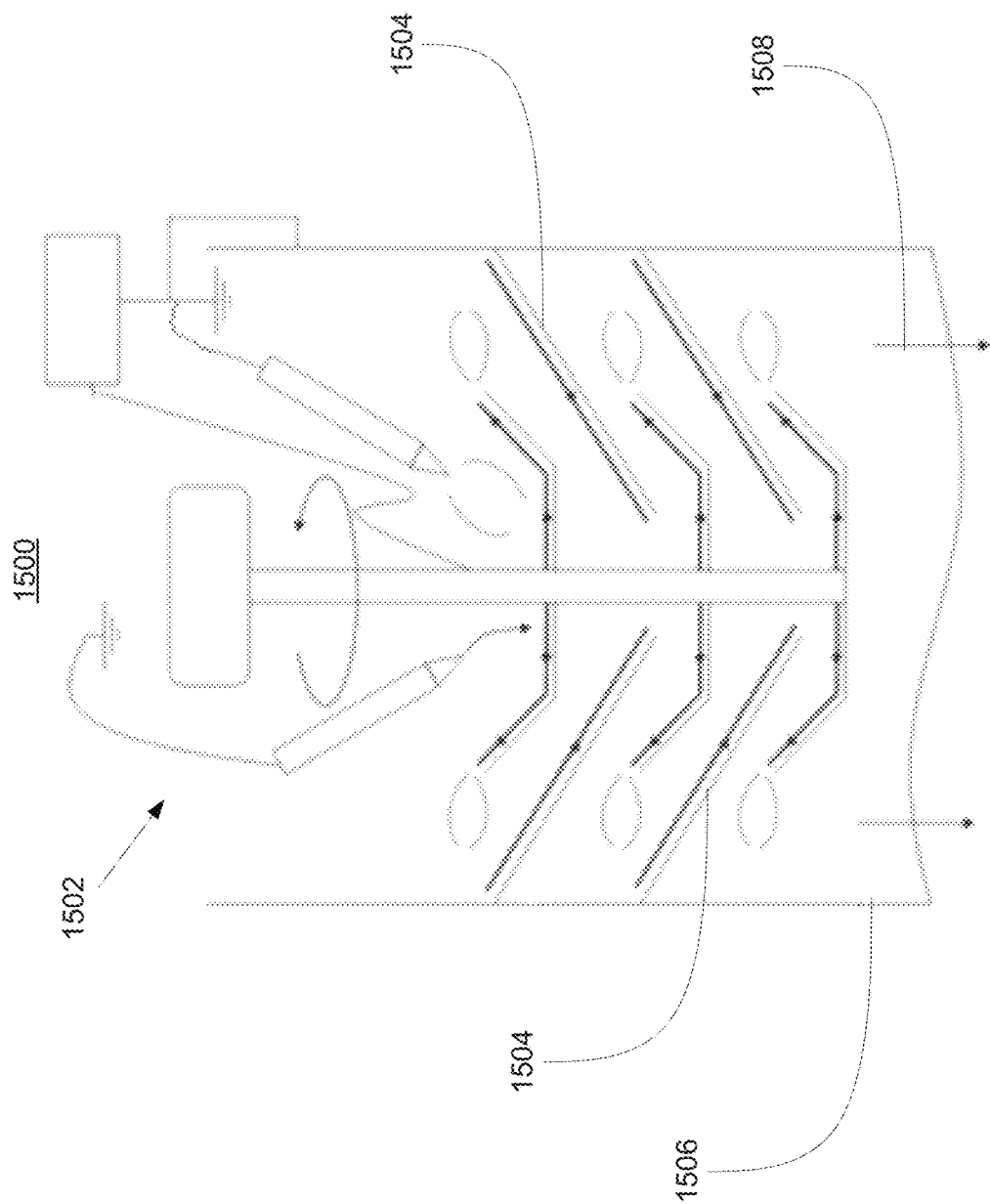
FIG. 15 is an elevation view of a system for producing a compound with a plurality of rotating surfaces in a cascading flow path, according to some embodiments.
Figure 16:
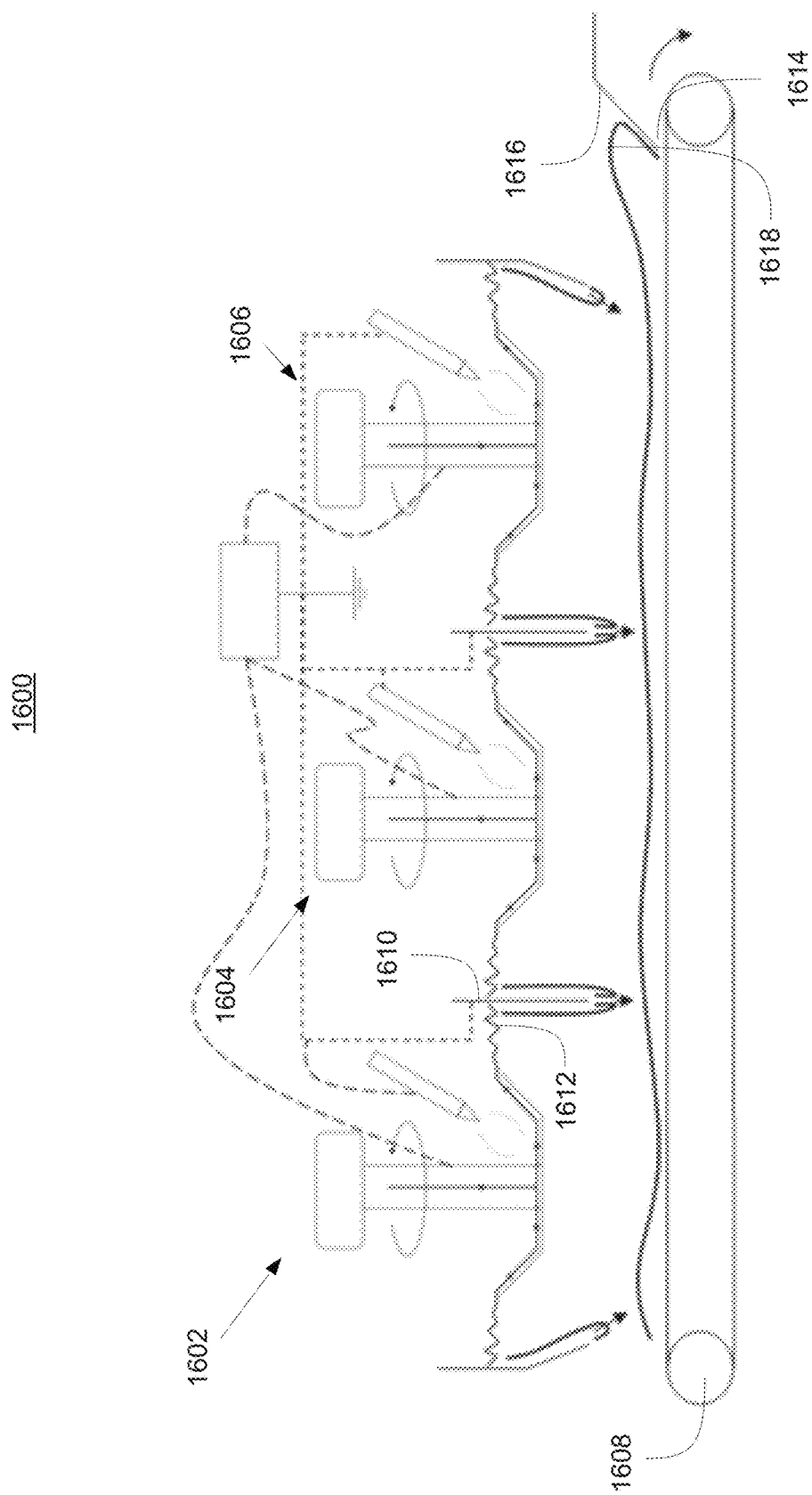
FIG. 16 is an elevation view of a system for producing a compound with a plurality of interfacial dispersion devices and a conveyor, according to some embodiments.

Referring to FIG. 15, there is a system 1500 for producing a compound with a plurality of interfacial dispersion devices. The embodiment shown in FIG. 15 is indicative of embodiments that pertain to collected compounds that exhibit highly-flowable (e.g. Newtonian-fluid) behavior.

In the configuration shown in FIG. 15, a series of interfacial dispersion devices 1502 are separated vertically and coupled to a single drive shaft. The medium and dispersed phase are deposited on the upper-most interfacial dispersion device, which thereby disperses objects therein, and ejects projectiles that are captured by non-rotating angled baffles 1504 connected to the perimeter of a duct 1506.

The accumulated compound is cascaded down to the next interfacial dispersion device where the material is subsequently dispersed, captured by the next baffle 1504, and cascaded further down the duct. The process can be repeated any number of times, for any number of baffles and interfacial dispersion devices.

A gaseous (e.g. air) flow 1508 through the duct 1506 may be used to assist with fluidizing the accumulated compound or enhance the removal (e.g. evaporation) of constituents in liquid physical states. The gas flow may be in a co-flow arrangement (as shown by flow 1508), or in a counter-flow (reverse flow) arrangement.

Referring to FIG. 16, there is a system 1600 for producing a compound with a plurality of interfacial dispersion devices. The embodiment shown in FIG. 16 is indicative of embodiments that pertain to collected compounds that exhibit highly-viscous or viscoelastic behavior (e.g. non-Newtonian fluids).

As shown in FIG. 16, interfacial dispersion devices 1602, 1604, and 1606 may be arranged the lengthwise and/or spanwise directions above a conveyor 1608. Each interfacial dispersion device 1602, 1604, and 1606 may be surrounded by a shroud 1610 to capture radially-ejected projectiles 1612.

The accumulated material flows down or is deflected down the surface of the shroud 1610 and is deposited on the conveyor 1608. The conveyed material may cascade off the terminating end 1614 of the conveyor for further processing.

Additionally, a knife-edge collector 1616 may be used to accumulate material at the terminating end 1614 of the conveyor. A device may be positioned transverse to the direction of the belt motion to push the accumulated material 1618 off the conveyor for further processing.

Referring to FIG. 17, there is a system 1700 for producing a compound with a plurality of interfacial dispersion devices 1702. According to some embodiments, a series of interfacial dispersion devices 1702 are separated vertically and coupled to a single drive shaft 1704. A medium and a dispersed phase may be deposited onto one or more of the interfacial dispersion devices 1702 simultaneously. For example, the medium may be fed through a conduit in the drive shaft and delivered to the rotating surface of each interfacial dispersion device 1702, and the dispersed phase can be aerosolized into the receptive medium on each disk.

Each of the interfacial dispersion devices 1702 disperses objects (e.g. on a rotating surface), and ejects projectiles that are captured by cylindrical baffles 1706.

According to some embodiments, the cylindrical baffles 1706 may be rotating. For example, the cylindrical baffles 1706 may be coupled to the drive shaft 1704, and may be co-rotating with the surfaces of the interfacial dispersion devices 1702.

Captured projectiles reform in a film flow on the surface of the cylindrical baffles 1706, and projectiles may be further re-ejected at the end of the baffles 1706.

During this process, objects may undergo intensive dispersion, and production rates may be increased, according to some embodiments.

The systems and methods described herein have been used in the preparation of various sample compounds and formulations. Eight examples are provided: silica-epoxy formulations; silica-silicone formulations; silica-UDMA formulations; carbon nanotube and epoxy formulations; carbon nanotube-NMP colloids and carbon nanotube-water colloids; boron nitride exfoliation; nanocrystalline cellulose-silicone formulations; and gel formulations. Each of these examples are described in more detail below.

Silica-Epoxy Formulations

Silica-epoxy formulations were made by incorporating multiple silica particle sizes in a cycloaliphatic epoxy resin. Three different silica particle sizes were used: large-micro particles (>10 μm); small-micro particles (between 1 and 5 μm); and fumed-silica nanoparticles (<20 nm).

Five distinct formulations with various filler concentrations are shown in the following table. Two sample sets were prepared with different dispersion techniques. Samples A1 to A5 were prepared using the apparatus, systems and methods described herein. Samples B1 to B5 were prepared using conventional high-shear mixing. For Samples A3 and B3, hydrophilic fumed silica grade Aerosil 300VS (nanoparticles) was used. For Samples A4 and B4, hydrophobic fumed silica grade Aerosil 8200 (nanoparticles) was used. For Samples A5 and B5, Aerosil 8200 and Aerosil 300VS were used in a ratio of 2:1.

| Sample No. | Epoxy resin (wt. %) | Particle concentration (wt. %) | | | Plasticizer and surfactant (wt. %) |
|---|---|---|---|---|---|
| | | large micro | small micro | nano | |
| Sample A1 | 28.5 | 48.7 | 19.0 | 0.0 | 3.9 |
| Sample A2 | 28.5 | 39.2 | 28.5 | 0.0 | 3.9 |
| Sample A3 | 28.5 | 47.7 | 18.5 | 1.5 | 3.9 |
| Sample A4 | 28.5 | 47.7 | 18.5 | 1.5 | 3.9 |
| Sample A5 | 28.5 | 47.7 | 18.5 | 1.5 | 3.9 |
| Sample B1 | 28.5 | 48.7 | 19.0 | 0.0 | 3.9 |
| Sample B2 | 28.5 | 39.2 | 28.5 | 0.0 | 3.9 |
| Sample B3 | 28.5 | 47.7 | 18.5 | 1.5 | 3.9 |
| Sample B4 | 28.5 | 47.7 | 18.5 | 1.5 | 3.9 |
| Sample B5 | 28.5 | 47.7 | 18.5 | 1.5 | 3.9 |

Samples A1 to A5 were prepared using a dispersed phase of silica-ethanol colloid, comprising an external phase of ethanol, and an internal phase of the three grades of silica with a combined concentration of 80 wt. % in the ethanol external phase. Epoxy was used as the medium.

The silica-ethanol colloid (dispersed phase) was pre-mixed using a conventional mechanical mixer (e.g., impeller mixer) and then incorporated into the epoxy (medium) using the apparatus and method of the present invention. The ethanol from the dispersed phase was evaporated during mixing and the silica-epoxy compound with a combined silica concentration of 67.7 wt. % was collected at the collector. The plasticizer and surfactant are incorporated into the silica-epoxy compound using a conventional high-shear mixer.

The viscosity of these samples were measured using a Brookfield viscometer when the samples were subjected to a range of temperatures, as shown in the table below. For Samples B1, B2, B3, and B5, the viscosity exceeded the operable upper-limit of the Brookfield viscometer viscosity range.

| Sample No. | Viscosity at different temperatures (cP) | | |
|---|---|---|---|
| | 22° C. | 40° C. | 60° C. |
| Sample A1 | 78,000 | 46,000 | 28,000 |
| Sample A2 | 188,000 | 120,000 | 56,000 |
| Sample A3 | 84,000 | 52,000 | 28,000 |
| Sample A4 | 56,000 | 38,000 | 12,000 |
| Sample A5 | 80,000 | 42,000 | 22,000 |
| Sample B1 | >1,500,000 | 432,000 | 72,000 |
| Sample B2 | >1,500,000 | 638,000 | 148,000 |
| Sample B3 | >1,500,000 | >1,500,000 | 264,000 |
| Sample B4 | 97,000 | 42,000 | 14,000 |
| Sample B5 | >1,500,000 | 182,000 | 36,000 |

Irrespective of the dispersion technique used to prepare the samples, the results show that the viscosity of all samples decreases with increasing temperature. The viscosity of samples prepared with the new invention (Samples A1 to A5) is consistently lower at all temperatures than the matching samples prepared with conventional mixing (Samples B1 to B5). For instance, at room temperature, the samples prepared with the new invention exhibit a 2 to 15 fold reduction in viscosity compared to the conventionally mixed samples.

The high viscosity of the conventionally mixed samples is a result of severe filler aggregation. The marked reduction in viscosity of the samples prepared with the new invention is a result of breaking the filler aggregates and more uniformly distributing the fillers in the host matrix material.

Silica-Silicone Formulations

Figure 18A:
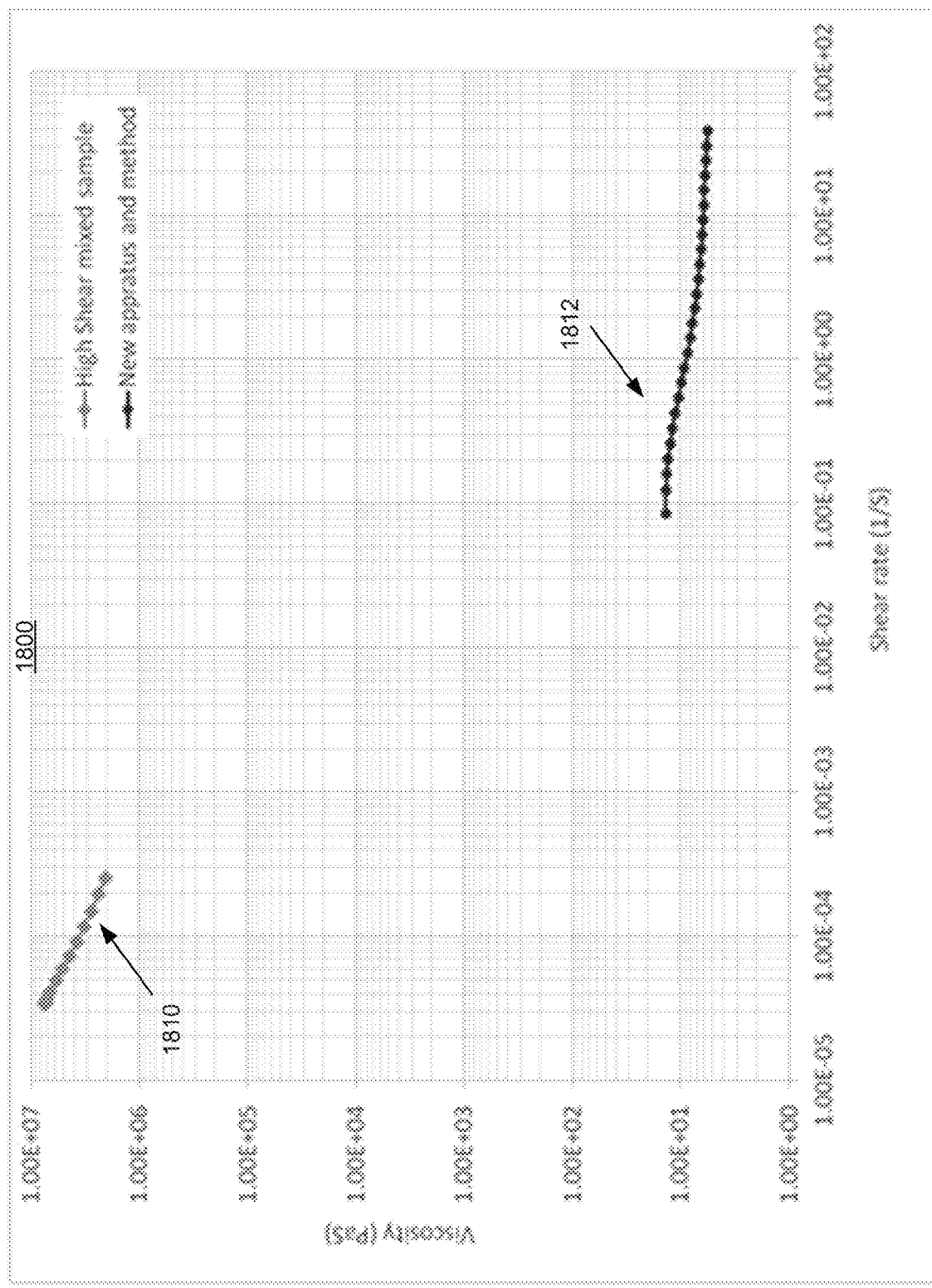
FIG. 18A is a graph showing viscosity profiles for two different samples of silica-silicone compounds in respect of shear rate.
Figure 18C:
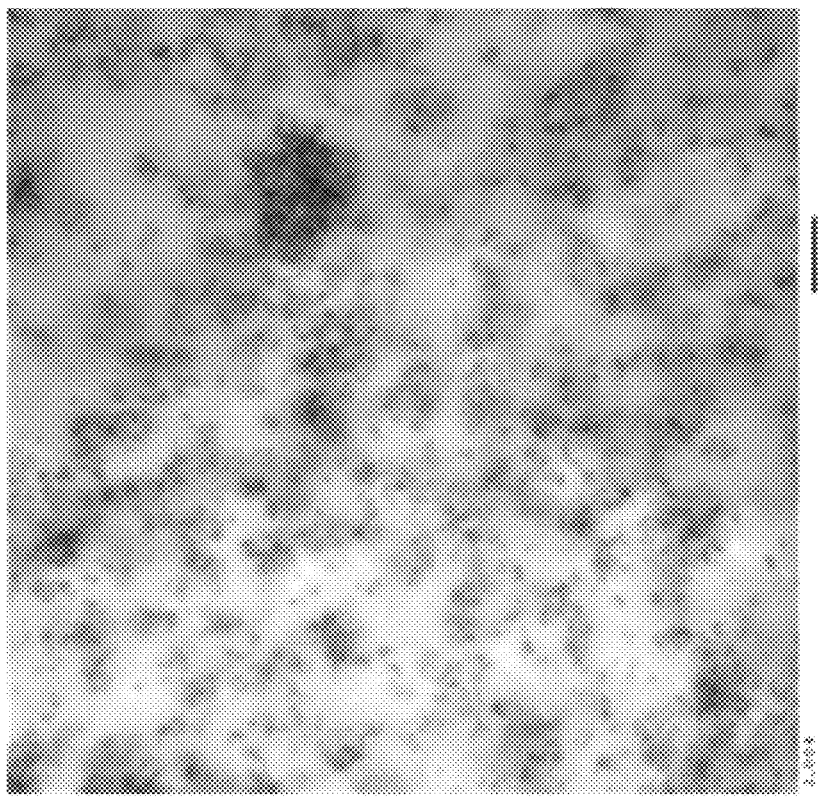
FIG. 18C is a TEM image showing a second sample of silica-silicone microstructures.
Figure 18B:
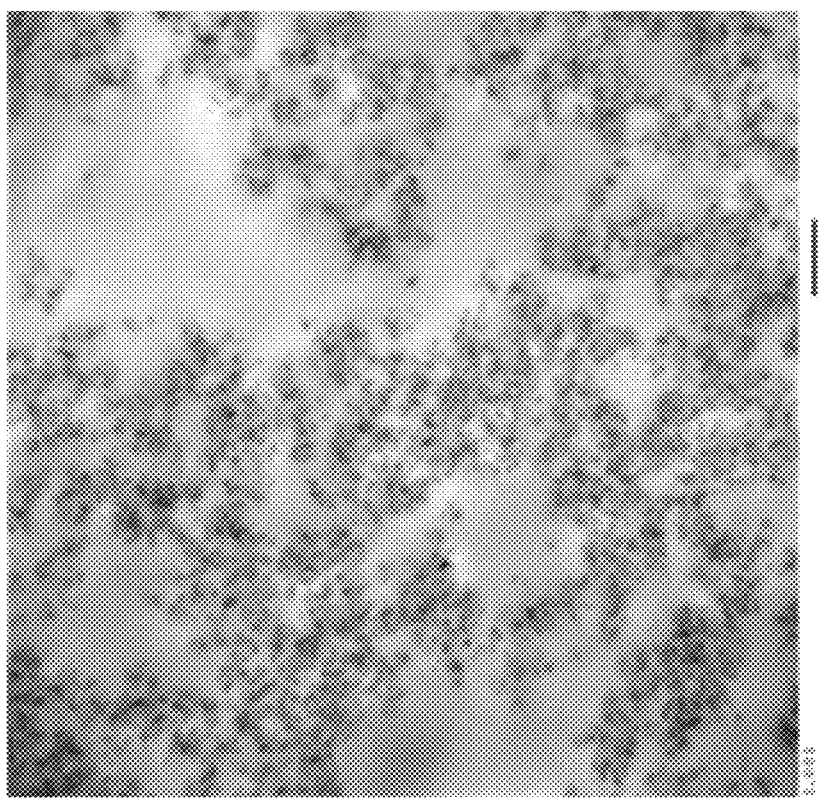
FIG. 18B is a transmission electron microscopy (TEM) image showing a first sample of silica-silicone microstructures.

The silica-silicone formulations are generally described in respect of FIG. 18A to FIG. 18C. In this example, hydrophilic nano fumed silica (Aerosil 200) was incorporated in a silicone elastomer, a hydrophobic host matrix (silicone) that is incompatible with the hydrophilic filler. For comparison, two distinct samples were prepared with a concentration of 10 wt. % nano fumed silica, one prepared with conventional high-shear mixing, and one prepared according to the apparatus, systems and methods described herein.

It is generally understood that nano fumed silica is very difficult to dispersively mix since these fillers tend to severely agglomerate due to their surface energy arising from Van der Waals forces and hydrogen bonding. The severe agglomeration of nano fumed silica causes a significant increase in the composite viscosity as the filler concentration increases in a host matrix, such as silicone elastomer.

The sample prepared according to the apparatus, systems, and methods disclosed herein was prepared using a dispersed phase of silica-methyl ethyl ketone ("MEK") colloid, comprising an external phase of MEK, and an internal phase of nano fumed silica (Aerosil 200) at a concentration of 33 wt. % in MEK. The medium was silicone.

The silica-MEK colloid (dispersed phase) was pre-mixed using a conventional mechanical mixer (e.g., impeller mixer) and then incorporated into the silicone (medium) using the apparatus, systems, and methods disclosed herein. The MEK from the dispersed phase was evaporated during mixing and a silica-silicone compound with a silica concentration of 10 wt. % was collected at the collector.

Referring to FIG. 18A, the is a graph 1800 showing viscosity profiles of the conventional high-shear-mixed sample 1810 and the sample 1812 mixed according to the apparatus, systems, and methods disclosed herein. The samples 1810 and 1812 were measured using a Malvern-Bohlin controlled stress/strain rheometer. For the sample 1810, the addition of nano fumed silica in the silicone elastomer produced a high viscosity gel-like compound with a viscosity sufficiently high that it was immeasurable at shear rates exceeding $10^{-3}$ $s^{-1}$. By comparison, a significant reduction in the viscosity is noted for the sample 1812 prepared with the new dispersion apparatus, systems, and methods.

Referring to FIG. 18B and FIG. 18C, there are shown the silica-silicone microstructure from transmission electron microscopy (TEM) images of samples prepared with the two dispersion techniques. As shown in FIG. 18B, the particles are heavily aggregated in a flocculated network for the conventionally mixed sample, whereas, as shown in FIG. 18C, the sample prepared with the present invention shows much smaller, isolated aggregates instead of chain-like structures.

Silica-UDMA Compounds

In this example, samples consisting of aggregating hydrophobic nano fumed silica (Aerosil R812) were incorporated in a urethane dimethacrylate ("UDMA") host matrix. For comparison, two distinct samples were prepared with a concentration of 10 wt. % nano fumed silica, one prepared with conventional high-shear mixing, and one prepared according to the apparatus, systems and methods described herein.

The sample prepared according to the apparatus, systems, and methods disclosed herein was prepared using a dispersed phase of a silica-ethanol colloid, comprising an external phase of ethanol, and an internal phase of nano fumed silica (Aerosil R812) at a concentration of 21 wt. % in ethanol. The medium was UDMA.

The silica-UDMA colloid (dispersed phase) was pre-mixed using a conventional mechanical mixer (e.g., impeller mixer) and then incorporated into the UDMA (medium) using the apparatus, systems, and methods disclosed herein. The ethanol from the dispersed phase was evaporated during mixing and a silica-UDMA compound with a silica concentration of 10 wt. % was collected at the collector.

Referring to FIG. 19, there is shown a graph 1900 showing viscosity profiles of the conventional high-shear-mixed sample 1910, the sample 1912 mixed according to the apparatus, systems, and methods disclosed herein, and a UDMA sample 1914 without any fillers. The samples 1910, 1912, and 1914 were measured using a Malvern-Bohlin controlled stress/strain rheometer. The viscosity profiles of the unfilled UDMA sample and the sample prepared with the present invention are similar, whereas the viscosity of the conventionally mixed sample is considerably higher due to aggregation of the fillers.

Carbon Nanotube-Epoxy Formulations

The carbon nanotube-epoxy formulations are generally described in respect of FIG. 20A to FIG. 20E. For this example, a sample was prepared according to the apparatus, systems, and methods disclosed herein, without a dispersed phase. The medium comprised an external phase of epoxy, and an internal phase of 5 wt. % of carbon nanotubes. The carbon nanotube-epoxy compound was pre-mixed using a conventional mechanical mixer (impeller mixer), and was then mixed using the apparatus, systems, and methods disclosed herein for 10 minutes, by recirculating the compound through the apparatus.

Carbon nanotubes can be incorporated in a vast range of thermoset resins like silicone, epoxy, polyurethanes, and other polymers. However, the interaction among carbon nanotube structures arising from Van der Waals forces causes carbon nanotubes to aggregate into flocculated carbon nanotube clusters or bundles. Conventional mixing equipment, such as high shear mixers, cannot impart adequate shearing forces to de-agglomerate, or untangle, carbon nanotube bundles, restraining the carbon nanotube concentration in the host matrix. Entanglement is more severe as the carbon nanotube length increases, imposing further difficulty dispersing them.

The results for this example demonstrate that high aspect ratio carbon nanotubes, which are greater than 50 μm in length with unfunctionalized surface chemistry, can be directly untangled with a short mixing duration (5 minutes) in a thermoset resin, like epoxy, using the dispersion apparatus, systems and methods disclosed herein.

Figure 20B:
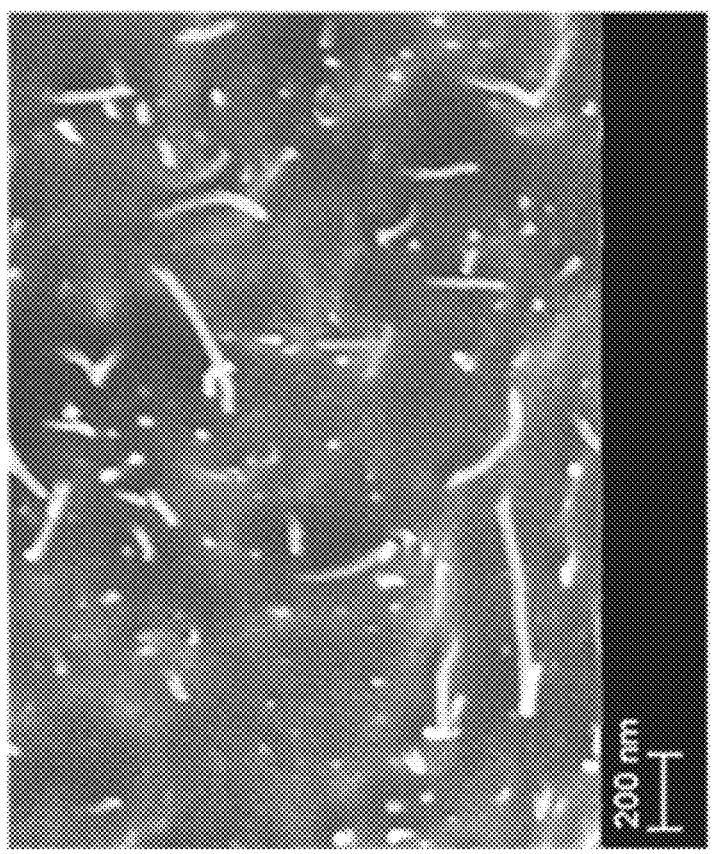
FIG. 20B is a SEM image of the carbon nanotube dispersion in a cycloaliphatic epoxy resin of FIG. 20A shown at a magnification of 20,000.
Figure 20A:
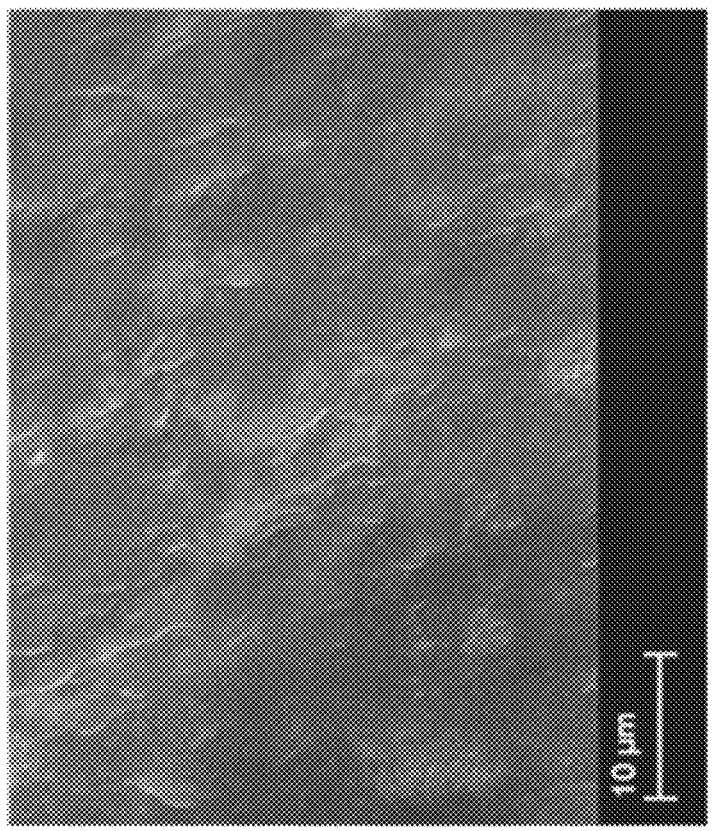
FIG. 20A is a scanning electron microscopy (SEM) image of a carbon nanotube dispersion in a cycloaliphatic epoxy resin shown at a magnification of 1,000.
Figure 20C:
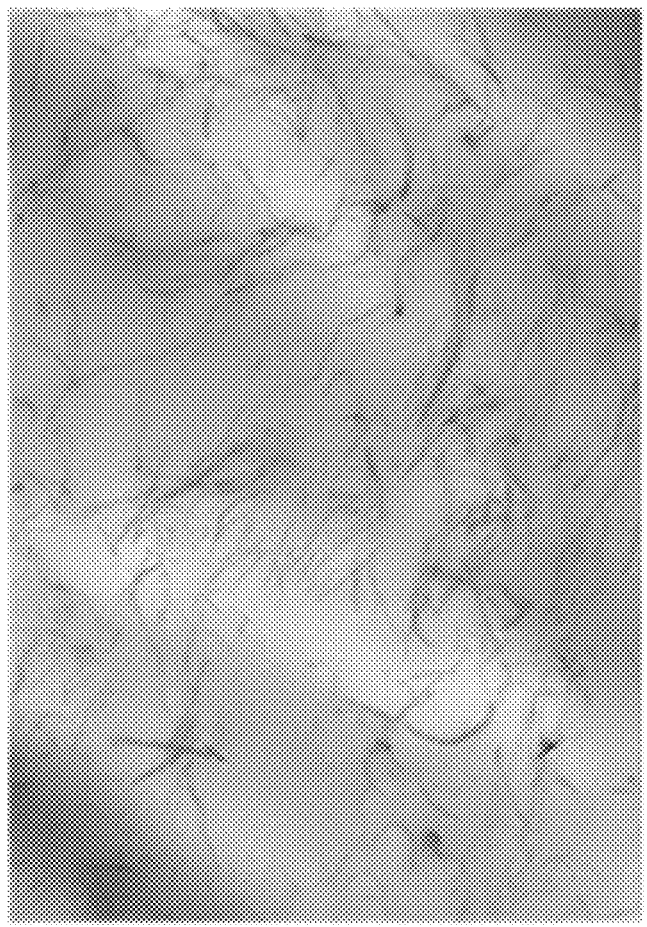
FIG. 20C is a TEM image of the carbon nanotube dispersion in a cycloaliphatic epoxy resin of FIG. 20B.

Referring to FIG. 20A, there is shown a scanning electron microscopy ("SEM") image 2010 of a sample of 5 wt. % carbon nanotubes dispersed in a cycloaliphatic epoxy resin. at a magnification of 1,000. Referring to FIG. 20B, there is shown an SEM image 2010 of the sample at a magnification of 20,000. Referring to FIG. 20C, there is shown a transmission electron microscopy ("TEM") image of the sample at a magnification of 20,000. The images 2010, 2020, and 2030 show that the carbon nanotubes are highly dispersed in the resin, which is evidenced by the presence of single tube structures as small as 50 nm in diameter.

Figure 20D:
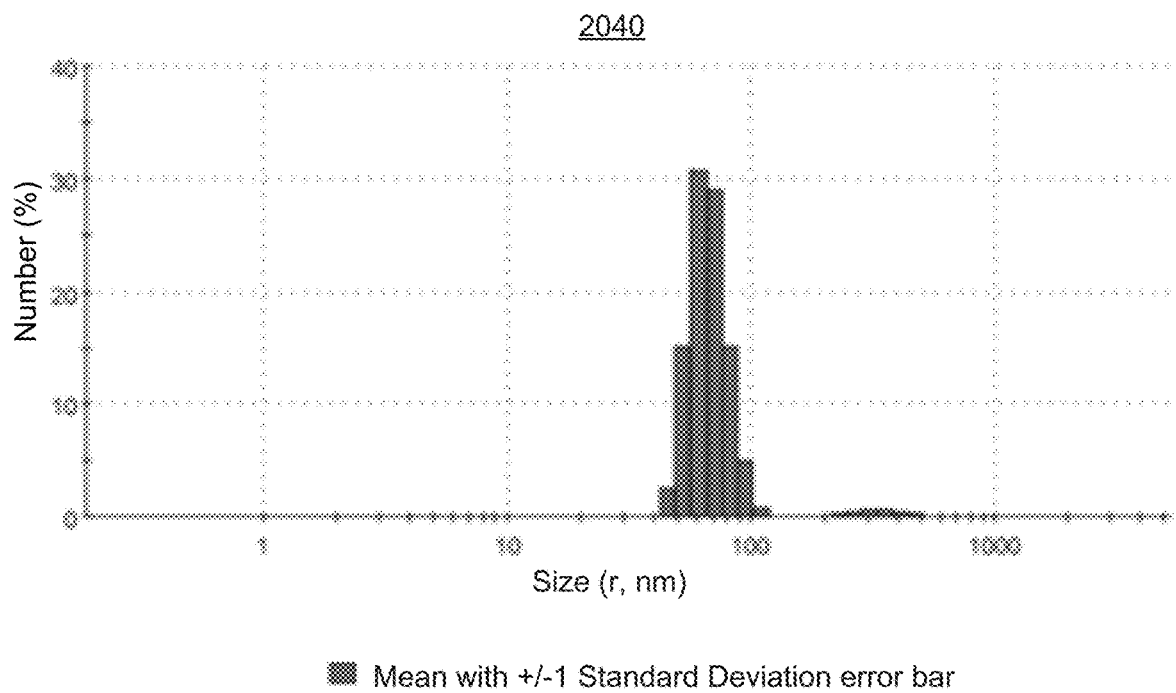
FIG. 20D is a histogram of number-averaged particle size distribution for the nanotube dispersion in a cycloaliphatic epoxy resin of FIG. 20C.

Referring to FIG. 20D, there is shown a histogram 2040 of particle size distribution data obtained from a dynamic light scattering analysis. The dynamic light scattering analysis specimens were prepared by dissolving a small amount (~0.1 g) of the uncured carbon nanotube-epoxy compound in N-Methyl-2-pyrrolidone ("NMP"). The mixture was sonicated for less than 10 seconds using a bath sonicator. The carbon nanotube particle size distribution was measured using Malvern Zetasizer (Model: Nano ZS90). The data pertaining to the histogram 2040 is provided in the table below.

| Size d (nm) | Mean Number (%) |
| --- | --- |
| 45.64 | 2.4 |
| 52.85 | 15.1 |
| 61.21 | 30.7 |
| 70.89 | 29.0 |
| 82.09 | 15.1 |
| 95.07 | 4.9 |
| 110.1 | 0.8 |
| 229.3 | 0.1 |
| 265.6 | 0.3 |
| 307.6 | 0.5 |
| 356.2 | 0.5 |
| 412.5 | 0.4 |
| 477.7 | 0.2 |
| 553.2 | 0.1 |

Figure 20E:
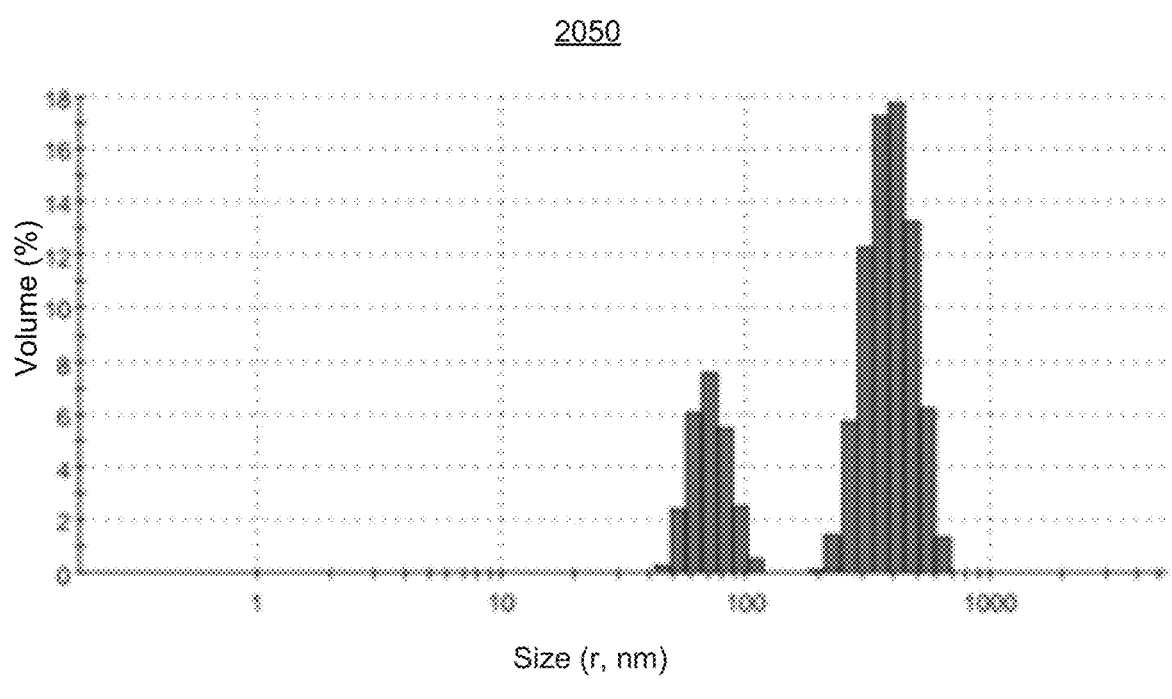
FIG. 20E is a histogram of volume-averaged particle size distribution for the nanotube dispersion in a cycloaliphatic epoxy resin of FIG. 20C.

Referring to FIG. 20E, there is shown a histogram 2050 of volume-averaged data corresponding to the number-averaged data in histogram 2040. The data pertaining to the histogram 2050 is provided in the table below.

| Size d (nm) | Mean Number (%) |
| --- | --- |
| 45.84 | 0.3 |
| 52.85 | 2.4 |
| 61.21 | 6.1 |
| 70.89 | 7.5 |
| 82.09 | 5.5 |
| 95.07 | 2.5 |
| 110.1 | 0.5 |
| 198.0 | 0.1 |
| 229.3 | 1.4 |
| 265.6 | 5.8 |
| 307.6 | 12.3 |
| 356.2 | 17.3 |
| 412.5 | 17.8 |
| 477.7 | 13.2 |
| 553.2 | 6.2 |
| 640.7 | 1.3 |

Carbon Nanotube-NMP Colloids and Carbon Nanotube-Water Colloids

The carbon nanotube-NMP colloids are generally described in respect of FIG. 21A to FIG. 21J, and the carbon nanotube-water colloids are generally described in respect of FIG. 22A to FIG. 22H.

Aside from incorporating and dispersing carbon nanotubes in polymers as taught in the previous example, carbon nanotubes can also be incorporated in a wide range of other host matrices, such as solvents, liquids, and gels.

For the current example, long (>50 μm), high aspect ratio carbon nanotubes with unfunctionalized surface chemistry were dispersed at 5 wt. % in two different liquids: 1) NMP and 2) water using the apparatus, systems, and methods disclosed herein. For comparison of the carbon nanotube dispersion with the apparatus, systems, and methods as disclosed herein, virgin samples were prepared by bath sonicating a small amount of carbon nanotubes directly in the respective liquid (NMP or water) for 1 minute.

SEM specimens of the virgin samples and samples prepared according the apparatus, systems, and methods disclosed herein were prepared by bath sonicating a small amount of each sample in NMP (carbon nanotube-NMP colloid) and in water (carbon nanotube-water colloid) for 30 seconds. A small droplet of the dispersion was placed on silicon wafer, dried and analyzed using SEM. SEM images are reported for the following magnifications: 50×; 1,000×; 10,000×; and 30,000×.

The carbon nanotube-NMP and carbon nanotube-water colloids were prepared without a dispersed phase. The medium comprised an external phase of NMP (for the carbon nanotube-NMP colloid) or water (for the carbon nanotube-water colloid), and an internal phase of 5 wt. % carbon nanotubes. (In this example, the medium is the compound).

The carbon nanotube colloid (carbon nanotube-NMP or carbon nanotube-water) was pre-mixed using a conventional mechanical mixer (impeller mixer). The carbon nanotube colloid was mixed with the apparatus, systems, and methods disclosed herein for 10 minutes by recirculating the compound through the apparatus.

Figure 21B:
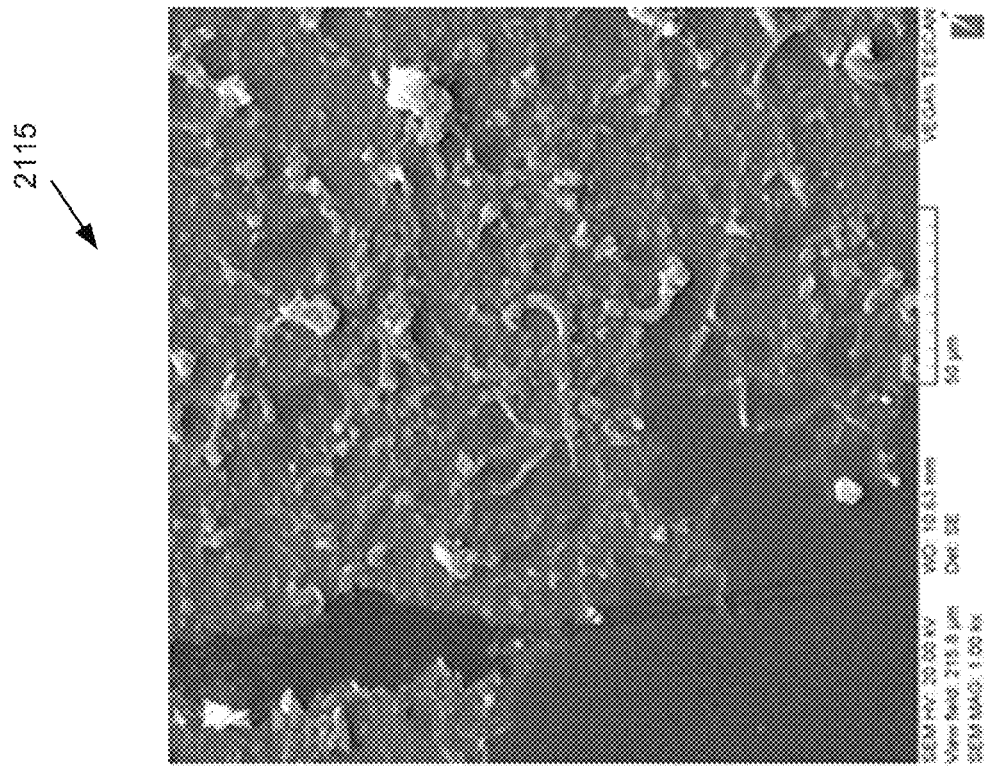
FIG. 21B is a SEM image the sample of carbon nanotubes and N-Methyl-2-pyrrolidone of FIG. 21A shown at a magnification of 1,000.
Figure 21A:
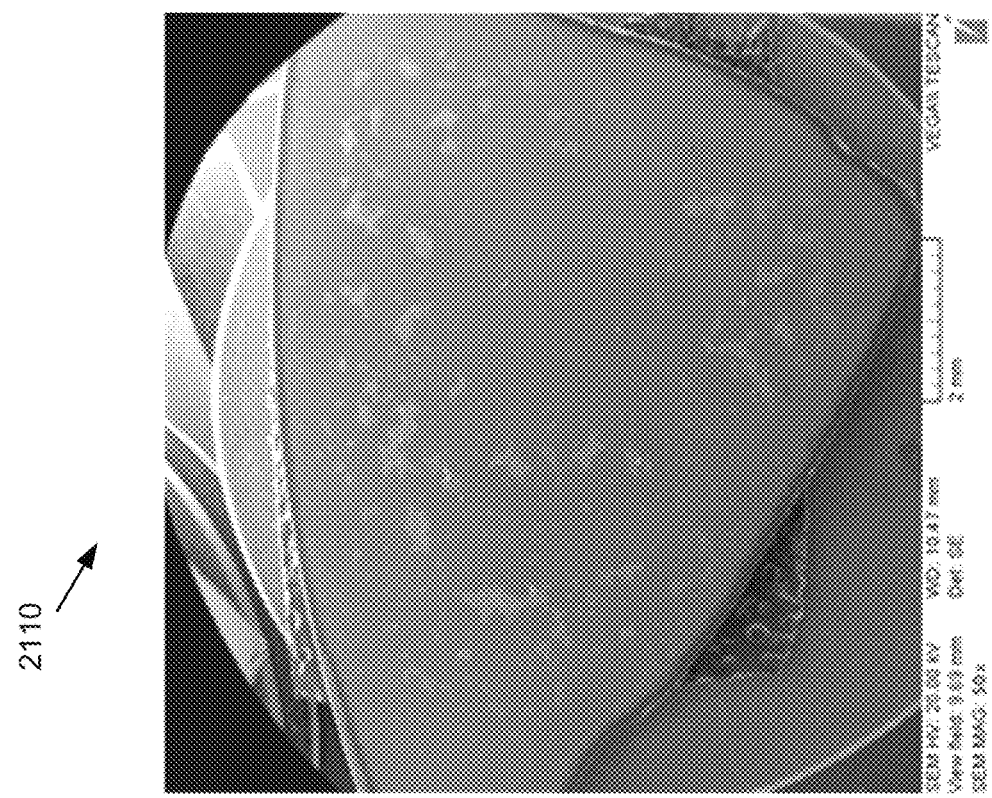
FIG. 21A is a SEM image of a first sample of carbon nanotubes and N-Methyl-2-pyrrolidone shown at a magnification of 50.
Figure 21D:
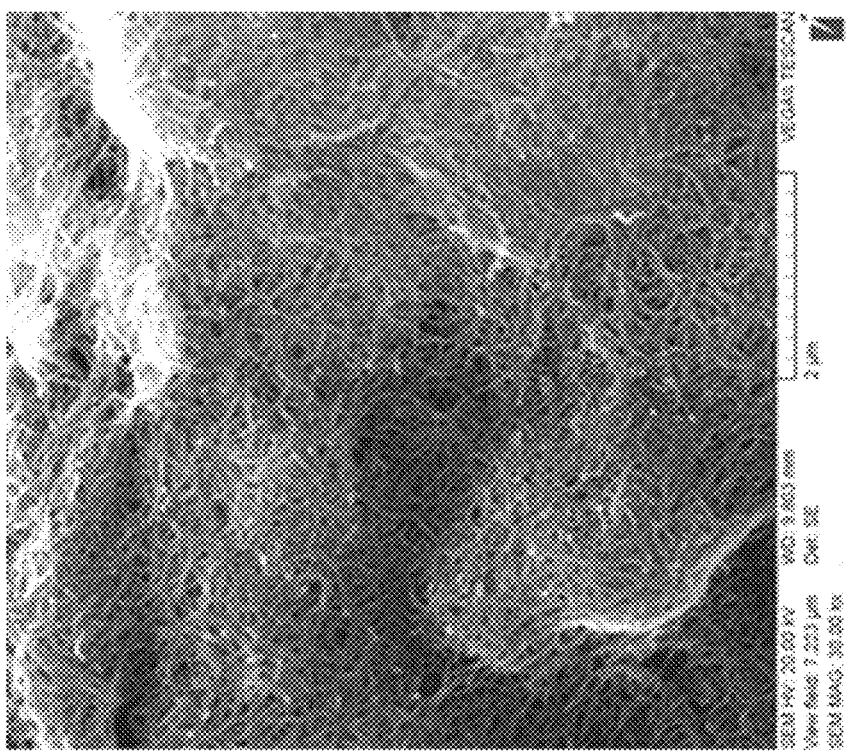
FIG. 21D is a SEM image of the sample of carbon nanotubes and N-Methyl-2-pyrrolidone of FIG. 21A shown at a magnification of 30,000.
Figure 21C:
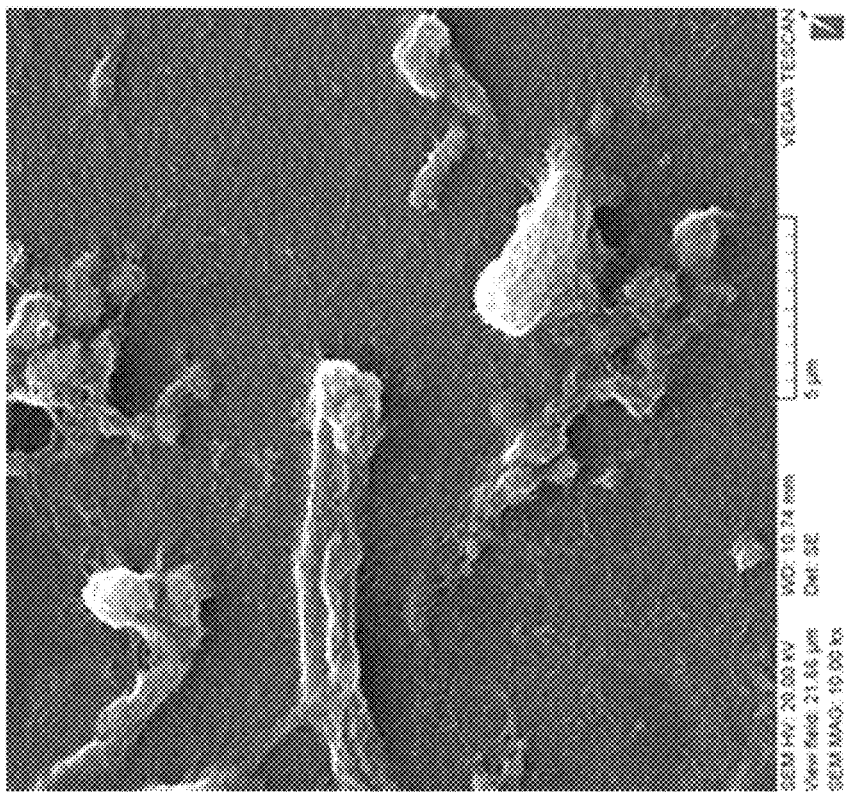
FIG. 21C is a SEM image of the sample of carbon nanotubes and N-Methyl-2-pyrrolidone of FIG. 21A shown at a magnification of 10,000.

Referring to FIG. 21A, there is shown an SEM image 2110 of the carbon nanotube-MNP virgin sample at a magnification of 50. Referring to FIG. 21B, there is shown an SEM image 2115 of the carbon nanotube-MNP virgin sample at a magnification of 1,000. Referring to FIG. 21C, there is shown an SEM image 2120 of the carbon nanotube-MNP virgin sample at a magnification of 10,000. Referring to FIG. 21D, there is shown an SEM image 2125 of the carbon nanotube-MNP virgin sample at a magnification of 30,000.

Figure 21F:
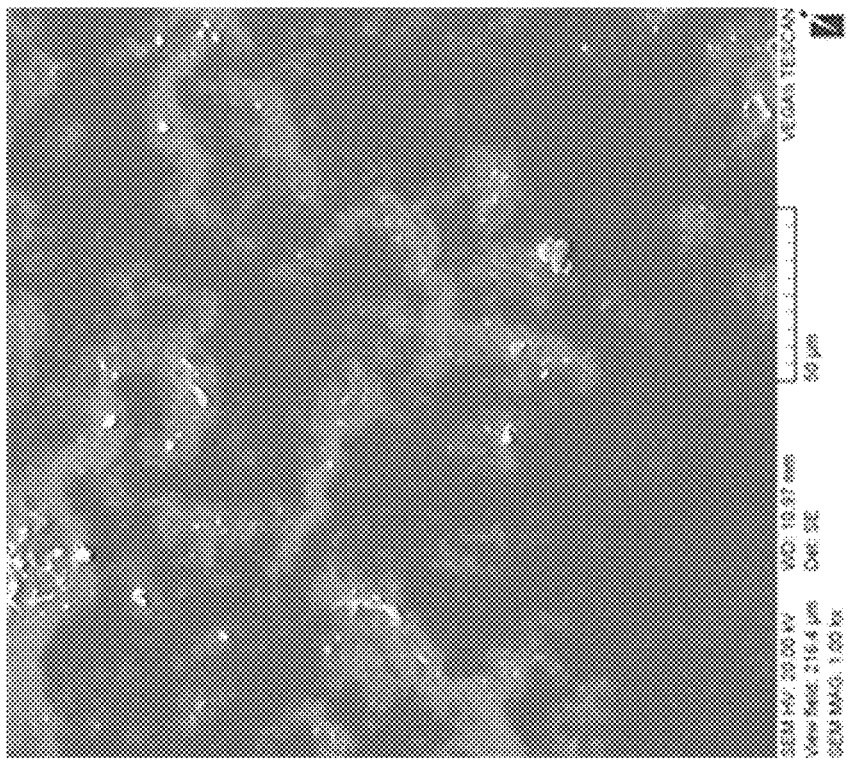
FIG. 21F is a SEM image of the sample of carbon nanotubes and N-Methyl-2-pyrrolidone of FIG. 21E shown at a magnification of 1,000.
Figure 21E:
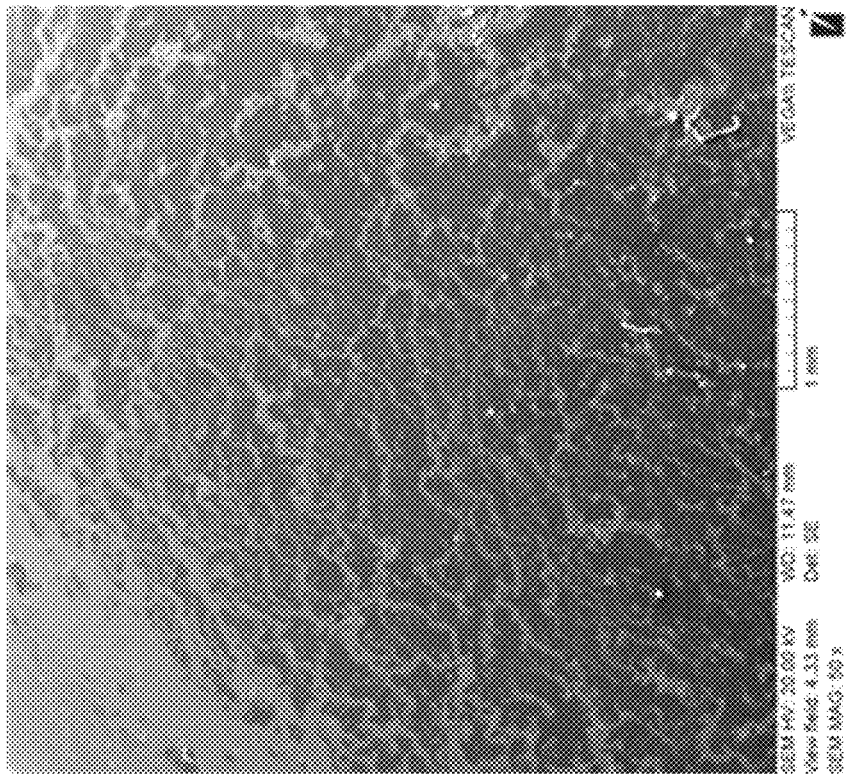
FIG. 21E is a SEM image of a second sample of carbon nanotubes and N-Methyl-2-pyrrolidone shown at a magnification of 50.
Figure 21H:
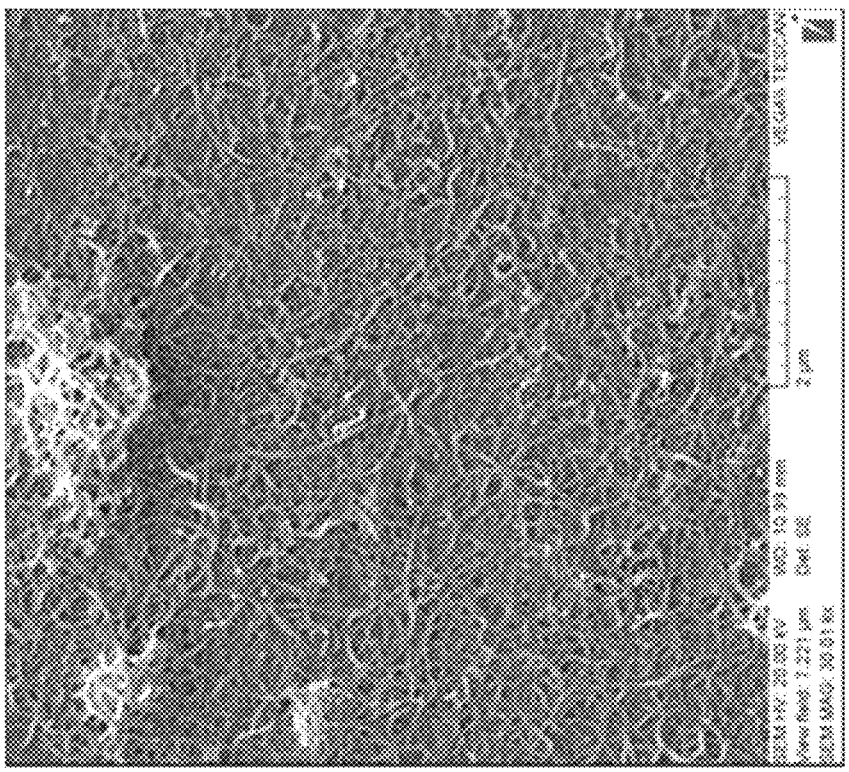
FIG. 21H is a SEM image of the sample of carbon nanotubes and N-Methyl-2-pyrrolidone of FIG. 21E shown at a magnification of 30,000.
Figure 21G:
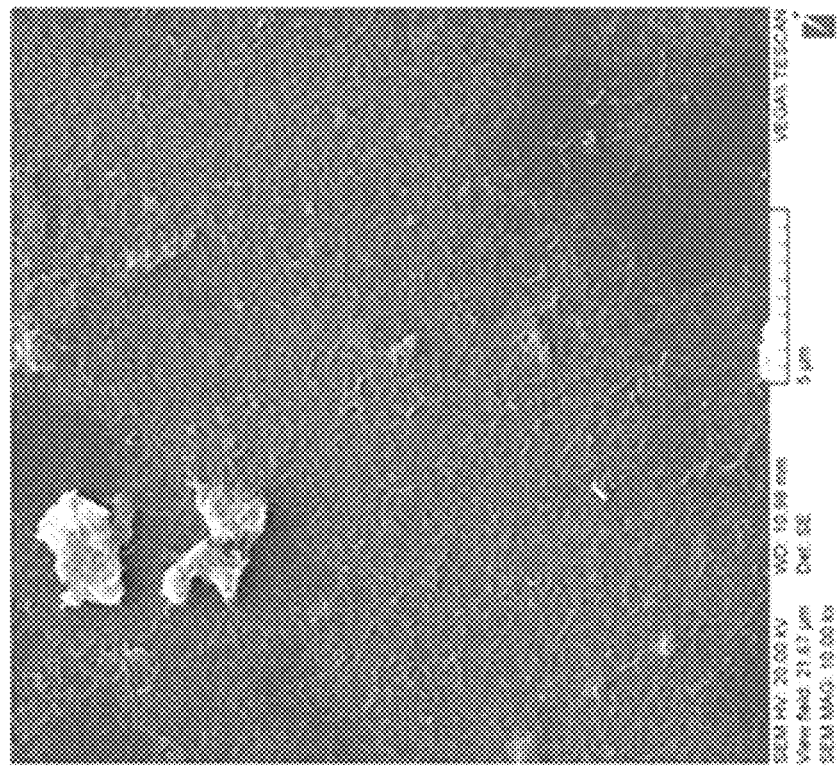
FIG. 21G is a SEM image of the sample of carbon nanotubes and N-Methyl-2-pyrrolidone of FIG. 21E shown at a magnification of 10,000.

SEM images of the sample prepared according to the apparatus, methods, and systems disclosed herein are provided in FIG. 21E to FIG. 21H. Referring to FIG. 21E, there is shown an SEM image 2130 of the sample at a magnification of 50. Referring to FIG. 21F, there is shown an SEM image 2135 of the sample at a magnification of 1,000. Referring to FIG. 21G, there is shown an SEM image 2140 of the sample at a magnification of 10,000. Referring to FIG. 21H, there is shown an SEM image 2145 of the sample at a magnification of 30,000.

The SEM image 2115 (virgin sample at a magnification of 1,000) shows an abundance of structures on the order of 25 μm, whereas virtually no secondary structures >2-3 μm are observed in the image 2135 (dispersed sample at a magnification of 1,000). The SEM image 2120 (virgin sample at a magnification of 10,000) and the image 2125 (virgin sample at a magnification of 30,000) show a uniform distribution of carbon nanotubes dispersed down to the primary structure level, with few secondary structures (1-2 μm) observed in the image 2140 (dispersed sample at a magnification of 10,000) and the image 2145 (dispersed sample at a magnification of 30,000).

Figure 21I:
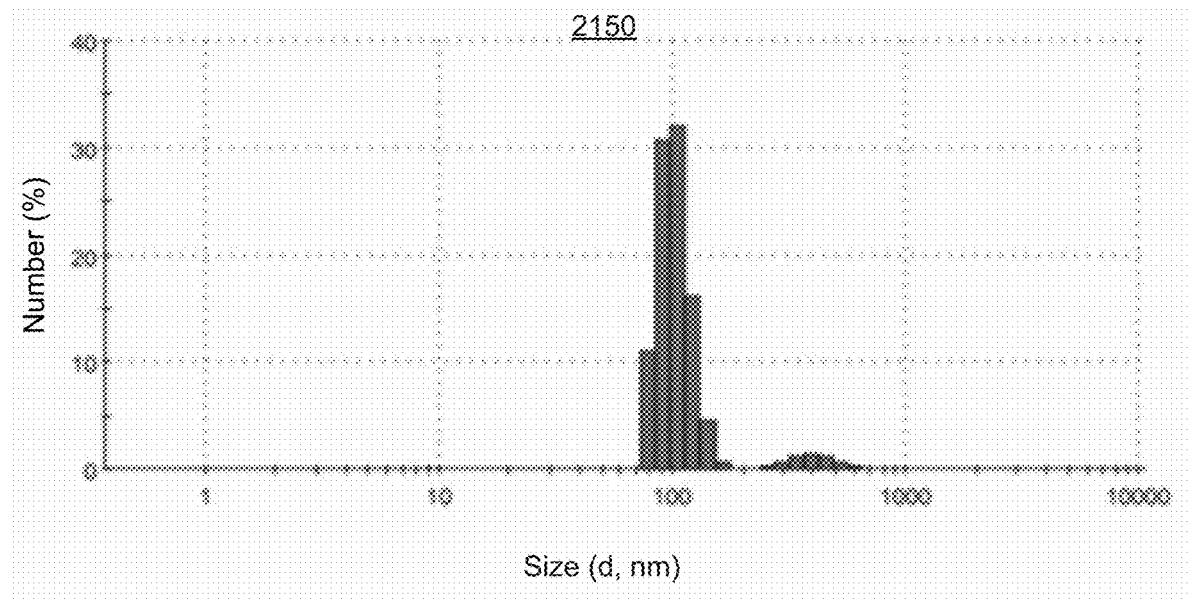
FIG. 21I is a histogram of number-averaged particle size distribution for the carbon nanotubes and N-Methyl-2-pyrrolidone of FIG. 21H.

Referring to FIG. 21I, there is shown a histogram 2150 of the number-averaged particle size distribution for a 5 wt. % carbon nanotube-NMP sample prepared using the apparatus, systems, and methods disclosed herein. The data corresponding to the histogram 2150 is provided in the following table.

| Size d (nm) | Mean Number (%) |
| --- | --- |
| 78.82 | 11.0 |
| 91.28 | 30.8 |
| 105.7 | 32.0 |
| 122.4 | 16.1 |
| 141.8 | 4.6 |
| 164.2 | 0.6 |
| 255.0 | 0.1 |
| 295.3 | 0.6 |
| 342.0 | 1.1 |
| 396.1 | 1.3 |
| 458.7 | 1.0 |
| 531.2 | 0.6 |
| 615.1 | 0.2 |

Figure 21J:
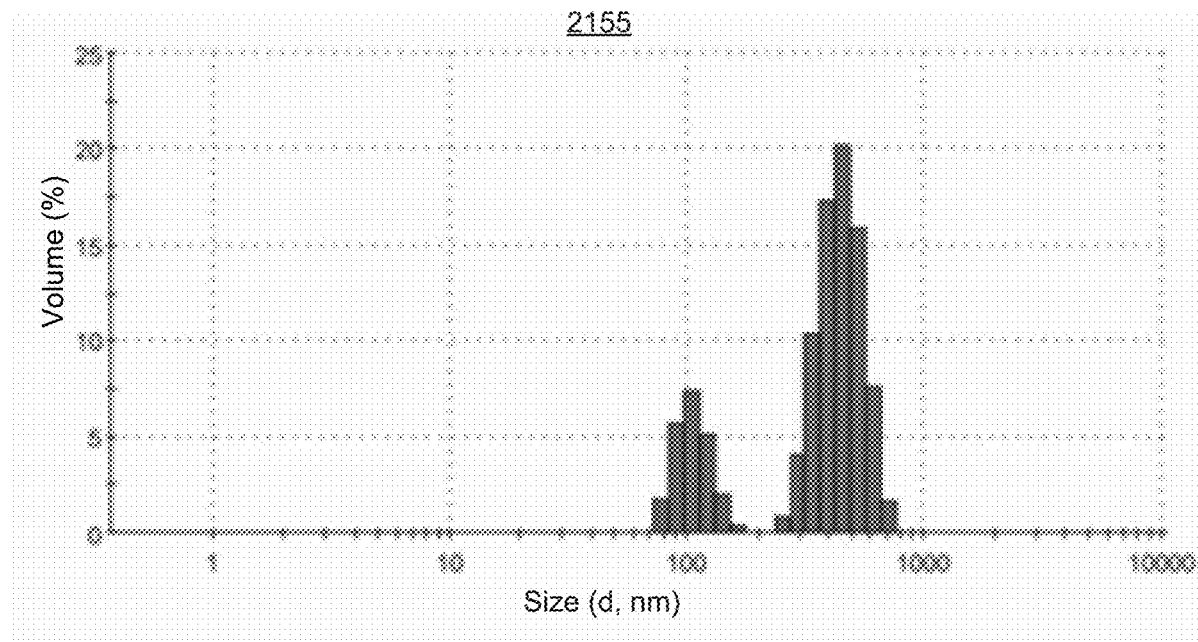
FIG. 21J is a histogram of volume-averaged particle size distribution for the carbon nanotubes and N-Methyl-2-pyrrolidone of FIG. 21H.

Referring to FIG. 21J, there is shown a histogram 2155 corresponding to the volume-averaged data of the sample. The data corresponding to the histogram 2155 is provided in the following table.

| Size d (nm) | Mean Number (%) |
| --- | --- |
| 78.82 | 1.7 |
| 91.28 | 5.7 |
| 105.7 | 7.4 |
| 122.4 | 5.1 |
| 141.8 | 2.0 |
| 164.2 | 0.4 |
| 255.0 | 0.8 |
| 295.3 | 4.1 |
| 342.0 | 10.3 |
| 396.1 | 17.3 |
| 458.7 | 20.2 |
| 531.2 | 15.9 |
| 615.1 | 7.6 |
| 712.4 | 1.6 |

Consistent with the SEM results, the number-averaged and volume-averaged dynamic light scattering analysis data in the histograms 2150 and 2155 (and corresponding tables) indicates that the carbon nanotubes are dispersed down to the primary structure level, with approximately 85% to 92% of the carbon nanotubes structures being under 550 nm for the sample prepared according to the apparatus, systems, and methods disclosed herein.

Figure 22B:
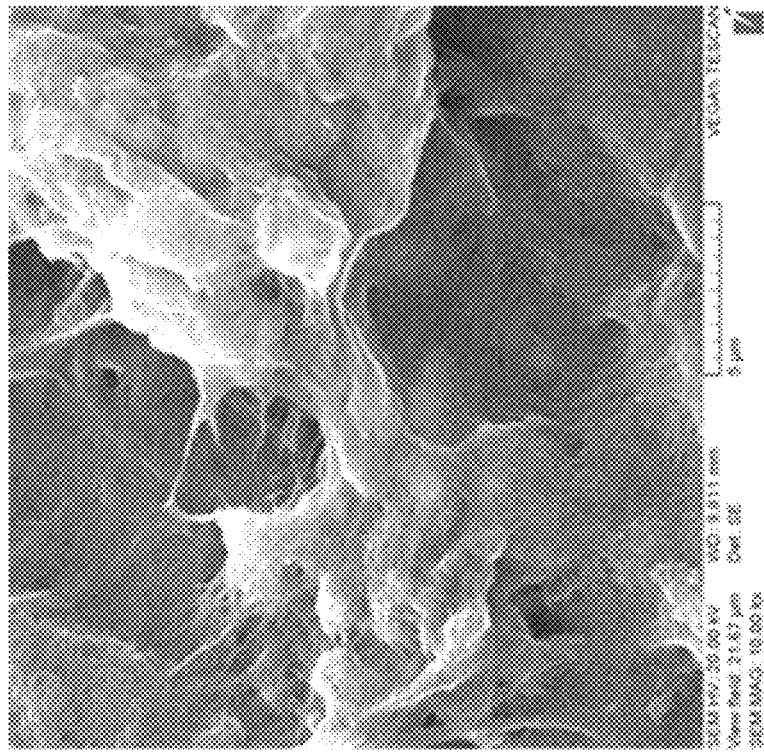
FIG. 22B is a SEM image of the sample of carbon nanotubes and water of FIG. 22A shown at a magnification of 10,000.
Figure 22A:
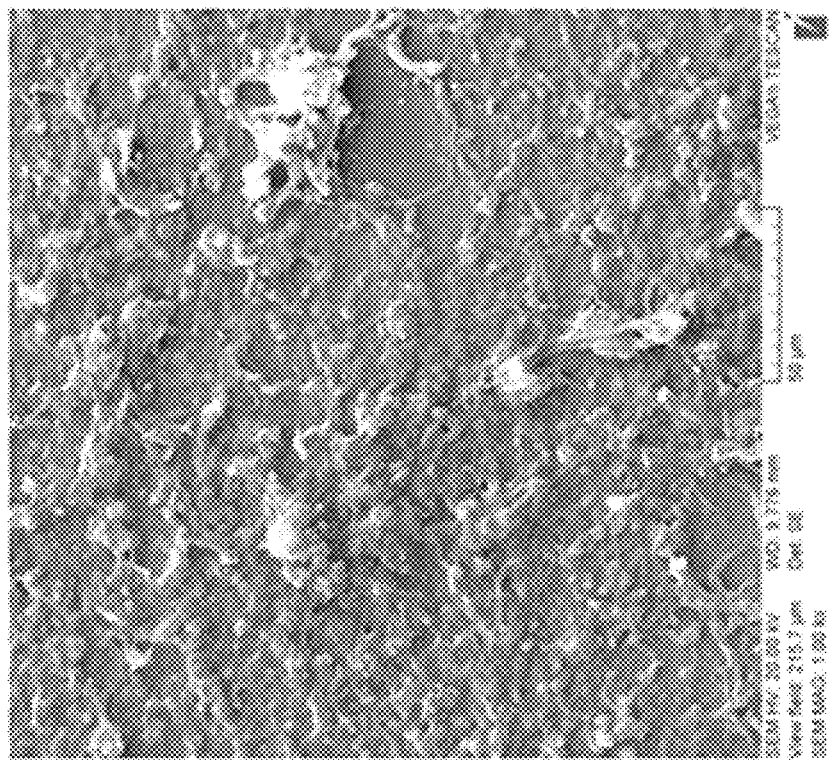
FIG. 22A is a SEM image of a first sample of carbon nanotubes and water shown at a magnification of 1,000.

Referring to FIG. 22A, there is shown an SEM image 2210 of a carbon nanotube-water virgin sample shown at a magnification of 1,000. Referring to FIG. 22B, there is shown an SEM image 2215 of a carbon nanotube-water virgin sample shown at a magnification of 10,000. Referring to FIG. 22C, there is shown an SEM image 2220 of a carbon nanotube-water virgin sample shown at a magnification of 30,000.

Figure 22D:
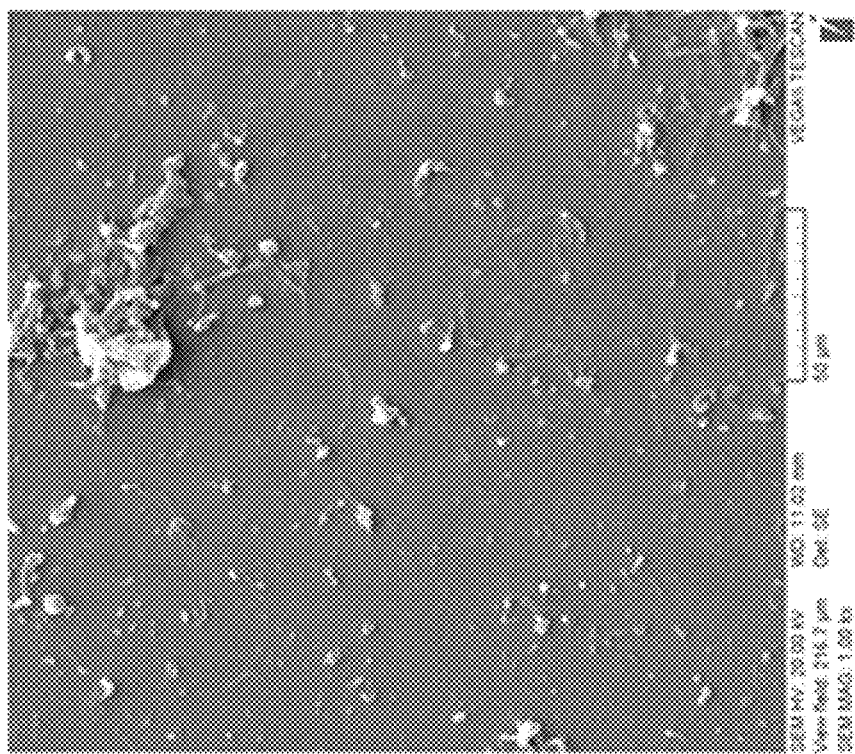
FIG. 22D is a SEM image of a second sample of carbon nanotubes and water shown at a magnification of 1,000.
Figure 22C:
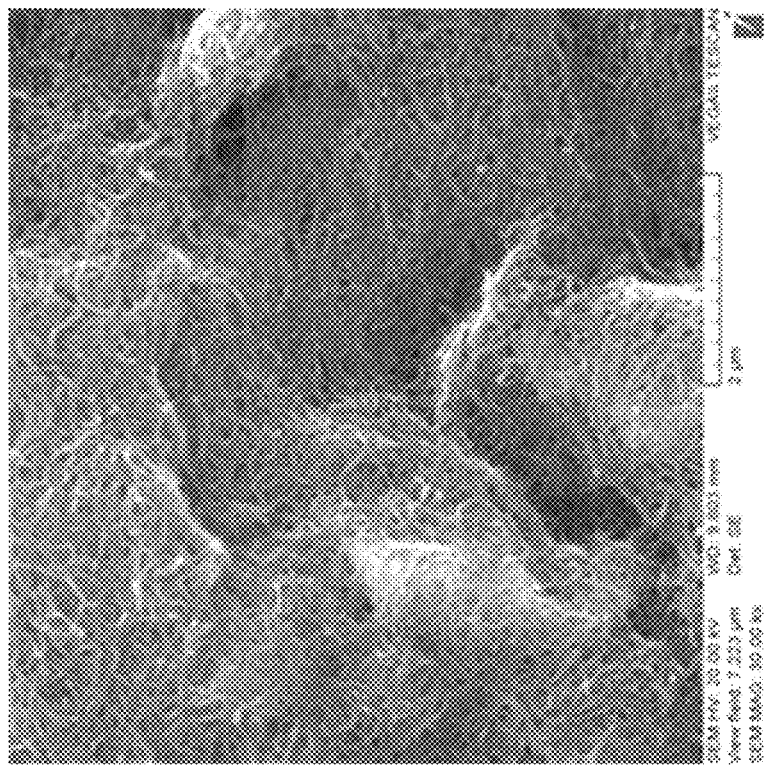
FIG. 22C is a SEM image of the sample of carbon nanotubes and water of FIG. 22A shown at a magnification of 30,000.
Figure 22F:
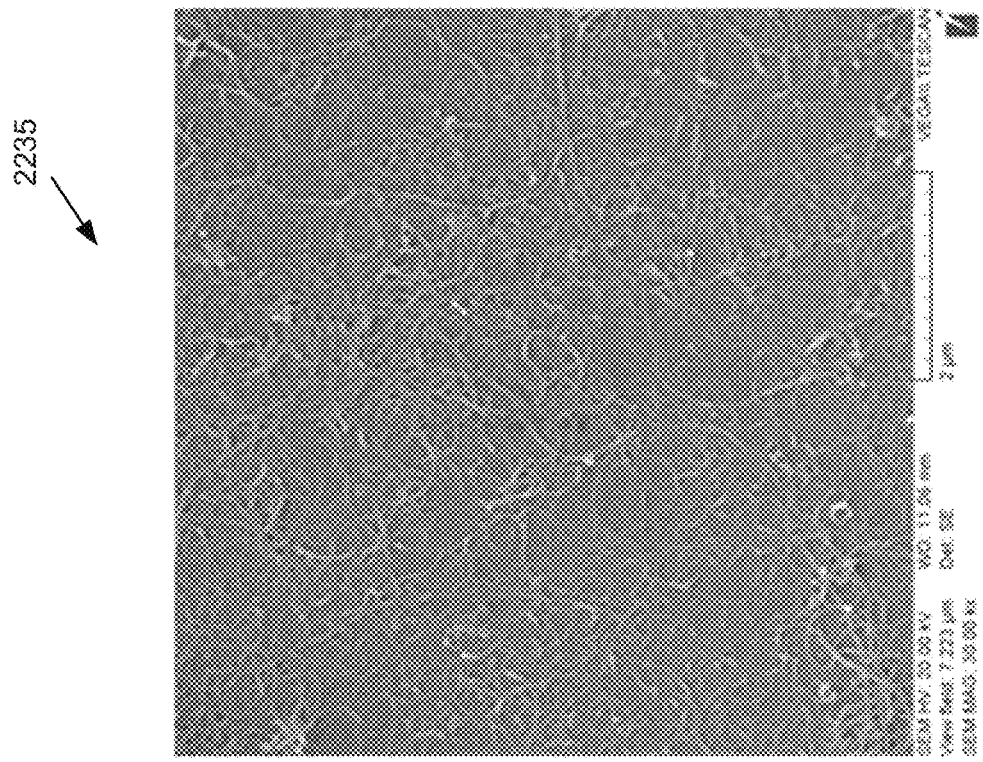
FIG. 22F is a SEM image of the sample of carbon nanotubes and water of FIG. 22D shown at a magnification of 30,000.
Figure 22E:
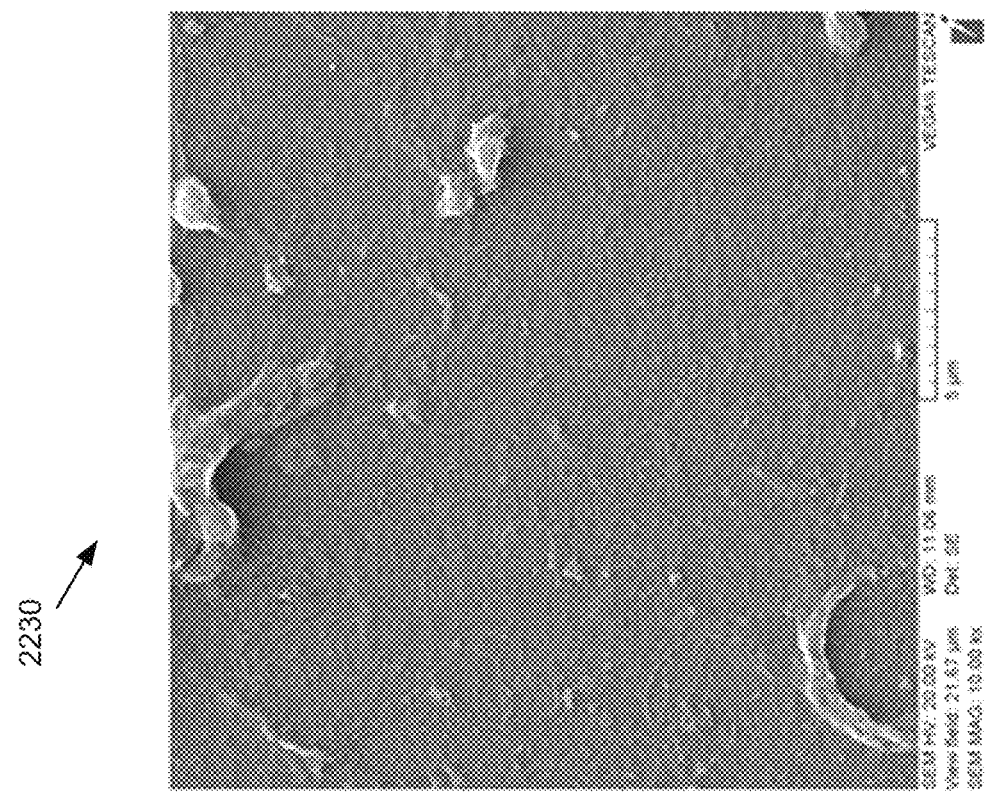
FIG. 22E is a SEM image of the sample of carbon nanotubes and water of FIG. 22D shown at a magnification of 10,000.

Referring to FIG. 22D, there is shown an SEM image 2225 of a carbon nanotube-water sample prepared according the apparatus, systems, and methods disclosed herein shown at a magnification of 1,000. Referring to FIG. 22E, there is shown an SEM image 2230 of the sample at a magnification of 10,000. Referring to FIG. 22F, there is shown an SEM image 2235 of the sample a magnification of 30,000.

Similar to the carbon nanotube dispersion in NMP, the SEM image 2210 (virgin sample at a magnification of 1,000) shows an abundance of structures on the order of 25 μm with few structures greater than 25 μm shown in the image 2225 (dispersed sample at a magnification of 1,000). The image 2215 (virgin sample at a magnification of 10,000) and the image 2220 (virgin sample at a magnification of 30,000) show a uniform distribution of dispersed carbon nanotubes down to the primary structure level, while the image 2230 (dispersed sample at a magnification of 10,000) and the image 2235 (dispersed sample at a magnification of 30,000) show few secondary structures observed.

Figure 22G:
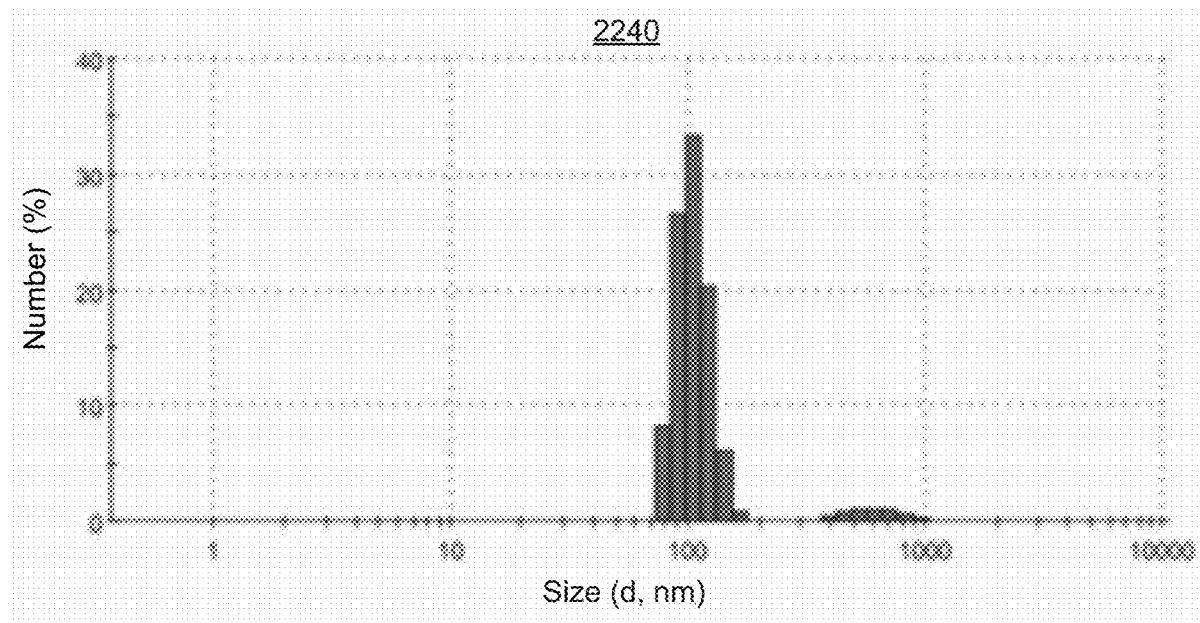
FIG. 22G is a histogram of number-averaged particle size distribution for the carbon nanotubes and water of FIG. 22F.

Referring to FIG. 22G, there is shown a histogram 2240 of the number-averaged particle size distribution for a 5 wt. % carbon nanotube-water sample prepared using the apparatus, systems, and methods disclosed herein. The data corresponding to the histogram 2240 is provided in the following table.

| Size d (nm) | Mean Number (%) |
|---|---|
| 78.82 | 8.1 |
| 91.28 | 26.6 |
| 105.7 | 33.4 |
| 122.4 | 20.2 |
| 141.8 | 6.1 |
| 164.2 | 0.8 |
| 342.0 | 0.1 |
| 396.1 | 0.3 |
| 458.7 | 0.7 |
| 531.2 | 1.0 |
| 615.1 | 1.0 |
| 712.4 | 0.9 |
| 825.0 | 0.5 |
| 955.4 | 0.3 |
| 1106 | 0.1 |

Figure 22H:
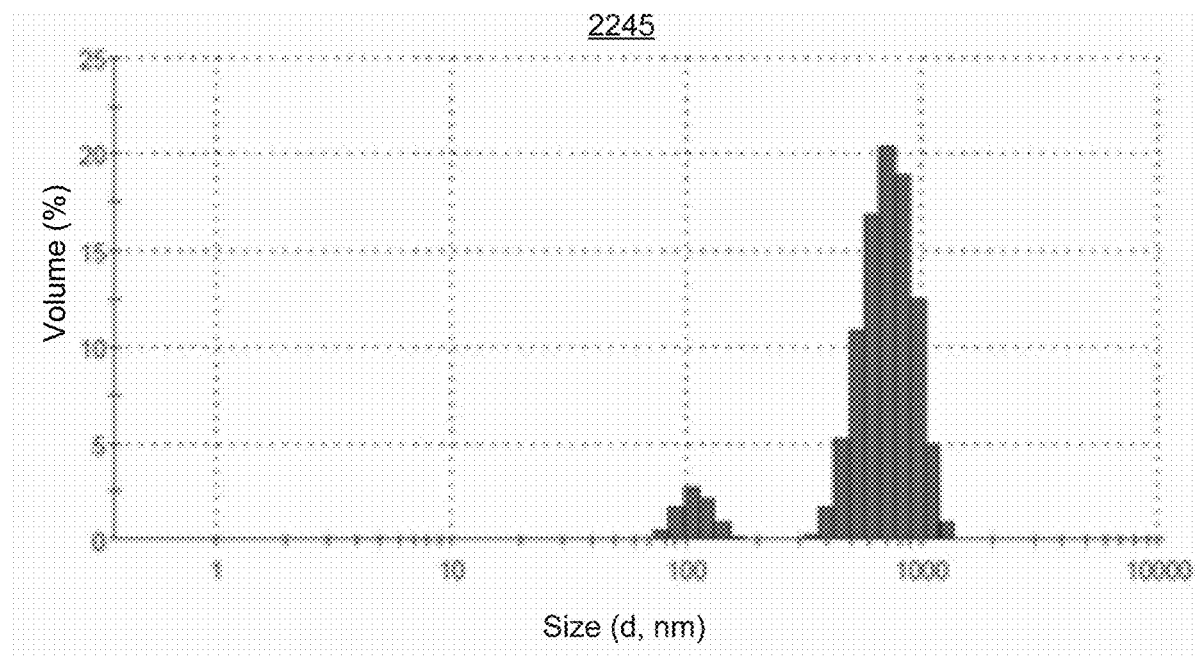
FIG. 22H is a histogram of volume-averaged particle size distribution for the carbon nanotubes and water of FIG. 22F.

Referring to FIG. 22H, there is shown a histogram 2245 corresponding to the volume-averaged data of the sample. The data corresponding to the histogram 2245 is provided in the following table.

| Size d (nm) | Mean Number (%) |
|---|---|
| 78.82 | 0.4 |
| 91.28 | 1.7 |
| 105.7 | 2.6 |
| 122.4 | 2.1 |
| 141.8 | 0.9 |
| 164.2 | 0.2 |
| 342.0 | 0.2 |
| 396.1 | 1.6 |
| 458.7 | 5.2 |
| 531.2 | 10.8 |
| 615.1 | 16.8 |
| 712.4 | 20.4 |
| 825.0 | 18.9 |
| 955.4 | 12.4 |
| 1106 | 4.9 |
| 1281 | 0.9 |

Consistent with the SEM results, the number-averaged and volume-averaged dynamic light scattering analysis data in the histograms 2240 and 2245 (and corresponding tables) indicates that carbon nanotubes are dispersed down to the primary structure level with the apparatus, systems, and methods disclosed herein.

Boron Nitride Exfoliation

The apparatus, systems, and methods disclosed herein may be used to exfoliate layered materials like boron nitride in a medium. Generally, the layered materials may be graphite, clay, WS2, MoS2, MoSe2, Bi2Se3, TaS2, and SnS2, as well as other layered materials.

The boron nitride dispersions are generally described in respect of FIG. 23A to FIG. 23F.

Layered materials like hexagonal boron nitride are difficult to disperse due to the strong forces that hold nanosheets within the layered material together.

For the current example, boron nitride was dispersed at 20 wt. % for 10 minutes directly in a silicone fluid using the apparatus, systems, and methods disclosed herein, to produce thin exfoliated boron nitride sheets.

To prepare the samples according to the apparatus, systems, and methods disclosed herein, boron nitride platelets were washed in hexane three times until all the silicone fluid dissolved. Boron nitride platelets were then extracted from the hexane solution using centrifugation (Model: Thermo Scientific Heraeus Megafuge 11) at 6000 rpm. The extracted particles were dried using a vacuum oven. The particles were re-dissolved in ethanol and air sprayed onto a silicon substrate to create SEM specimens. Pristine samples were also prepared, comprising the boron nitride structures in their original form.

The samples prepared according to the apparatus, systems, and methods disclosed herein were prepared without a dispersed phase. The medium comprised an external phase of silicone, and an internal phase of 20 wt. % boron nitride. (In this example, the medium is the compound). The boron-nitride-silicon compound was pre-mixed using a conventional mechanical mixer (impeller mixer) and then mixed according to the apparatus, systems, and methods as disclosed herein, for 10 minutes by recirculating the compound through the apparatus.

Figure 23B:
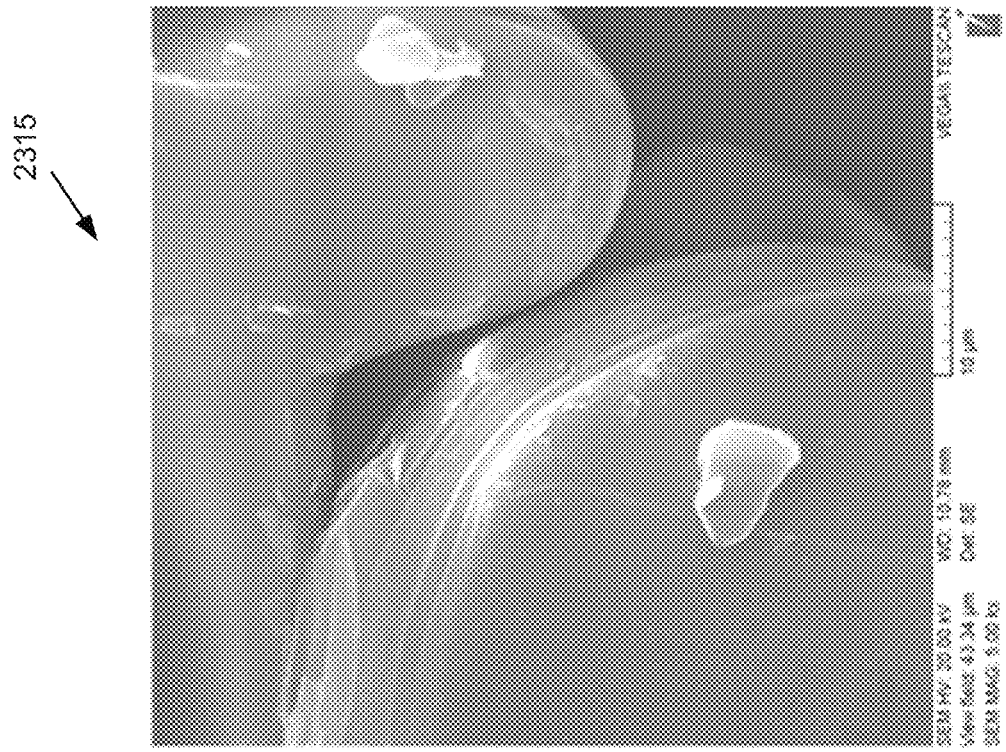
FIG. 23B is a SEM image of the sample of boron nitride of FIG. 23A shown at a magnification of 5,000.
Figure 23A:
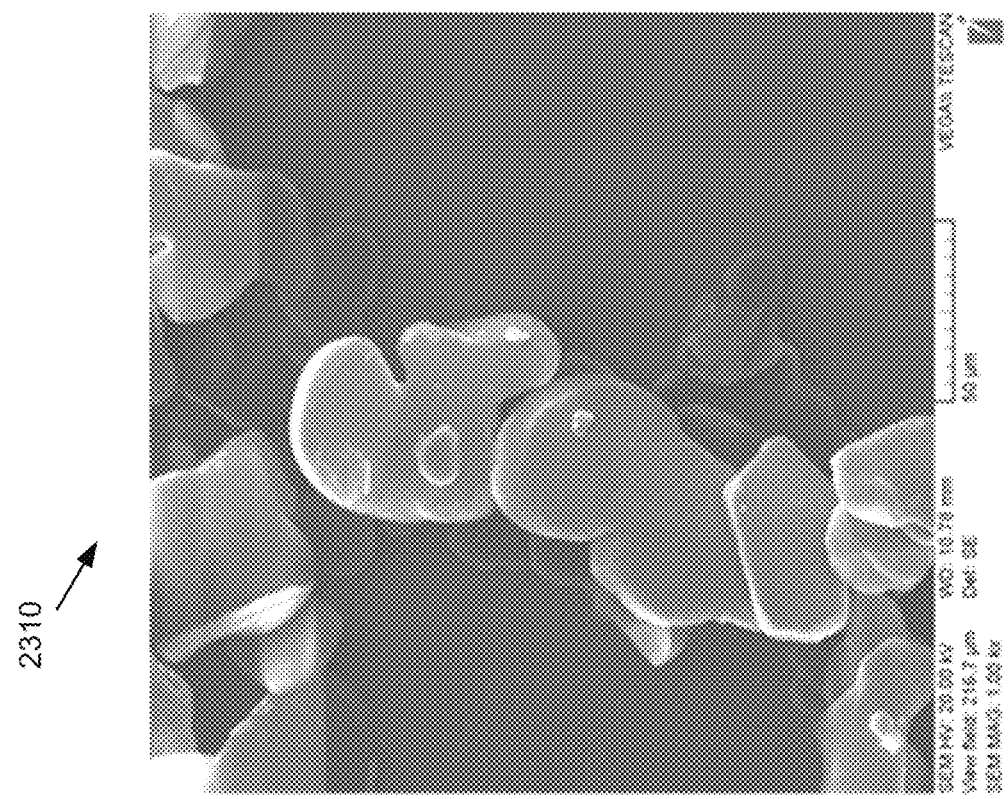
FIG. 23A is a SEM image of a first sample of boron nitride shown at a magnification of 1,000.

Referring to FIG. 23A, there is shown an SEM image 2310 of a pristine sample at a magnification of 1,000. Referring to FIG. 23B, there is shown an SEM image 2315 of a pristine sample at a magnification of 5,000.

The image 2310 and the image 2315 show large platelet structures with blunt, rounded edges. The blunt edge of a boron nitride platelet, as shown in the image 2315, shows the layered structure comprised of nanosheets on the order of 200 nm thick, stacked together.

Figure 23D:
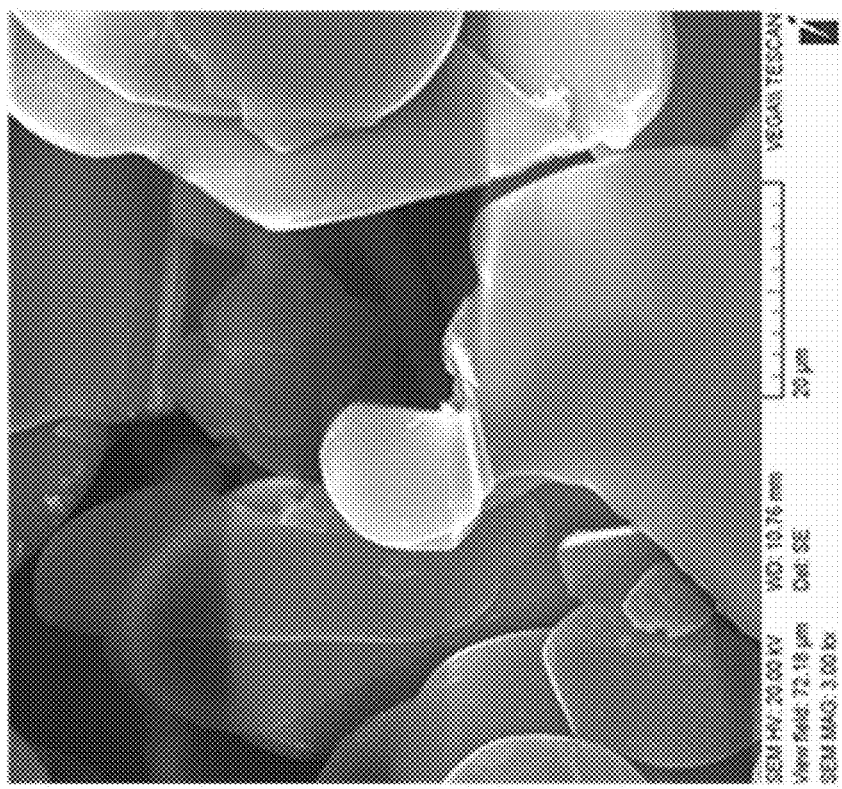
FIG. 23D is a SEM image of a sample of boron nitride shown at a magnification of 3,000.
Figure 23C:
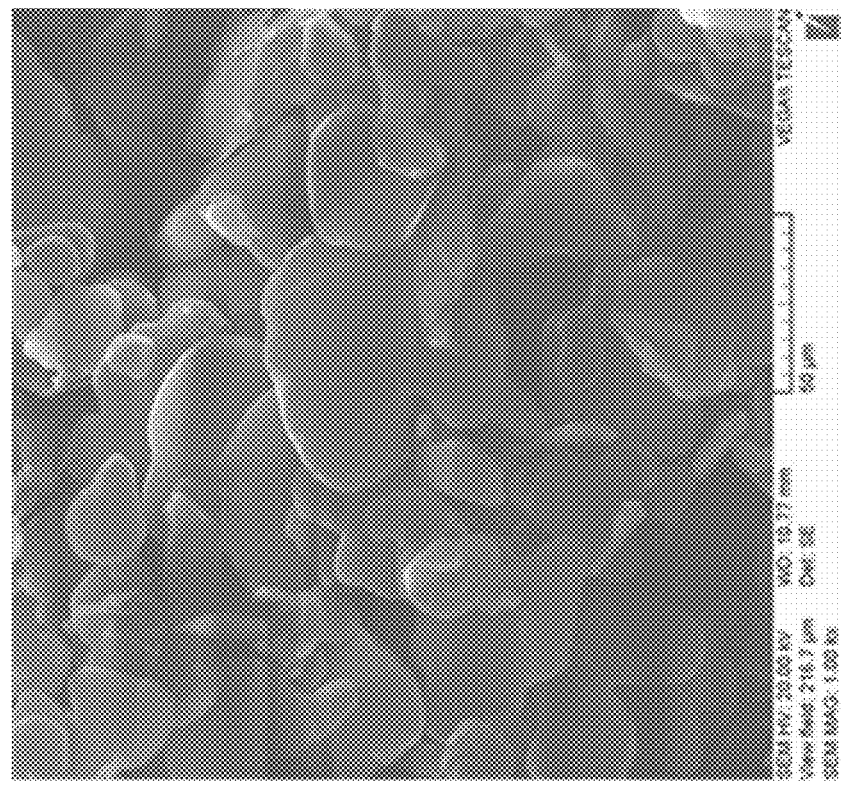
FIG. 23C is a SEM image of a sample of boron nitride shown at a magnification of 1,000.
Figure 23F:
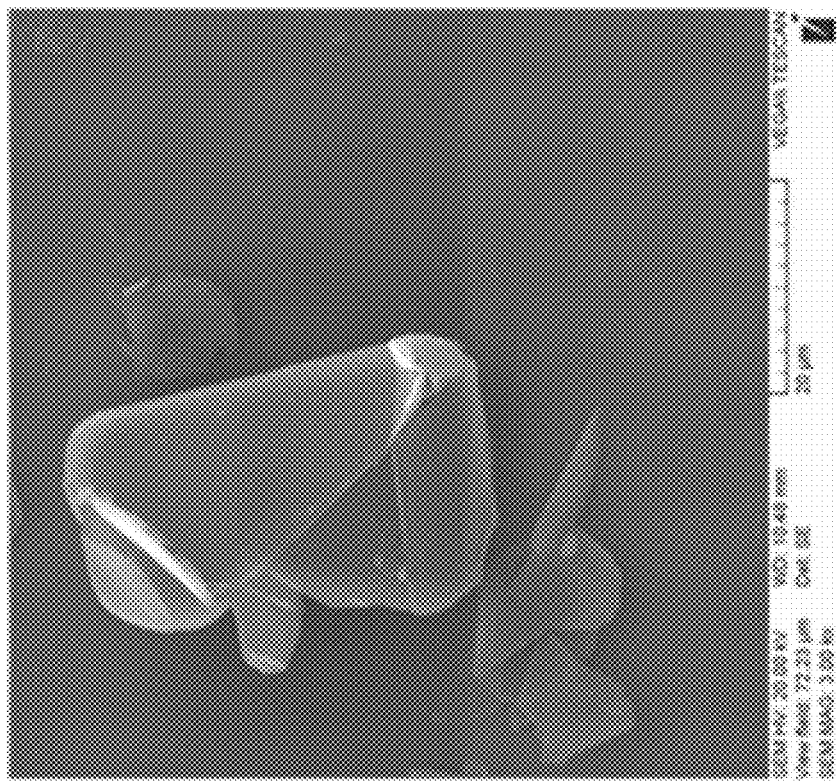
FIG. 23F is a SEM image of a sample of boron nitride shown at a magnification of 3,000.
Figure 23E:
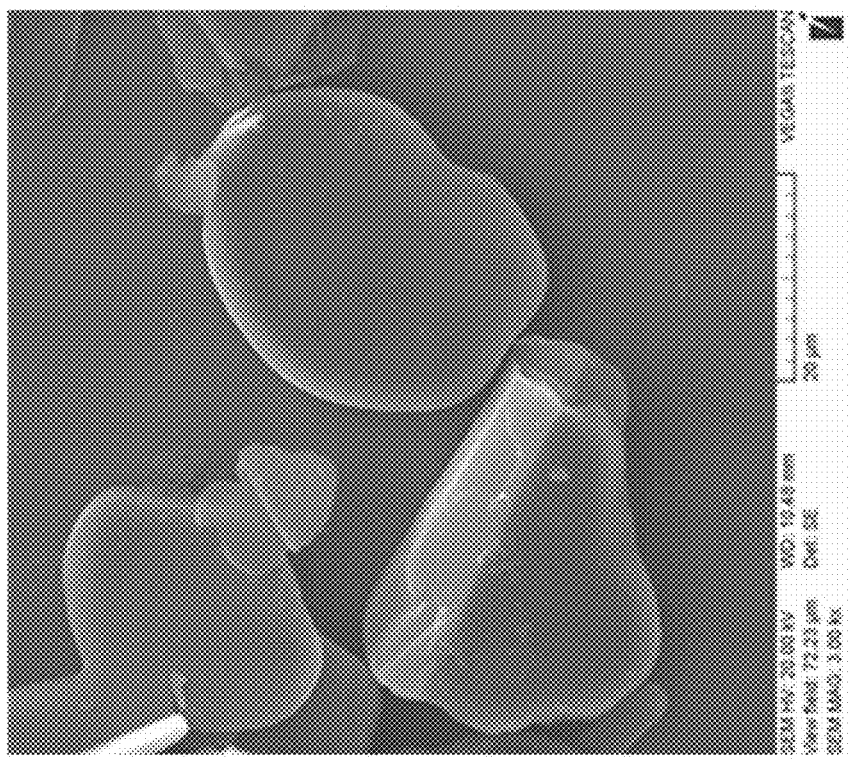
FIG. 23E is a SEM image of a sample of boron nitride shown at a magnification of 3,000.

Referring to FIG. 23D, there is shown an SEM image 2325 of a boron nitride sample dispersed according to the apparatus, systems, and methods disclosed herein. The image 2325 shows that the boron nitride sheets are exfoliated, as evidenced by the thin sheets with sharp edges. Similarly, referring to FIG. 23E, there is shown an SEM image 2330 that provides evidence of a thin sheet that is rolled over in a U-shaped surface. Referring to FIG. 23C, there is shown an SEM image 2320 of a boron nitride sample dispersed according to the apparatus, systems, and methods disclosed herein. Referring to FIG. 23F, there is shown an SEM image 2335 of a boron nitride sample dispersed according to the apparatus, systems, and methods disclosed herein.

Nanocrystalline Cellulose-Silicone Formulations

The nanocrystalline cellulose-silicone formulations are generally described in respect of FIG. 24A to FIG. 24I. In these examples, untreated nanocrystalline cellulose was incorporated in a highly hydrophobic silicone elastomer host matrix at 10 wt. %. For comparison, samples were prepared with conventional high shear mixing, and also according to the apparatus, systems, and methods disclosed herein.

The nanocrystalline cellulose-silicone samples prepared according to the apparatus, systems, and methods disclosed herein were prepared with a nanocrystalline cellulose-water colloid dispersed phase, comprising an externa phase of water, and an internal phase of 10 wt. % nanocrystalline cellulose in water. The medium was silicone.

The nanocrystalline cellulose-water colloid (dispersed phase) was pre-mixed using a conventional mechanical mixer (impeller mixer) and then incorporated into the silicone (medium) using the apparatus, systems, and methods disclosed herein. The water from the dispersed phase was evaporated during mixing and the nanocrystalline cellulose-silicone compound with a nanocrystaline cellulose concentration of 10 wt. % was collected at the collector. The mixing time was less than 5 minutes.

Figure 24A:
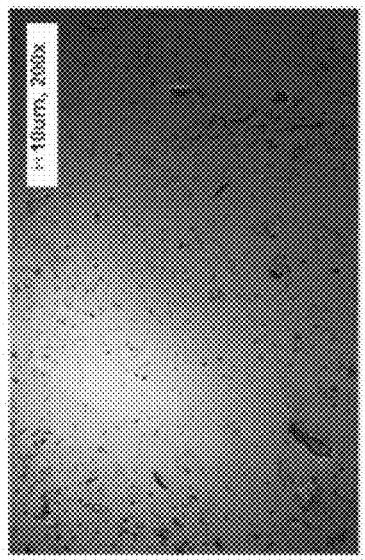
FIG. 24A is a SEM image of a first sample of nanocrystalline cellulose in a silicone elastomer shown at a magnification of 200.
Figure 24B:
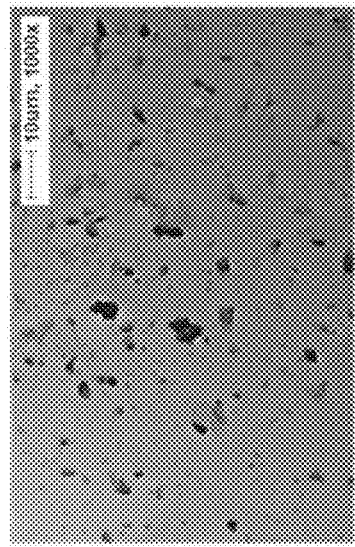
FIG. 24B is a SEM image of a second sample of nanocrystalline cellulose in a silicone elastomer shown at a magnification of 200.
Figure 24C:
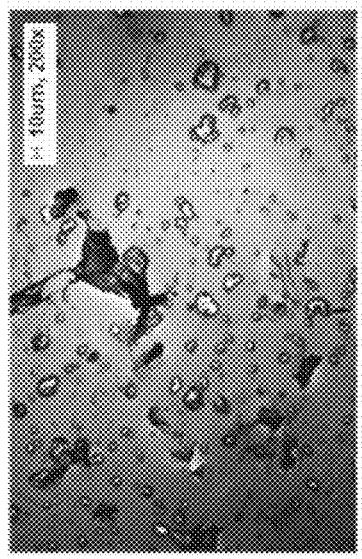
FIG. 24C is a SEM image of the sample of nanocrystalline cellulose in a silicone elastomer of FIG. 24A shown at a magnification of 1,000.
Figure 24D:
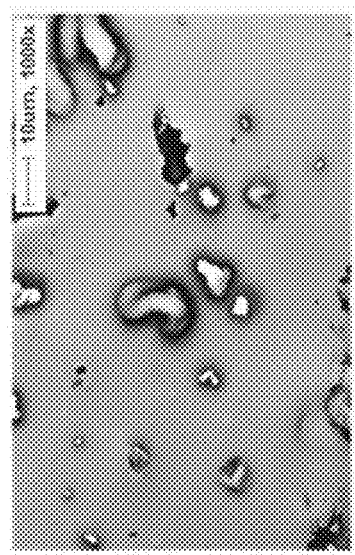
FIG. 24D is a SEM image of the sample of nanocrystalline cellulose in a silicone elastomer of FIG. 24B shown at a magnification of 1,000.
Figure 24F:
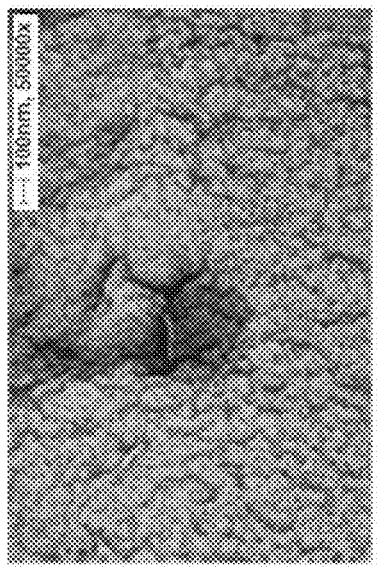
FIG. 24F is a SEM image of the sample of nanocrystalline cellulose in a silicone elastomer of FIG. 24B shown at a magnification of 50,000.
Figure 24E:
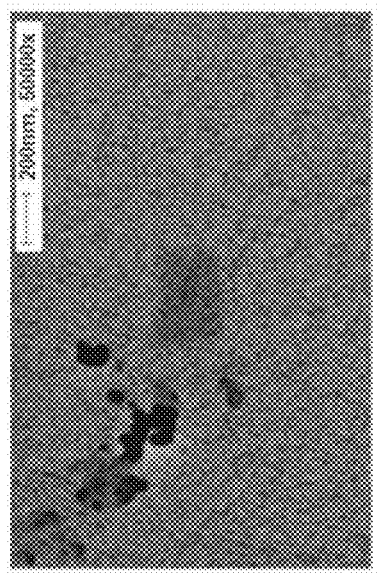
FIG. 24E is a SEM image of the sample of nanocrystalline cellulose in a silicone elastomer of FIG. 24A shown at a magnification of 50,000.
Figure 24G:
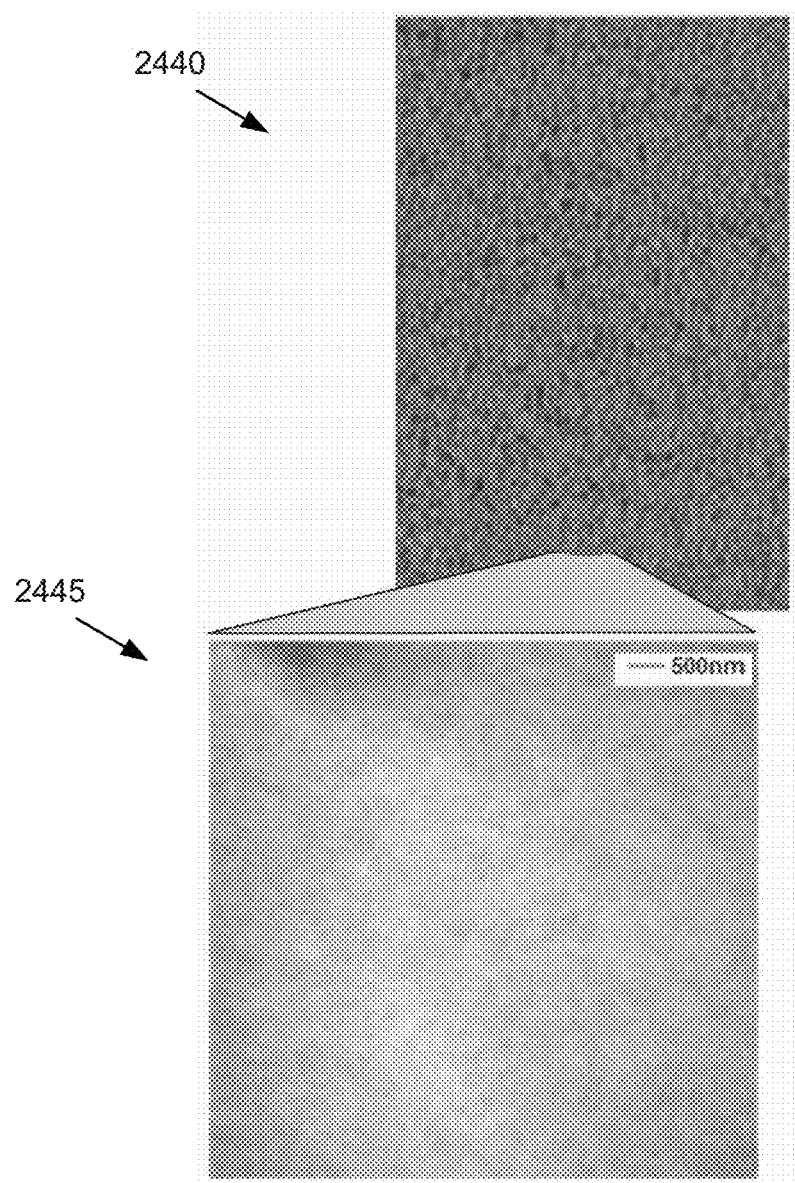
FIG. 24G shows a SEM image of the sample of nanocrystalline cellulose in a silicone elastomer of FIG. 24A shown at a magnification of 50,000, and a TEM image of the sample shown at a magnification of 20,000.
Figure 24H:
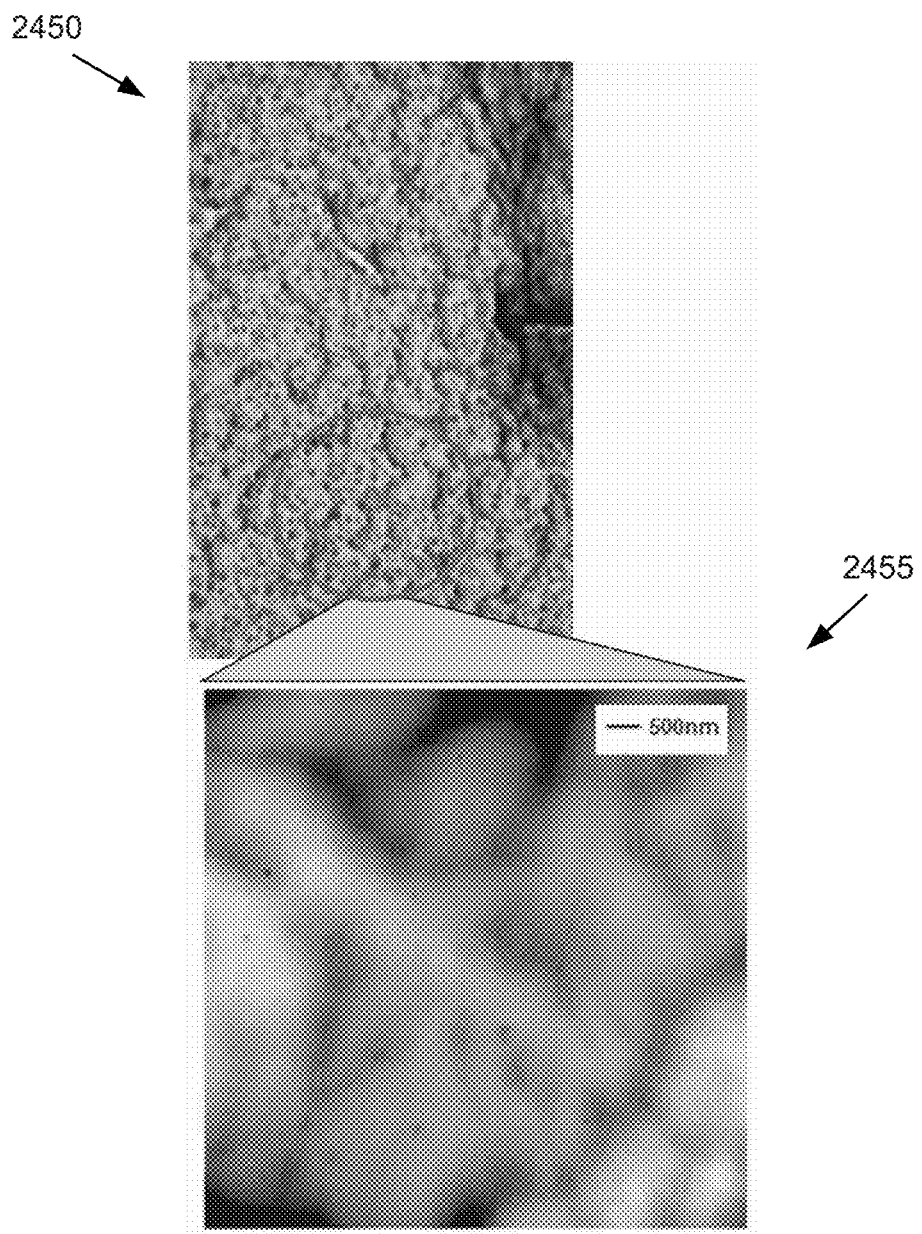
FIG. 24H shows a SEM image of the sample of nanocrystalline cellulose in a silicone elastomer of FIG. 24B shown at a magnification of 50,000, and a TEM image of the sample shown at a magnification of 20,000.

Referring to FIG. 24A, there is shown an SEM image 2410 for a conventionally-mixed sample at a magnification of 200. Referring to FIG. 24B, there is shown an SEM image 2415 for a sample mixed according to the apparatus, systems, and methods disclosed herein, at a magnification of 200. Referring to FIG. 24C, there is shown an SEM image 2420 for the conventionally-mixed sample at a magnification of 1,000. Referring to FIG. 24D, there is shown an SEM image 2425 for the sample mixed according to the apparatus, systems, and methods disclosed herein, at a magnification of 1,000. Referring to FIG. 24E, there is shown an SEM image 2430 for the conventionally-mixed sample at a magnification of 50,000. Referring to FIG. 24F, there is shown an SEM image 2435 for the sample mixed according to the apparatus, systems, and methods disclosed herein, at a magnification of 50,000. Referring to FIG. 24G, there are shown an SEM image 2440 for the conventionally-mixed sample at a magnification of 50,000, and a TEM image 2445 for the conventionally-mixed sample at a magnification of 20,000. Referring to FIG. 24H, there are shown an SEM image 2450 for the sample mixed according to the apparatus, systems, and methods disclosed herein at a magnification of 50,000, and a TEM image 2455 for the sample at a magnification of 20,000.

At higher magnifications (e.g. 50,000), the image 2435 reveals well-dispersed fiber-like structures of nanocrystalline cellulose. The TEM micrograph 2455 confirms the presence of fiber-like structures for nanocrystalline cellulose-silicone formulations prepared according to the apparatus, systems, and methods disclosed herein.

Figure 24I:
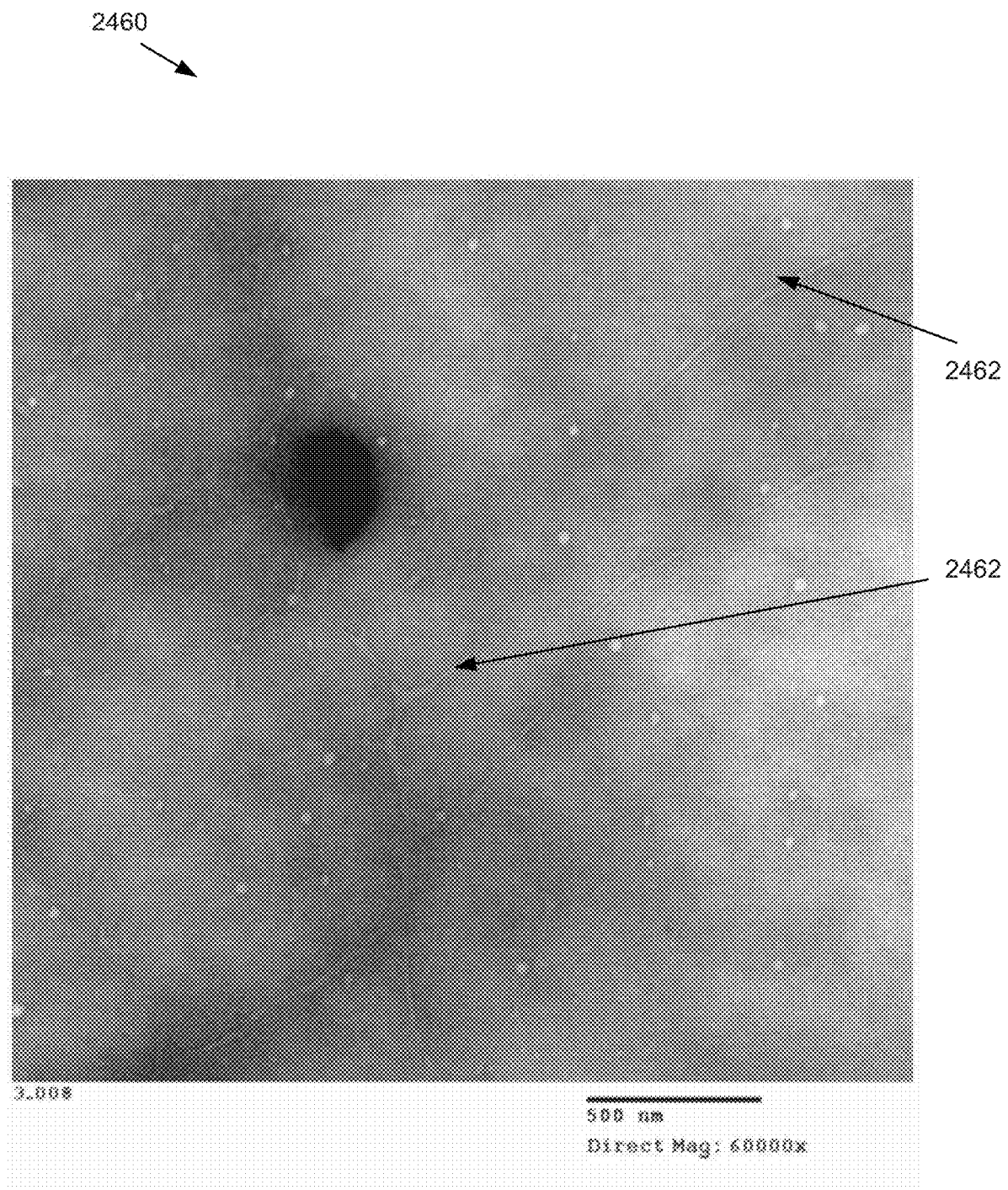
FIG. 24I is a TEM image of the sample of nanocrystalline cellulose in a silicone elastomer of FIG. 24B shown at a magnification of 60,000.

By using the apparatus, systems, and methods disclosed herein, nanostructures (e.g. particles, fibres, etc.) can be externally incorporated in a host matrix material, such as in previous examples, or the nanostructure can be produced in-process. FIG. 24I shows a TEM image 2460 of nanofibers 2462 produced in-process while dispersing a nanocrystalline cellulose colloid in a silicone matrix.

Gel Formulations

For these examples, the apparatus, systems, and methods disclosed herein were used to show microscopic blending of thickeners and gelling agents (e.g. xanthan gum, guar gum) to produce high concentration (>40 wt. %) gel formulations. Compared to conventionally-mixed formulations, the apparatus, methods, and systems disclosed herein produce gel formulations with greatly-improved consistency and stability, without phase separation, stratification or sedimentation for long durations (months).

A gel formulation was made by dispersing water (dispersed phase) in a xanthan gum-canola oil mixture (medium) using the apparatus, systems, and methods disclosed herein. The medium was prepared by pre-mixing the xanthan gum (internal phase) in the canola oil (external phase) in a 1:1 ratio using a conventional mechanical mixer (impeller mixer). Formulations were prepared with various concentrations of water using the two mixing techniques for comparison. Six formulations were prepared according to the apparatus, methods, and systems disclosed herein (samples C1 to C6 in the following table), and two formulations were prepared according to conventional mixing (samples D1 and D2). It was noted that formulations could not be practically prepared with water concentrations >10 wt. % with conventional high-shear mixing.

| Sample No. | Xanthan gum (wt. %) | Canola oil (wt. %) | Water (wt. %) | Appearance of the final mixture |
|---|---|---|---|---|
| Sample C1 | 48.5 | 48.5 | 3 | Gel |
| Sample C2 | 47 | 47 | 6 | Gel |
| Sample C3 | 45 | 45 | 10 | Powder |
| Sample C4 | 40 | 40 | 20 | Powder |
| Sample C5 | 35 | 35 | 30 | Powder |
| Sample C6 | 25 | 25 | 50 | Gel |
| Sample D1 | 48.5 | 48.5 | 3 | Gel |
| Sample D2 | 47 | 47 | 6 | Gel |

Figure 25:
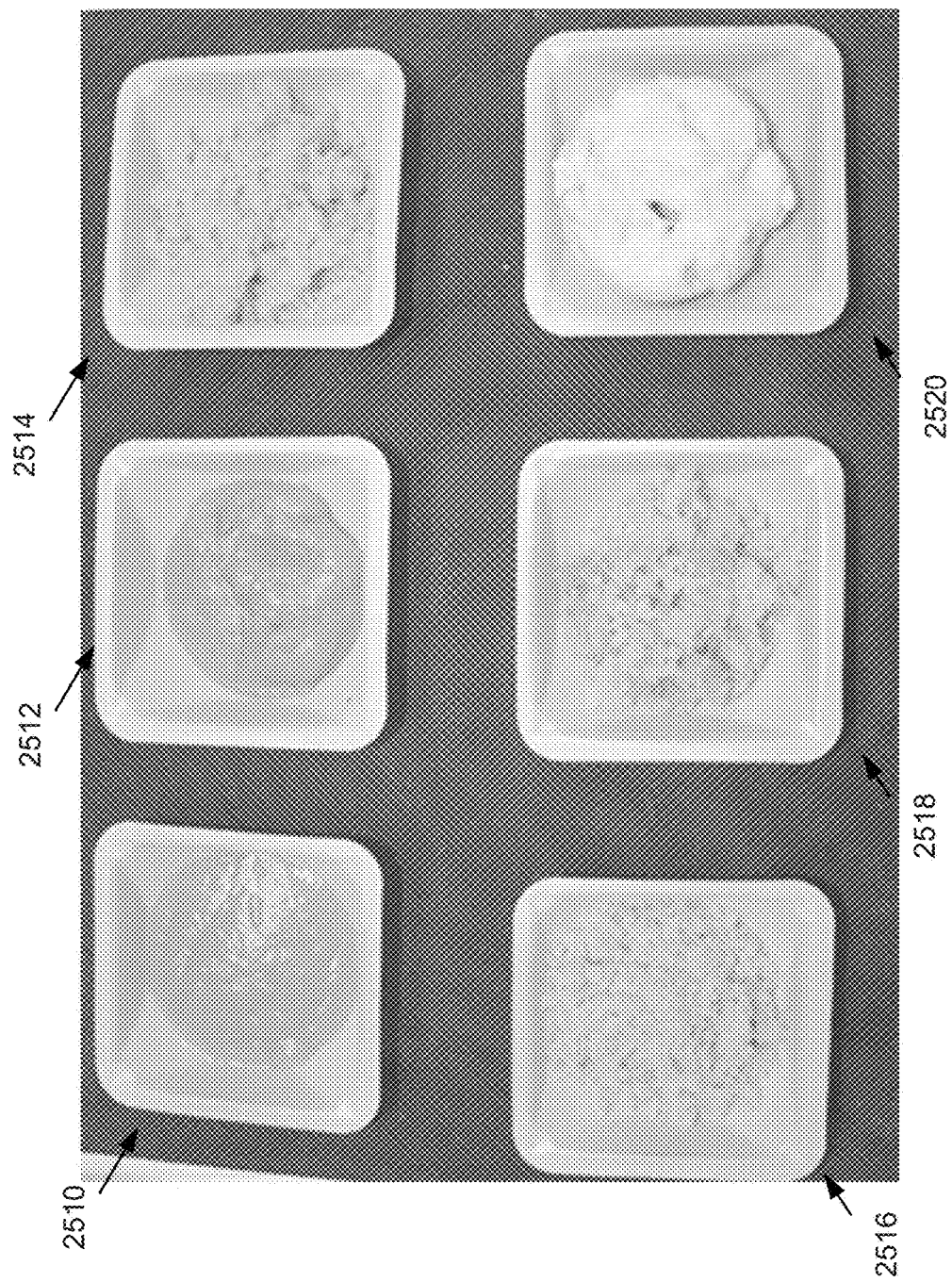
FIG. 25 shows samples of six different gel samples mixed with the methods and systems disclosed herein according to some embodiments.

Referring to FIG. 25, there are shown different gel samples after mixing according to the apparatus, systems, and methods disclosed herein. The sample 2510 is C1. The sample 2512 is C2. The sample 2514 is sample C3. The sample 2516 is sample C4. The sample 2518 is sample C5. The sample 2520 is sample C6.

The viscosity of gel formulations with 3 wt. % and 6 wt. % water measured with a Brookfield viscometer are reported in the following tables. The gel formulations prepared according to the apparatus, systems, and methods disclosed herein exhibited a 2- to 3-fold reduction in viscosity with a shorter mixing time compared to the conventionally-mixed gel formulations.

The following table pertains to viscosity data of a gel sample with 3 wt. % water.

| Shear rate (1/S) | Viscosity (cP) | |
|---|---|---|
| | Present invention (mixing time < 1 min) | High shear mixing (mixing time: 3 min) |
| 0.128 | 20273 | 44359 |
| 0.256 | 12216 | 23227 |
| 0.640 | 8201 | 14882 |
| 1.280 | 6739 | 11321 |
| 2.560 | 5760 | 9375 |
| 11.20 | 1900 | 4321 |

The following table pertains to viscosity data of a gel sample with 6 wt. % of water.

| Shear rate (1/S) | Viscosity (cP) | |
|---|---|---|
| | Present invention (mixing time < 1 min) | High shear mixing (mixing time: 3 min) |
| 0.112 | 35499 | 106244 |
| 0.224 | 19318 | 36999 |
| 0.560 | 9500 | 17321 |
| 1.120 | 6388 | 6809 |
| 2.240 | 4832 | 5709 |

While the above description provides examples of one or more apparatus, methods, or systems, it will be appreciated that other apparatus, methods, or systems may be within the scope of the claims as interpreted by one of skill in the art.

The invention claimed is:

1. A method for mixing and dispersing a dispersed phase in a medium, the method comprising:
   a) making the medium receptive by depositing the medium onto a rotating disk to form a rotating thin film;
   b) aerosolizing the dispersed phase;
   c) depositing constituents of the aerosolized dispersed phase into the rotating thin film to form a compound;
   d) forming a film of the compound on the rotating disk;
   e) directing the film of the compound upwardly and away from a center of the rotating disk along a transverse distal surface;
   f) forming compound projectiles from the film of the compound by ejecting the film of the compound from an outer edge of the transverse distal surface; and
   g) collecting the compound projectiles as a liquid on a collecting surface.

2. A method for mixing and dispersing a dispersed phase in a medium, the method comprising:
   a) making the medium receptive by depositing the medium onto a rotating disk to form a rotating thin film;
   b) aerosolizing the dispersed phase;
   c) depositing constituents of the aerosolized dispersed phase into the rotating thin film to form a compound;
   d) forming a film of the compound on the rotating disk;
   e) directing the film of the compound upwardly and away from a center of the rotating disk along a transverse distal surface;
   f) forming compound projectiles from the film of the compound by ejecting the film of the compound from an outer edge of the transverse distal surface; and
   g) collecting the compound projectiles as a liquid on a collecting surface;
      further comprising a step of recirculating the collected compound projectiles into the medium for further depositing additional constituents of the aerosolized dispersed phase into the recirculated collected compound projectiles.

3. A method for mixing and dispersing a dispersed phase in a medium, the method comprising:
   a) making the medium receptive by depositing the medium onto a rotating disk to form a rotating thin film;
   b) aerosolizing the dispersed phase;
   c) depositing constituents of the aerosolized dispersed phase into the rotating thin film to form a compound;
   d) forming a film of the compound on the rotating disk;
   e) directing the film of the compound upwardly and away from a center of the rotating disk along a transverse distal surface;
   f) forming compound projectiles from the film of the compound by ejecting the film of the compound from an outer edge of the transverse distal surface; and
   g) collecting the compound projectiles as a liquid on a collecting surface;
      wherein the step of forming the compound projectiles comprises forming at least one of liquid ligaments and compound-film projectiles.

4. The method of claim 1, wherein the step of forming the compound projectiles comprises forming at least one of aerosol and droplet particles.

5. The method of claim 1, further comprising the step of applying an electric field to the compound.

6. The method of claim 1, further comprising the step of applying a magnetic field to the compound.

7. The method of claim 1, further comprising the step of applying an electro-magnetic field to the compound.

8. The method of claim 2, wherein the step of forming the compound projectiles comprises forming at least one of aerosol and droplet particles.

9. The method of claim 2, further comprising the step of applying an electric field to the compound.

10. The method of claim 2, further comprising the step of applying a magnetic field to the compound.

11. The method of claim 2, further comprising the step of applying an electro-magnetic field to the compound.

12. The method of claim 3, wherein the step of forming the compound projectiles comprises forming at least one of aerosol and droplet particles.

13. The method of claim 3, further comprising the step of applying an electric field to the compound.

14. The method of claim 3, further comprising the step of applying a magnetic field to the compound.

15. The method of claim 3, further comprising the step of applying an electro-magnetic field to the compound.

16. The method of claim 1, wherein the collecting surface is a single, continuous surface laterally spaced apart from the edge of the transverse distal surface.

17. The method of claim 2, wherein the collecting surface is a single, continuous surface laterally spaced apart from the edge of the transverse distal surface.

18. The method of claim 3, wherein the collecting surface is a single, continuous surface laterally spaced apart from the edge of the transverse distal surface.

* * * * *